(12) United States Patent
Goto et al.

(10) Patent No.: US 8,793,712 B2
(45) Date of Patent: Jul. 29, 2014

(54) DISC CONVEYING DEVICE

(75) Inventors: Naofumi Goto, Kanagawa (JP); Takeshi Kubo, Kanagawa (JP); Takeharu Takasawa, Kanagawa (JP); Akira Suzuki, Kanagawa (JP)

(73) Assignee: Sony Corporation, Toky (JP)

( * ) Notice: Subject to any disclaimer, the term of this patent is extended or adjusted under 35 U.S.C. 154(b) by 77 days.

(21) Appl. No.: 13/562,014

(22) Filed: Jul. 30, 2012

(65) Prior Publication Data

US 2013/0057982 A1 Mar. 7, 2013

(30) Foreign Application Priority Data

Sep. 7, 2011 (JP) ................................. 2011-195512

(51) Int. Cl.
*G11B 17/26* (2006.01)

(52) U.S. Cl.
USPC .......................................................... 720/615

(58) Field of Classification Search
USPC .......................................................... 720/615
See application file for complete search history.

(56) References Cited

U.S. PATENT DOCUMENTS

| 7,444,650 B2 * | 10/2008 | Ito ................................. 720/619 |
| 7,571,449 B2 * | 8/2009 | Kuo ............................... 720/619 |
| 7,685,611 B2 * | 3/2010 | Tokita et al. ................... 720/615 |

FOREIGN PATENT DOCUMENTS

JP  2011-108315 A  6/2011

* cited by examiner

*Primary Examiner* — Mark Blouin
(74) *Attorney, Agent, or Firm* — Sony Corporation

(57) ABSTRACT

A disc conveying device includes a route adjuster which is pressed and turned by a disc-shaped recording medium being conveyed in a direction orthogonal to a central axis direction in a lead-in direction of being extracted and led in from a disc cartridge and an ejecting direction of being stored in the disc cartridge after being ejected; wherein a positioning groove is formed to the route adjuster, in which a peripheral portion of the disc-shaped recording medium is inserted at the time of the disc-shaped recording medium being conveyed, so as to position the disc-shaped recording medium.

8 Claims, 75 Drawing Sheets

FIG. 22
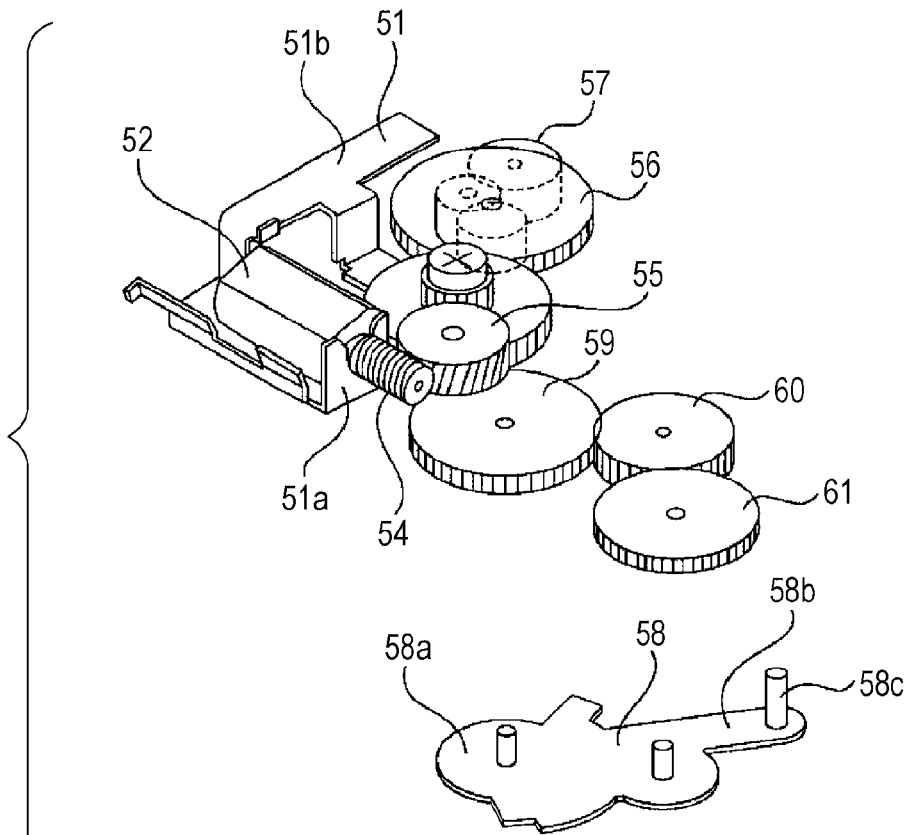
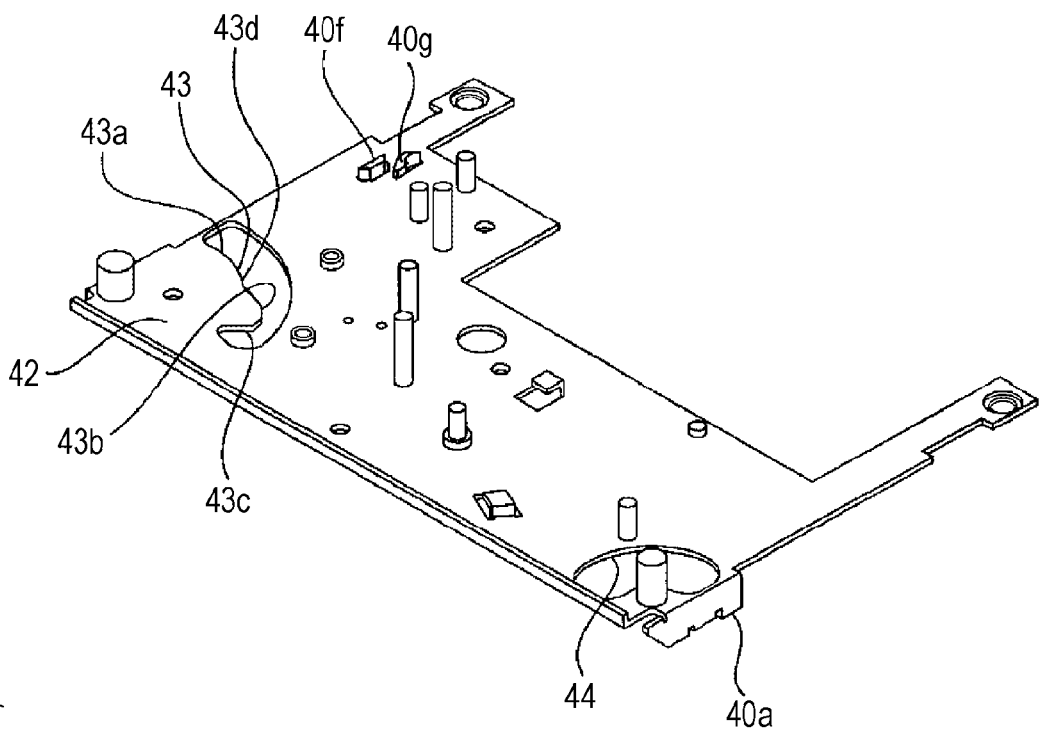

DISC CONVEYING DEVICE

BACKGROUND

The present disclosure relates to the technical field of a disc conveying device, and particularly relates to the technical field wherein positioning of a disc-shaped recording medium is performed by route adjusters which are pressed by the conveyed disc-shaped recording medium and turned, thereby improving positional accuracy at time of conveying the disc-shaped recording medium while ensuring simplicity of the mechanism thereof.

There are disc conveying devices that convey disc-shaped recording medium on which image data and audio data are recorded.

There is such a disc conveying device to which is attached a pair of arm portions, and engaging claws formed of resin material respectively formed at tip portions of the arm portions, the arm portions being operated so as to sandwich the disc-shaped recording medium from peripheral sides by the pair of the engaging claws, thereby conveying the disc-shaped recording medium to a predetermined direction. (e.g., Japanese Unexamined Patent Application Publication 2011-108315).

The disc conveying device according to Japanese Unexamined Patent Application Publication 2011-108315 sandwiches and holds the disc-shaped recording medium from the peripheral sides by engaging claws attached to a pair of arm portions, wherein arm portions operate, and for example, stores the disc-shaped recording medium in the disc cartridge.

SUMMARY

However, the disc conveying device according to Japanese Unexamined Patent Application Publication 2011-108315 holds a disc-shaped recording medium from the peripheral sides by a pair of arm portions and engaging claws attached to the arm portions and conveys, but the disc-shaped recording medium may be held shifted from an appropriate position, depending on accuracy of assembly of each portion, and accordingly the disc-shaped recording medium may not be stored as to a disc cartridge as appropriate, depending on the holding state.

In this case, at the time of storing the disc-shaped recording medium in the disc cartridge, providing a positioning mechanism to perform positioning of the disc-shaped recording medium at an appropriate position as to the disc cartridge may be conceived, but there may occur a problem that the mechanisms provided in the disc conveying device will be complicated depending on a configuration of the positioning mechanism.

It has been found desirable to provide a disc conveying device which improves positional accuracy of the disc-shaped recording medium at time of conveying while ensuring simplicity of the mechanism thereof.

According to an embodiment of the present disclosure, a disc conveying device includes: a route adjuster which is pressed and turned by a disc-shaped recording medium being conveyed in a direction orthogonal to a central axis direction in a lead-in direction of being extracted and led in from a disc cartridge and an ejecting direction of being stored in the disc cartridge after being ejected; wherein a positioning groove is formed to the route adjuster, in which a peripheral portion of the disc-shaped recording medium is inserted at the time of the disc-shaped recording medium being conveyed, so as to position the disc-shaped recording medium.

Accordingly, the disc conveying device performs positioning of the disc-shaped recording medium by the route adjusters when the route adjusters are turned by the conveyed disc-shaped recording medium.

A plurality of holding grooves which can respectively store a plurality of the disc-shaped recording mediums are preferably arrayed and formed in the central axis direction of the disc-shaped recording mediums in the disc cartridge; with the route adjuster being provided with a positioning protrusion which, when the disc-shaped recording medium is conveyed in the ejecting direction and the route adjuster is turned, is inserted in a holding groove different from the holding groove where the disc-shaped recording medium is inserted and performs positioning as to the disc cartridge of the route adjuster.

The disc-shaped recording medium and positioning protrusions are inserted into different holding grooves of a disc cartridge, by providing positioning protrusions in the route adjusters to perform positioning of the route adjusters as to the disc cartridge by inserting into holding grooves different from the holding grooves where the disc-shaped recording medium is inserted.

The positioning protrusion of the route adjuster is preferably made to be pressed on a face which forms the holding groove.

By the positioning protrusion of the route adjuster being pressed on the face which forms the holding groove, the positioning protrusion is pressed on the face which forms the holding groove of the positioning protrusion, so that the route adjuster is positioned as to the disc cartridge.

The positioning protrusion preferably has formed thereon a guided face which is slid against a face which forms the holding groove at the time of turning of the route adjuster, and is inclined as to the slid face.

On the positioning protrusion is formed a guided face that is slid against the face which forms a holding groove at the time of turning the route adjuster and is include as to the slid face, whereby the guided face is guided to the disc cartridge and inserted in a state with the positioning protrusion being positioned in the holding groove.

The route adjuster is preferably made to be turnable in an opposite direction with a neutral position as a reference; with two of the positioning grove being formed at the peripheral face of the route adjuster; and at the time of conveying the disc-shaped recording medium in the lead-in direction, the route adjuster being turned to one direction with the neutral position as a reference and the peripheral portion of the disc-shaped recording medium being inserted into one of the positioning grooves; and at the time of conveying the disc-shaped recording medium in the ejecting direction, the route adjuster being turned to another direction with the neutral position as a reference and the peripheral portion of the disc-shaped recording medium being inserted into the other of the positioning grooves.

The route adjuster is made to be turnable in the opposite direction with the neutral position as a reference, with the two positioning groves being formed at the peripheral face of the route adjuster, and accordingly the disc-shape recording medium is inserted in to the positioning groove and positioned at the time of either conveying the disc-shaped recording device in the lead-in direction or in the ejecting direction as to the disc conveying device.

The disc conveying device preferably further includes a return spring that turns the route adjuster to the neutral position, when the route adjuster is turned to either the one or the other direction with the neutral position as a reference.

By providing a return spring turns the route adjuster to the neutral position when the route adjuster is turned to one or the other direction with the neutral position as a reference, the route adjuster is turned to the neutral position by the return spring at the time of conveying the disc-shaped recording device either in the lead-in direction or the ejecting direction as to the disc conveying device.

A guiding face that guides the disc-shaped recording medium is preferably formed to the positioning grooves.

The disc-shaped recording medium is guided to the guiding face and inserted into the positioning groove, by forming the guiding face which guides the disc-shaped recording medium to the positioning groove.

The disc conveying device preferably further includes: a pair of rails, positioned on opposite sides of the disc-shaped recording medium which is conveyed, the rails extending in the conveying direction of the disc-shaped recording medium; a plurality of link arms which are turnably connected to the pair of rails and perform parallel shifting of the pair of rails in directions toward and away from the peripheral face of the disc-shaped recording medium; an ejecting lever turnably supported by at least one of the rails, which presses the peripheral face of the disc-shaped recording medium that has been positioned by the route adjuster, by being turned, so as to store the disc-shaped recording medium in the disc cartridge; a hooking portion provided to at least one of the plurality of link arms; and an engaging portion capable of engaging the hooking portion to the route adjuster; with the link arm being turned in the same direction as with the ejecting lever, when the disc-shaped recording medium is stored in the disc cartridge and the ejecting lever is turned in the opposite direction as with the direction of pressing the disc-shaped recording medium; the hooking portion being enabled to engage with the engaging portion, when the ejecting lever is turned in the opposite direction and the link arm is turned in the same direction as with the ejecting lever in a state in which the positioning protrusion has been inserted into the holding groove; and the route adjuster being made to be turned toward the neutral position along with the turning operation of the link arm, when the hooking portion has engaged with the engaging portion.

The route adjuster is turned to the neutral position regardless of the turning state as to the disc cartridge of the route adjuster, by the hooking portion being enabled to engage with the engaging portion, and the route adjuster being made to be turned toward the neutral position along with the turning operation of the link arm when the hooking portion has engaged with the engaging portion.

The ejecting lever is preferably turnable to the same direction as with the route adjuster; with the turning center of the route adjuster and the turning center of the ejecting lever existing in different positions in a direction orthogonal to the turning centers; and when the hooking portion and the engaging portion which have been engaged are slid, and the ejecting lever and the route adjuster are turned to a predetermined position at the time of the ejecting lever turning to the opposite direction, engaging between the hooking portion and the engaging portion being disengaged.

The disc conveying device according to the present disclosure includes a route adjuster which is pressed and turned by a disc-shaped recording medium being conveyed in a direction orthogonal to a central axis direction in a lead-in direction of being extracted and led in from a disc cartridge and an ejecting direction of being stored in the disc cartridge after being ejected; wherein a positioning groove is formed to the route adjuster, in which a peripheral portion of the disc-shaped recording medium is inserted at the time of the disc-shaped recording medium being conveyed, so as to position the disc-shaped recording medium.

Accordingly, the configuration to perform positioning of the disc-shaped recording medium is made by simple members such as the route adjusters, thereby improving positional accuracy at the time of conveying the disc-shaped recording medium while ensuring simplicity of the mechanism thereof.

A plurality of holding grooves which can respectively store a plurality of the disc-shaped recording mediums may be arrayed and formed in the central axis direction of the disc-shaped recording mediums in the disc cartridge; with the route adjuster being provided with a positioning protrusion which, when the disc-shaped recording medium is conveyed in the ejecting direction and the route adjuster is turned, is inserted in a holding groove different from the holding groove where the disc-shaped recording medium is inserted and performs positioning as to the disc cartridge of the route adjuster.

Accordingly, smooth storing of the disc-shaped recording medium as to the disc cartridge is performed, without the route adjuster interfering with storing of the disc-shaped recording medium as to the disc cartridge.

The positioning protrusion of the route adjuster may be made so as to be pressed on a face which forms the holding groove.

Accordingly, positional accuracy as to the disc cartridge of the route adjusters is improved, thereby inserting the disc-shaped recording medium into the holding groves of the disc cartridge in a sure and smooth manner.

The positioning protrusion may have formed thereon a guided face which is slid against a face which forms the holding groove at the time of turning of the route adjuster, and is inclined as to the slid face.

Accordingly, positioning as to the disc cartridge of the route adjusters can be performed in a sure manner, thereby inserting the disc-shaped recording medium to the disc cartridge in a sure manner.

The route adjuster may be turnable in an opposite direction with a neutral position as a reference; with two of the positioning grove being formed at the peripheral face of the route adjuster; and at the time of conveying the disc-shaped recording medium in the lead-in direction, the route adjuster being turned to one direction with the neutral position as a reference and the peripheral portion of the disc-shaped recording medium being inserted into one of the positioning grooves; and at the time of conveying the disc-shaped recording medium in the ejecting direction, the route adjuster being turned to another direction with the neutral position as a reference and the peripheral portion of the disc-shaped recording medium being inserted into the other of the positioning grooves.

Accordingly, positioning of the disc-shaped recording medium at the time of conveying in the lead-in direction and ejecting direction by the route adjusters, can be performed, thereby improving positional accuracy of the disc-shaped recording medium while realizing reducing of the number of parts.

The disc conveying device may further include a return spring that turns the route adjuster to the neutral position, when the route adjuster is turned to either the one or the other direction with the neutral position as a reference.

Accordingly, the route adjusters are turned in the neutral position by the return spring regardless of the turning direction and turned with the neutral position as a reference, thereby improving reliability of the operation of the route adjusters.

A guiding face that guides the disc-shaped recording medium may be formed to the positioning grooves.

Accordingly, the disc-shaped recording mediums are inserted into the positioning grooves of the route adjusters in a sure manner, thereby improving positional accuracy of the disc-shaped recording medium in a simple and sure manner.

The disc conveying device may further include: a pair of rails, positioned on opposite sides of the disc-shaped recording medium which is conveyed, the rails extending in the conveying direction of the disc-shaped recording medium; a plurality of link arms which are turnably connected to the pair of rails and perform parallel shifting of the pair of rails in directions toward and away from the peripheral face of the disc-shaped recording medium; an ejecting lever turnably supported by at least one of the rails, which presses the peripheral face of the disc-shaped recording medium that has been positioned by the route adjuster, by being turned, so as to store the disc-shaped recording medium in the disc cartridge; a hooking portion provided to at least one of the plurality of link arms; and an engaging portion capable of engaging the hooking portion to the route adjuster; with the link arm being turned in the same direction as with the ejecting lever, when the disc-shaped recording medium is stored in the disc cartridge and the ejecting lever is turned in the opposite direction as with the direction of pressing the disc-shaped recording medium; the hooking portion being enabled to engage with the engaging portion, when the ejecting lever is turned in the opposite direction and the link arm is turned in the same direction as with the ejecting lever in a state in which the positioning protrusion has been inserted into the holding groove; and the route adjuster being made to be turned toward the neutral position along with the turning operation of the link arm, when the hooking portion has engaged with the engaging portion.

Accordingly, the route adjuster is turned to the neutral position in a sure manner, thereby securing a smooth operation state of the disc-shaped recording medium.

The ejecting lever may be made to be turnable to the same direction as with the route adjuster; with the turning center of the route adjuster and the turning center of the ejecting lever existing in different positions in a direction orthogonal to the turning centers; and when the hooking portion and the engaging portion which have been engaged are slid, and the ejecting lever and the route adjuster are turned to a predetermined position at the time of the ejecting lever turning to the opposite direction, engaging between the hooking portion and the engaging portion being disengaged.

Accordingly, the route adjuster can be turned to the neutral position in a sure manner and the link arm can turn to the initial state in a sure manner, thereby improving the reliability of the operation of the disc conveying device.

BRIEF DESCRIPTION OF THE DRAWINGS

FIG. 22 is an enlarged exploded perspective view illustrating a driving motor and the gears and so forth;

DETAILED DESCRIPTION OF EMBODIMENTS

Figure 1:
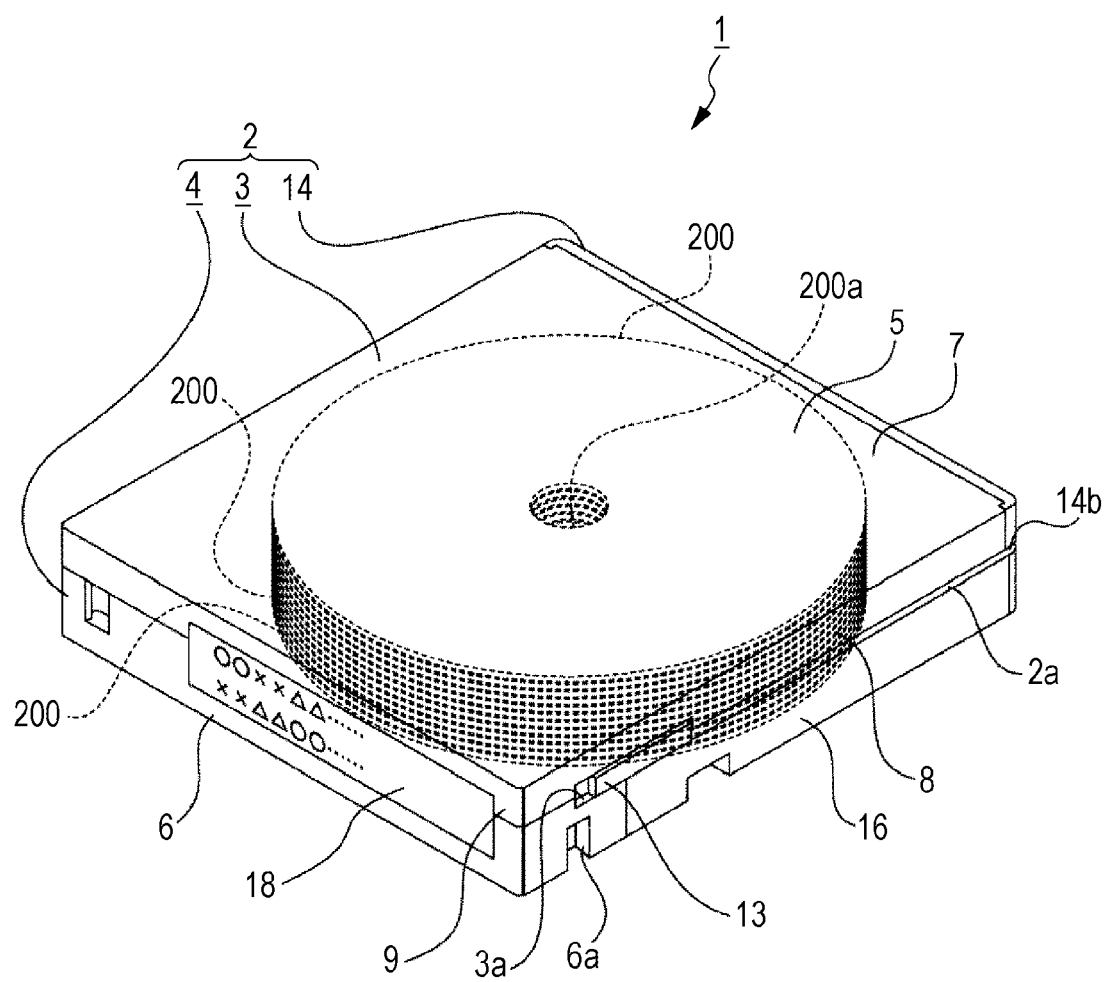
FIG. 1 is a perspective view of a disc cartridge in which a disc-shaped storage medium that is conveyed by the disc conveying device is stored, and illustrates an embodiment of a disc conveying device according to the present disclosure, together with FIGS. 2 through 76.

Embodiments of a disc conveying device of the present technology will be described below with reference to the appended diagrams. The disc conveying device has a function to convey a disc-shaped storage medium between disc cartridges in a disc storage system.

In the descriptions below, the direction in which the disc-shaped recording medium is conveyed from the disc cartridge toward the disc conveying device is the rear (pulling-in direction), the direction in which the disc-shaped recording medium is conveyed from the disc conveying device towards the disc cartridge is the front (ejecting direction), the right and left directions are indicated in a state when viewed from the rear, and indicate the directions of front/back, up/down, and left/right.

Note that the front/back, up/down, and left/right directions below are to facilitate description, and embodiments of the present technology are not limited to these directions.

Configuration of Disc Cartridge

First, a configuration of a disc cartridge used in a disc storage system will be described (see FIGS. 1 through 4).

A disc cartridge 1 is made up of various principal parts disposed within a case unit 2, and the case unit 2 has a first shell 3 and second shell 4. Multiple disc-shaped mediums 200 and the like can be stored within the case unit 2 in the vertical direction equidistantly.

Figure 2:
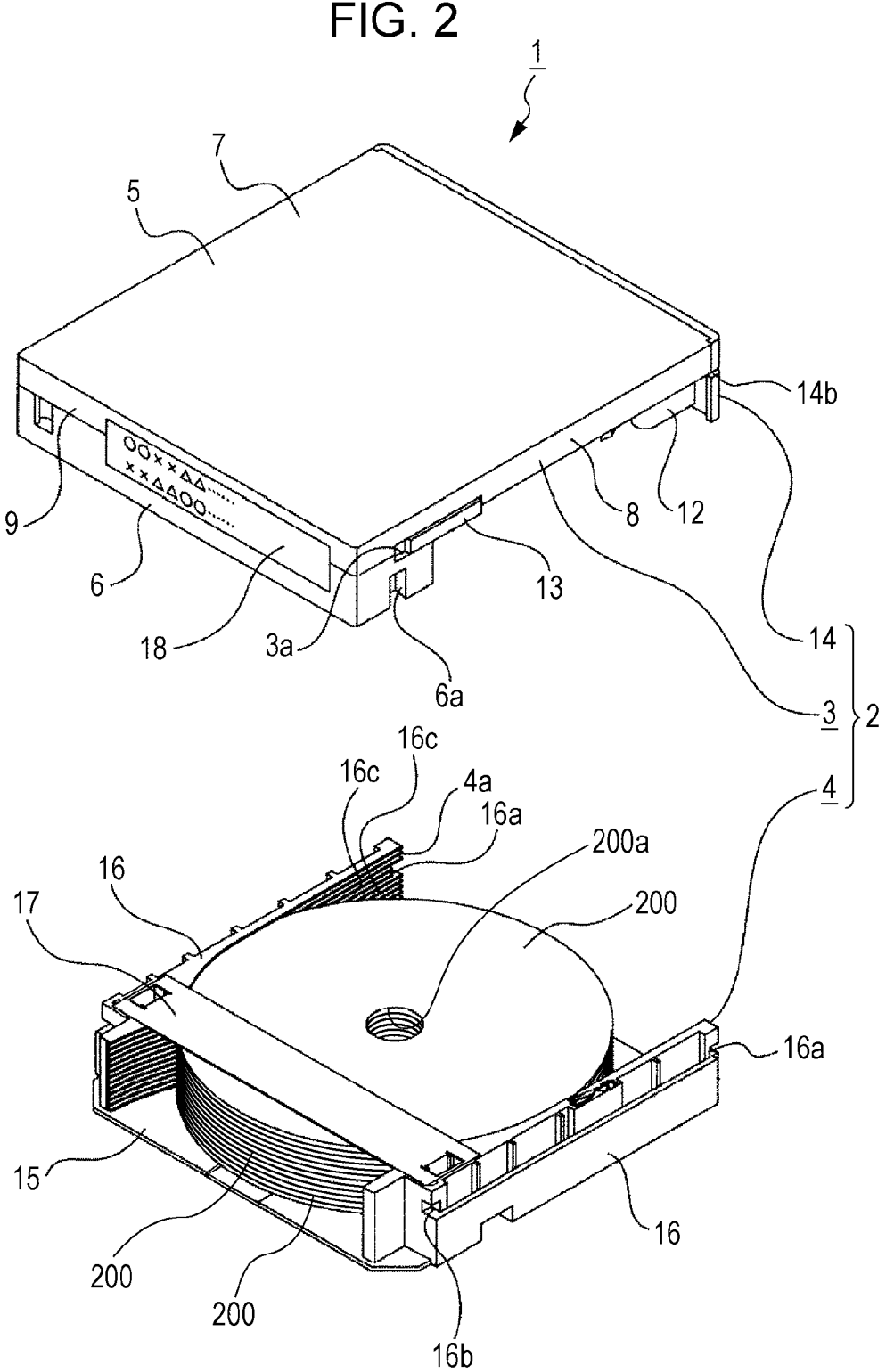
FIG. 2 is a perspective view of the disc cartridge illustrating a state of having a first shell and second shell separated.
Figure 3:
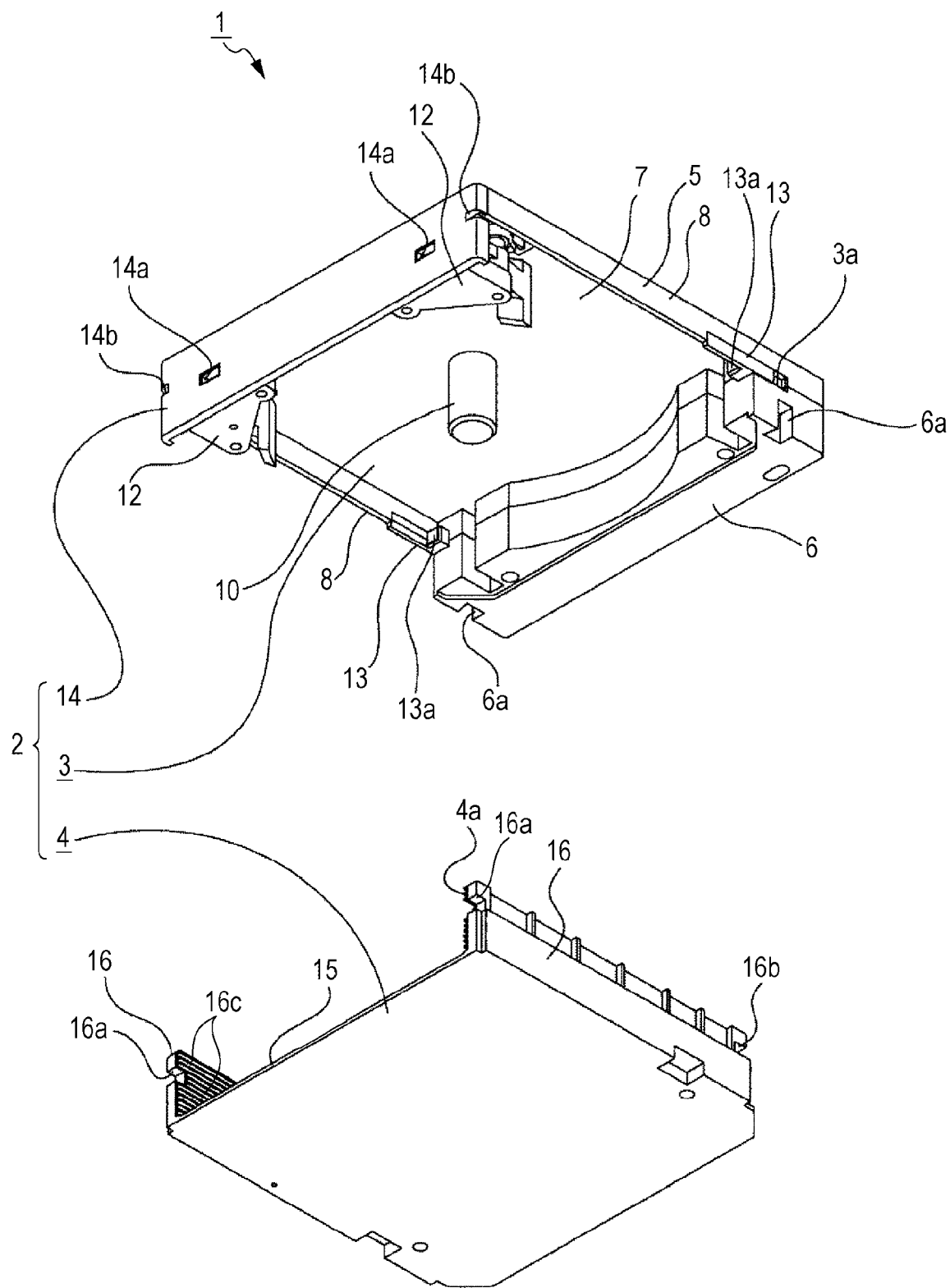
FIG. 3 is a perspective view of the disc cartridge illustrating a state of having a first shell and second shell separated, as seen from a different direction than in FIG. 2.

The first shell 3 and second shell 4 can be joined or separated in the vertical direction, for example (see FIGS. 1 through 3). Note that in the case that the case unit 2 is in an erected state, the first shell 3 and second shell 4 are joined or separated in the left/right direction.

The first shell 3 is made up of a base unit 5 and a supporting base 6 attached to the rear edge portion of the base 5, which are joined in the vertical direction.

The base unit 5 has a base face portion 7 that faces the vertical direction, side face portions 8 that protrude downward from each of left and right edge portions of the base face portion 7, and a rear face portion 9 that protrudes downward from the rear edge portion of the base face portion 7.

A round shaft shaped center pin 10 that protrudes downward is provided in the center portion of the base face portion 7.

Supporting shafts 11 that protrude downward are provided, separated to the left and right, in a position near the front edge of the base face portion 7.

Groove-shaped gripping portions 6a which open in the side direction (outer direction) and downward are formed on the lower edge portion of the left and right edge portions of the supporting base 6.

Slider supporting portions 3a are formed in positions near the rear edge on the left and right side face portions, respectively, of the first shell 3.

Locking levers 12 are each turnably supported on supporting shafts 11 of the first shell 3.

Figure 4:
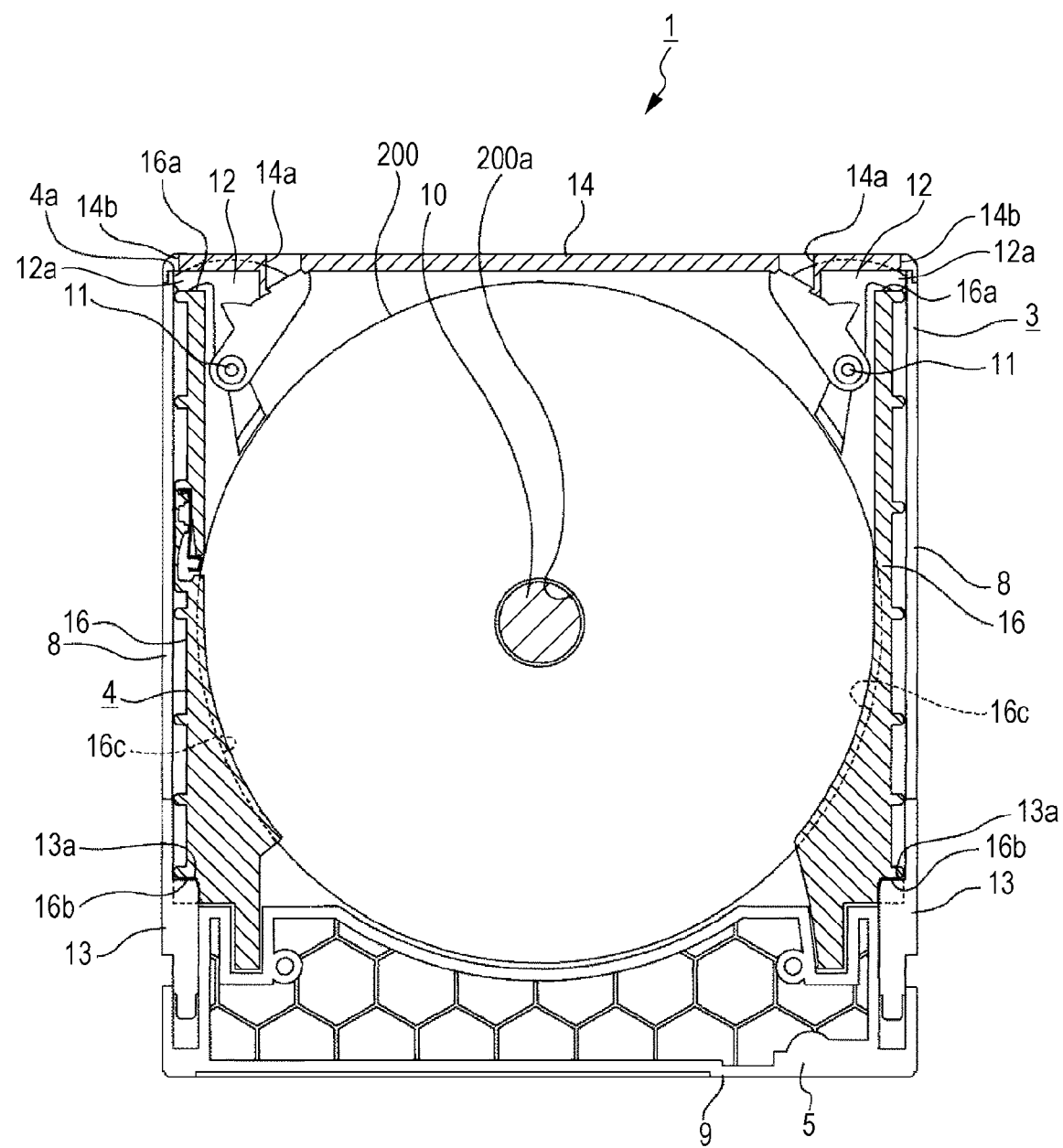
FIG. 4 is a cross-sectional diagram of the disc cartridge illustrating a state in which the first and second shells are locked with a lock slider.

A locking protrusion 12a that protrudes toward the side is provided to the front edge portion of the locking lever 12 (see FIG. 4). In the state wherein the locking levers 12 are supported by the supporting shafts 11, the locking protrusions 12a are biased toward the direction nearing the side face portions 8, respectively, by an unshown biasing spring.

Lock sliders 13 are slidably supported in the front/back direction by the slider supporting portions 3a of the first shell 3 (see FIGS. 1 through 4). The lock sliders 13 are each biased toward the front by an unshown coil spring. Lock portions 13a that protrude in the inner direction toward the center portion of the front/back direction are provided to the lock sliders 13 (see FIGS. 3 and 4).

An access panel 14 is attached to the front edge portion of the first shell 3 (see FIGS. 1 through 4). Inserting holes 14a are formed on the access panel 14 in a manner separated on the left and right. Notches for inserting 14b which are open to the outside are formed on the left and right edge portions of the access panel 14.

The second shell 4 is integrally formed of a basal face portion 15 that faces the vertical direction and side face portions 16 that protrude upward from the left and right edge portions of the basal face portion 15.

A first locking recess 16a that is open towards the front on the front edge portion and passes through to the left and right is formed on the side face portion 16, and a second locking recess 16b that is open towards the rear and to the outside is formed in a position near the rear edge.

Holding grooves 16c are formed on the inner face of the side face portion 16, and the holding grooves 16c are positioned so as to be separated equidistantly in the vertical direction.

A bridge member 17 is attached to a position near the rear edge between the side face portions 16 of the second shell 4 (see FIG. 2).

An information input sheet 18 serving as an information input arrangement is adhered to the rear face of the case unit 2, for example, on the disc cartridge 1 (see FIGS. 1 and 2). Predetermined information, such as information relating to the pitch between the disc-shaped recording mediums 200 stored within the case unit 2 and the number of disc-shaped recording mediums 200 stored therein, for example, is input on the information input sheet 18.

Note that the information input arrangement is not restricted to the information input sheet 18, and an appropriate arrangement can be used such as printed information like a bar code or the like printed on the case unit 2 or a recording chip or the like embedded within the case unit 2.

Disc-shaped recording mediums 200 are held within the case unit 2 of the disc cartridge 1 configured as described above (see FIGS. 1 and 2). The peripheral portion of the disc-shaped recording medium is inserted from the front of the holding grooves 16c formed on the side face portions 16 of the second shell 4 and held within the case unit 2, in a state in which the first shell 3 and second shell 4 are separated. Accordingly, an opening positioned at the front edge of the second shell 4 is formed as a disc inserting/removing opening 4a wherein insertion and removal of the disc-shaped recording mediums 200 is performed.

When the case unit 2 is in a configuration wherein the first shell 3 and second shell 4 are joined and the access panel 14 is attached to the first shell 3, inserting grooves 2a formed on each of the left and right side portions (see FIG. 1) extend front to back. The rear edges of the inserting grooves 2a are each connected to slider supporting portions 3a of the first shell 3, and the front edges thereof are each connected to the inserting notches 14b formed on the access panel 14.

Disc Cartridge Joining State

The joining state of the disc cartridge 1 will be described below (see FIG. 4).

The first shell 3 and second shell 4 are joined in a state in which the base face portion 7 of the base unit 5 and the basal face portion 15 face one another vertically.

In a state of the first shell 3 and second shell 4 being joined, the first shell 3 and second shell 4 are locked by lock levers 12 and lock sliders 13.

The lock levers 12 are positioned on the turning edge of the direction in which the locking protrusions 12a mutually separate (outer direction) by bias force of biasing springs, and the locking protruding portions 12a are inserted into the first locking recesses 16a formed on the side face portions 16 of the second shell 4 so as to be engaged.

The lock sliders 13 are positioned at the front moving edge by bias force of a coil spring, and the lock portions 13a are each inserted into a second locking recess 16b formed on the side face portions 16 of the second shell 4 so as to be engaged.

In the state of the first shell 3 and second shell 4 being joined, a center pin 10 provided to the first shell 3 is inserted into center holes 200a of the disc-shaped recording mediums 200.

Overall Configuration of Disc Storage System

Next, an overall configuration of the disc storage system 19 will be described (see FIGS. 5 and 6).

The disc storage system 19 includes the disc cartridge 1, the disc changer 20 in which the disc cartridge 1 is held, and the disc conveying device 21 which conveys the disc-shaped recording mediums 200.

An unshown elevator mechanism, and an unshown cartridge holder which is moved in the up/down direction by the elevator mechanism, are provided inside of the disc changer 20, and the disc cartridge 1 is held in the cartridge holder.

Figure 5:
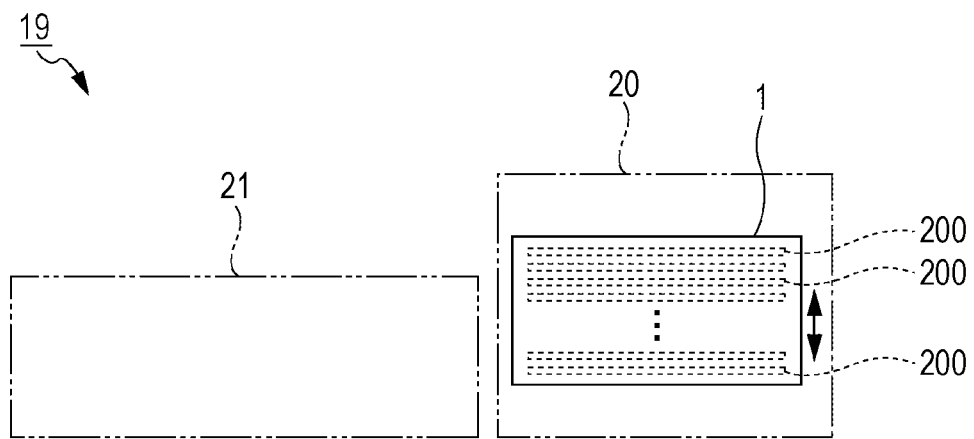
FIG. 5 is a schematic side view illustrating a state of a disc-shaped storage medium being stored in a disc cartridge, and illustrates a disc storage system in which a disc conveying device is provided, together with FIG. 6.
Figure 6:
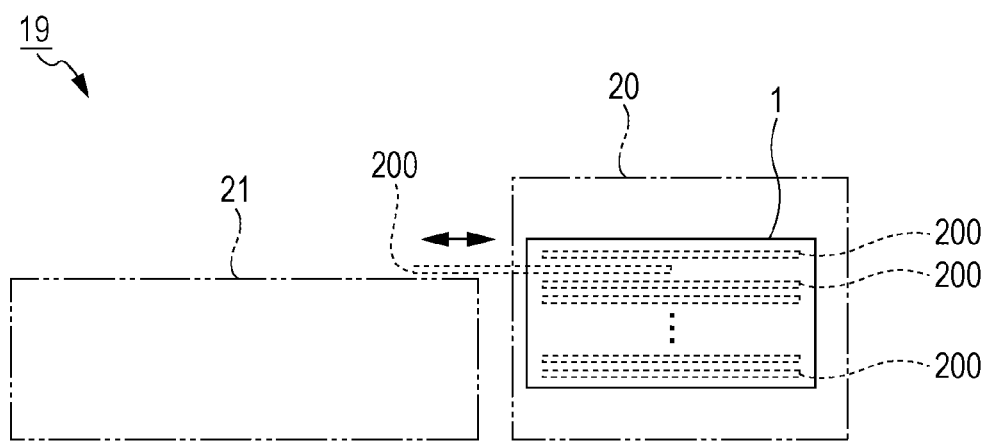
FIG. 6 is a schematic side view illustrating a state of a disc-shaped storage medium being transferred between a disc cartridge and a disc conveying device.

The disc cartridge 1 is moved in the up/down direction by an elevator mechanism, along with the cartridge holder (see FIG. 5). The disc-shaped recording medium 200 is transferred between the disc cartridge 1 and the disc conveying device 21 in the direction orthogonal to the central axis direction (the front/back direction).

The disc-shaped recording medium 200 is removed from the disc cartridge 1 to the rear by an unshown ejection mechanism provided in the disc changer 20, conveyed toward the rear by the disc conveying device 21 (see FIG. 6), and accordingly recording or playing of information signals is performed. The disc-shaped recording medium 200 of which recording or playing of information signals has ended is conveyed toward the front by the disc conveying device 21 (see FIG. 6), and stored in the disc cartridge 1.

Configuration of Disc Conveying Device

Next, a specific configuration of a disc conveying device 21 will be described (see FIGS. 7 through 38).

Base Frame

Figure 11:
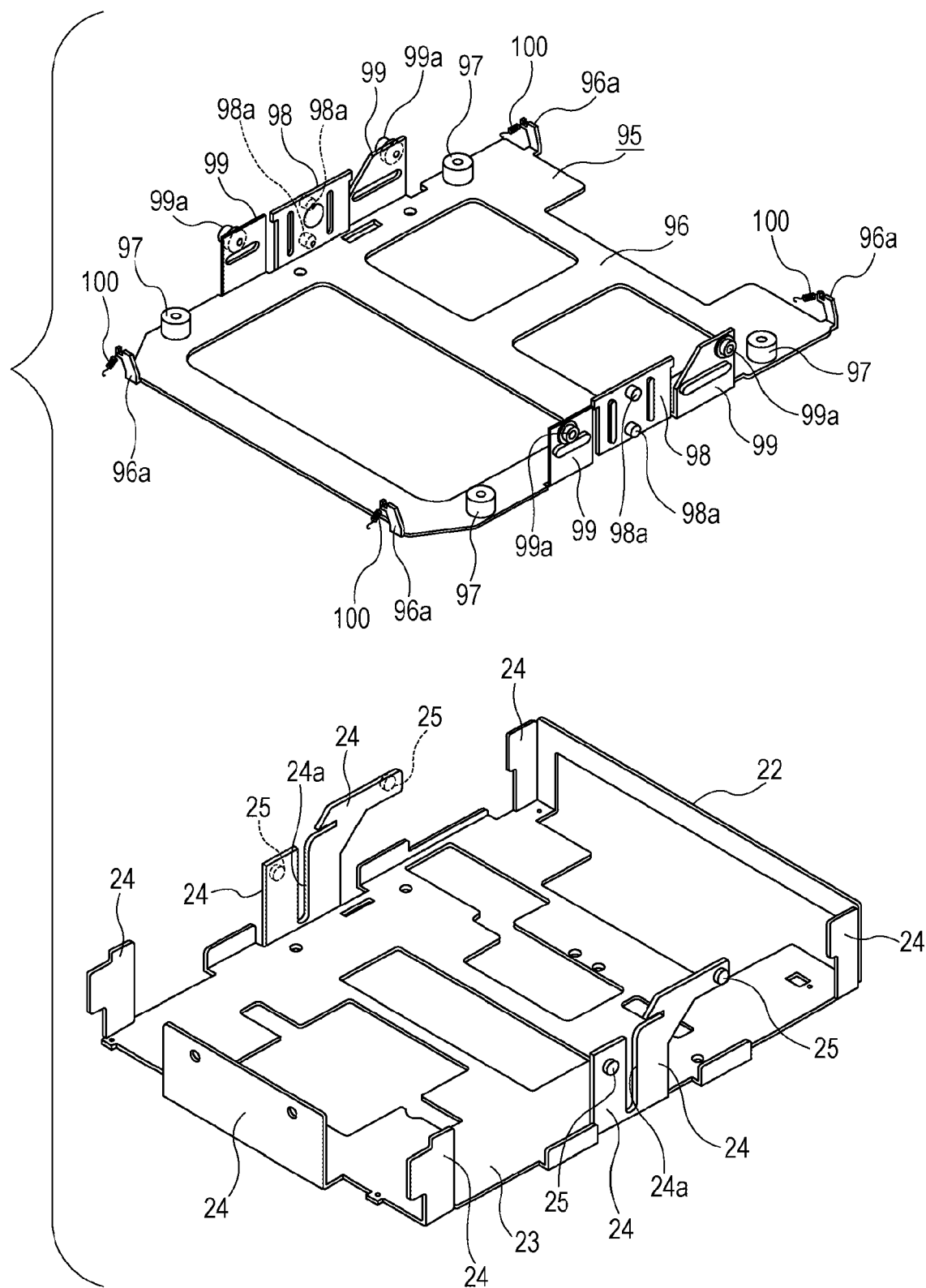
FIG. 11 is a perspective view illustrating a base frame and base plate.

The disc conveying device 21 has a base frame 20 and an unshown cover that covers the base frame 22 from the upper side, with the base frame 22 being made up of a floor face plate 23 formed having an outline of an erected, roughly rectangular shape, and multiple side face plates 24 that each protrude upward from the outer edge of the floor face plate 23 (see FIG. 11).

Two side face plates 24 are arrayed front-to-back on the left and right sides of the roughly center portion in the front/back direction of the base frame 24. A slit, which extends vertically and opens upward, is formed in the side face plates 24 that are arrayed front-to-back, and this slit is formed as a guide regulating hole 24a.

Guide regulating pins 25 are attached to each of the outer faces of the side face plates 24 arrayed front-to-back in the roughly center portion in the front/back direction.

An unshown circuit board is disposed on the floor face plate 23 of the base frame 22.

Base Plate

Figure 7:
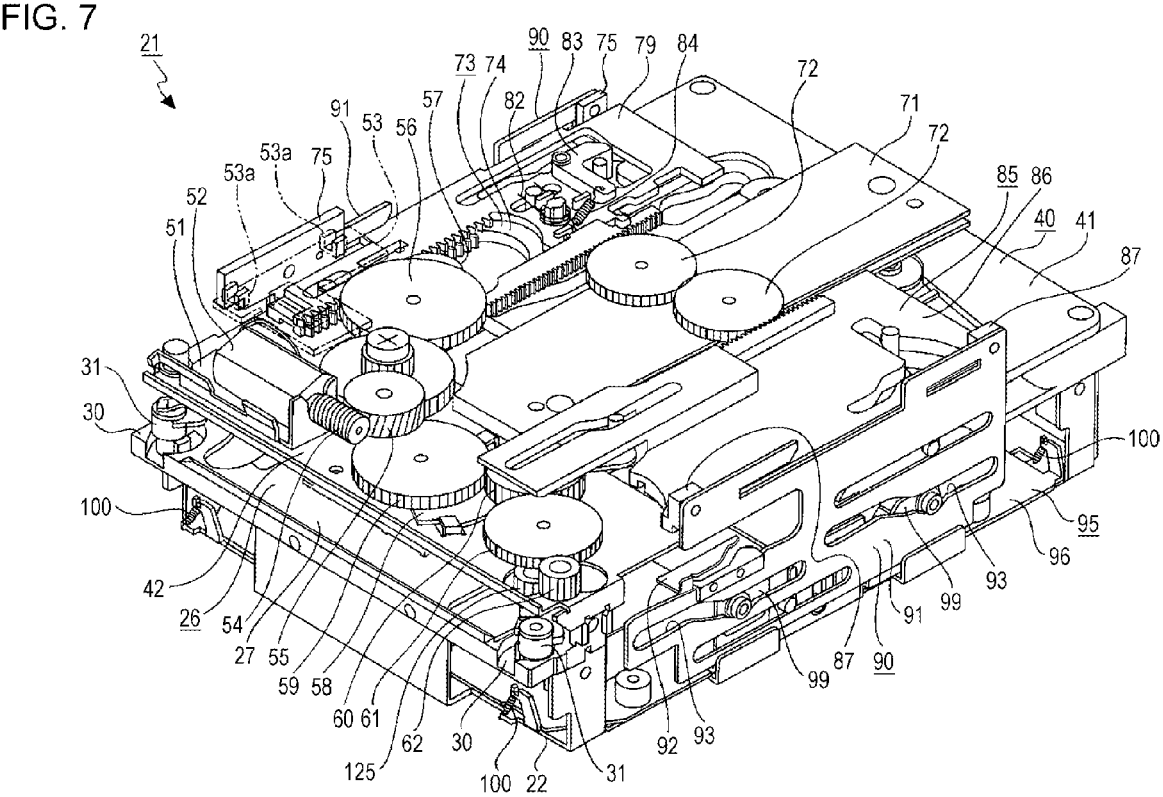
FIG. 7 is a perspective view of the disc conveying device.

A base plate 26 is attached to the side face plates 24 of the base frame 22 (see FIG. 7). The base plate 26 has a base plate 27 formed having an outline of an erected, roughly rectangular shape, attachment receiving protrusions 28 that protrude downward from the peripheral portion of the base plate 27, and attachment protrusions 29 that protrude upward from the peripheral portion of the base plate 27 (see FIG. 12). The attachment receiving protrusions 28 of the base plate 26 are attached to the side face plates 24 of the base frame 22 with screws or the like, and the base plate 27 is positioned above the floor face plate 23.

A base unit disposing hole 27a that extends front-to-back is formed on the central portion in the left/right direction of the base plate 27. An adjuster supporter 30 is provided to each of the left and right edges on the front edge portion of the base plate 27. A shaft attaching portion 30a that passes through is formed vertically on the adjust supporter 30 (see FIG. 13). The circumference portion of the shaft attaching portion 30a of the adjuster supporter 30 is formed as a recess 30b, and a spring engaging protrusion 30c which protrudes upward is provided to the recess 30b.

Route Adjuster

Route adjusters 31 are turnably supported by the adjuster supporters 30 (see FIG. 7). The route adjuster 31 is made up of a cylindrical shaft inserting unit 32, a position adjusting portion 33 that protrudes sideways from the shaft inserting unit 32, a positioning protrusion 34 that protrudes from the upper edge portion of the position adjusting portion 33, a protrusion portion 35 that protrudes to the opposite direction of the positioning protrusion 34 from the upper edge portion of the position adjusting portion 33, and a spring engaging portion 36 that protrudes downward from the front edge portion of the position adjusting portion 33 (see FIGS. 13 through 16).

The position adjusting portion 33 is formed in a roughly triangular prism shape that becomes narrower in width toward the front edge, and has positioning grooves 37 that extend in the horizontal direction of both side faces. Both edge portions of the positioning groove 37 have guide faces 37a formed therein wherein the groove width increases towards the front edges (see FIG. 16).

Figure 14:
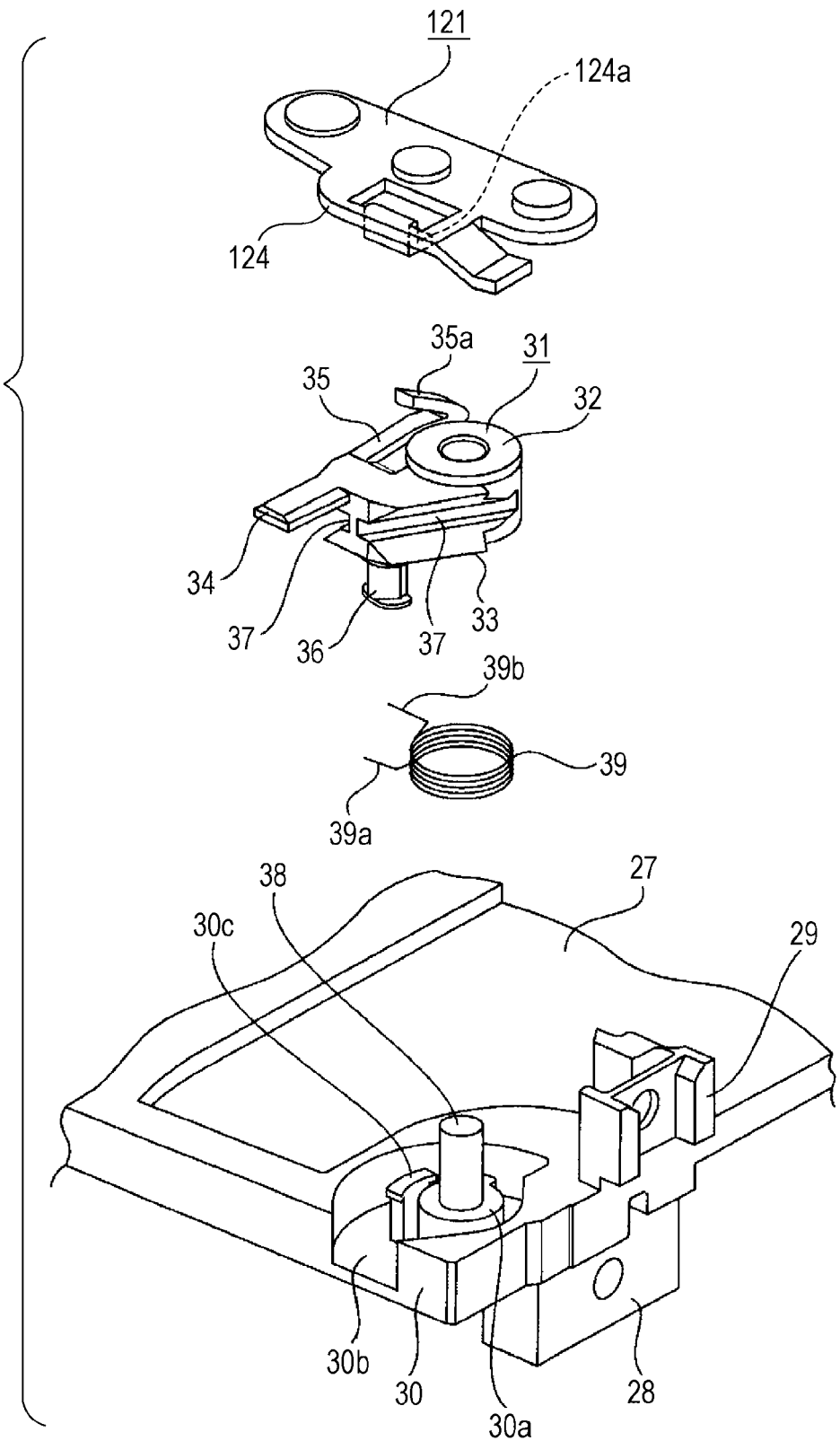
FIG. 14 is an enlarged exploded perspective view illustrating a route adjuster on the right side and a second front side link arm and so forth.

The positioning protrusion 34 protrudes from the position adjusting portion 33 in the same direction as the protruding direction from the shaft inserting portion 32 of the position adjusting portion 33, and have guided faces 34a, which are on the upper and lower edge portions on the left and right edge portions, that slope so as to become mutually closer in the vertical direction towards the outside (see FIG. 14).

The protrusion 35 is provided as an engaging portion 35a of which the front edge portion is bent upwards to form a V-shape.

Figure 13:
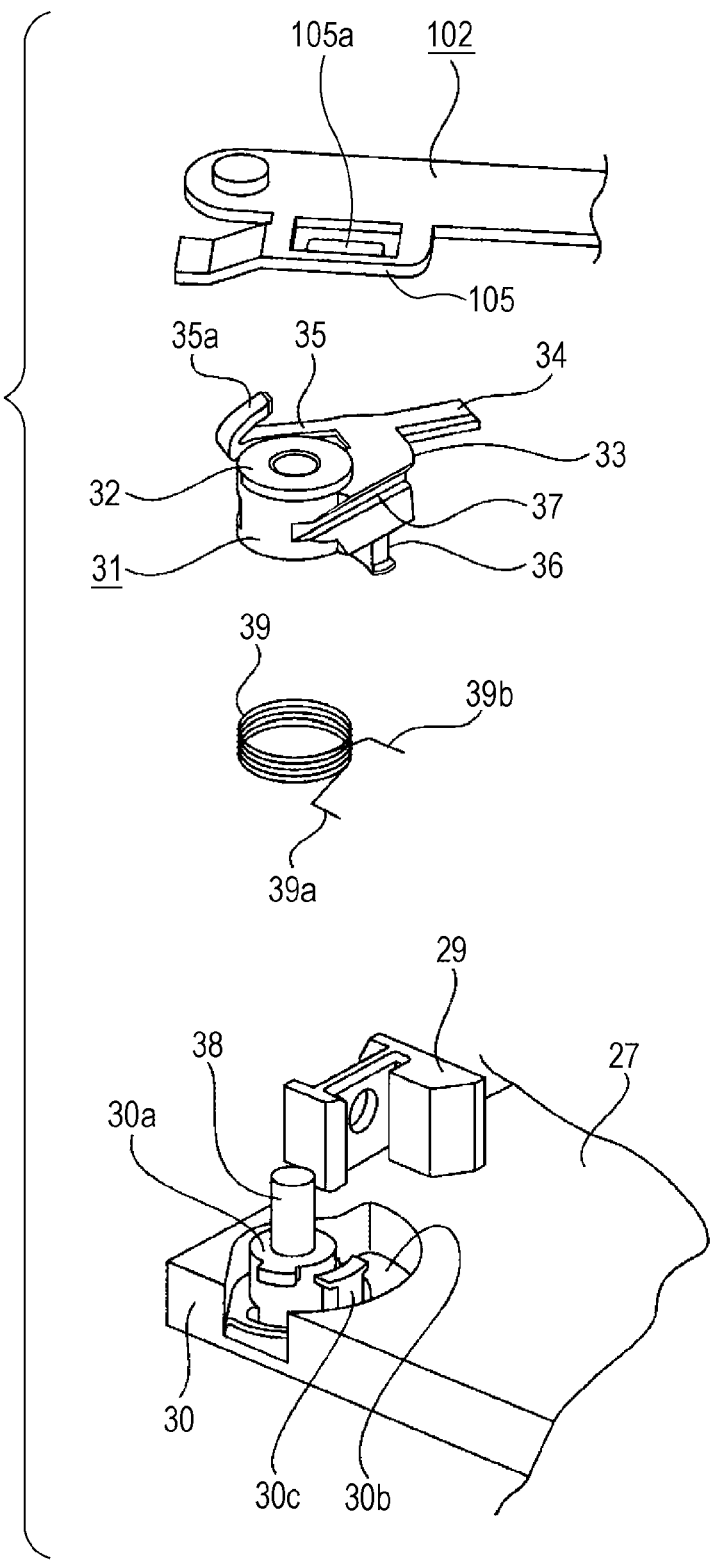
FIG. 13 is an enlarged exploded perspective view illustrating a route adjuster on the left side and a first front side link arm and so forth.
Figure 15:
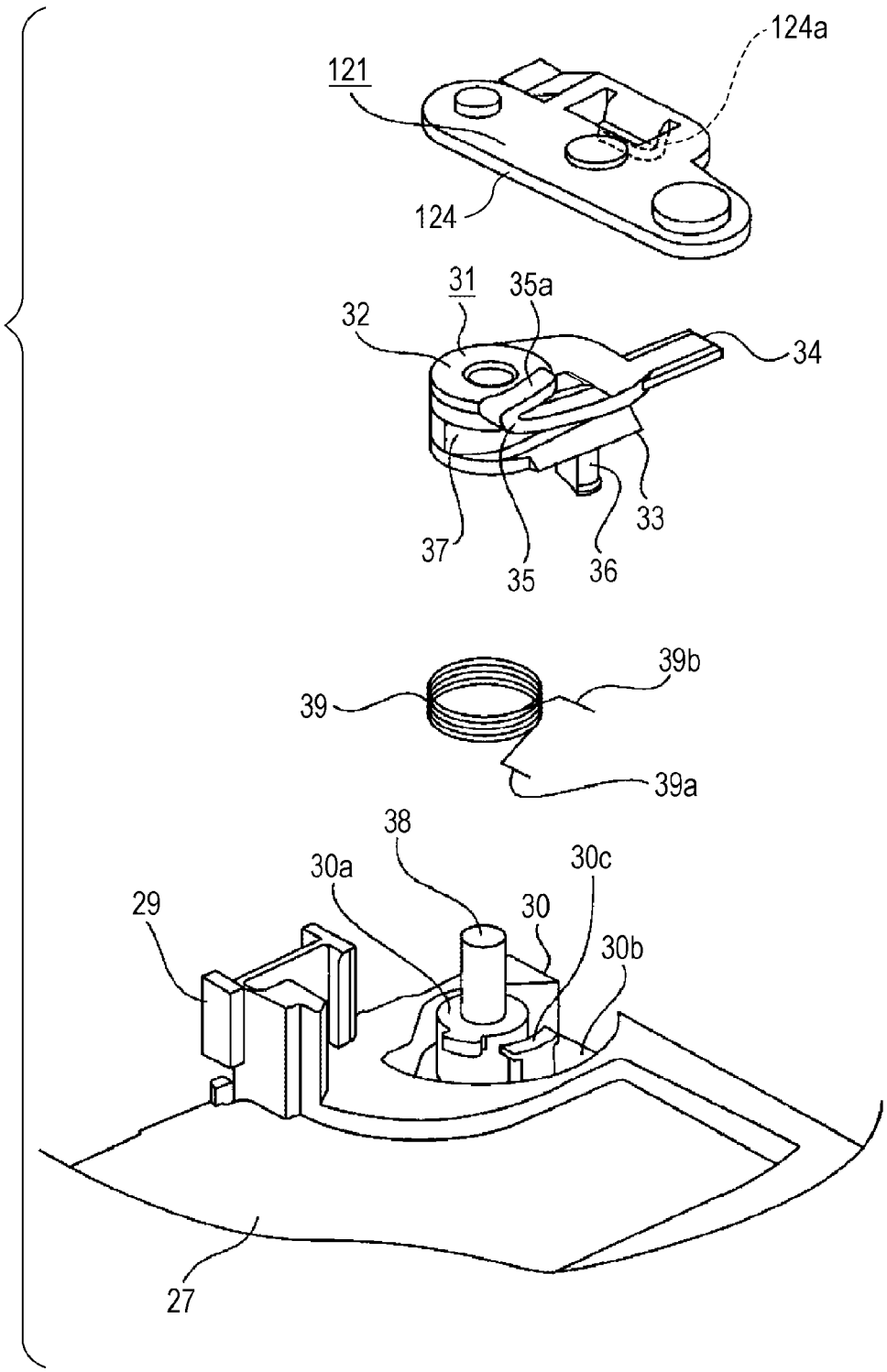
FIG. 15 is an enlarged exploded perspective view illustrating a state viewing a route adjuster on the right side and a second front side link arm and so forth from a different direction from FIG. 14.
Figure 16:
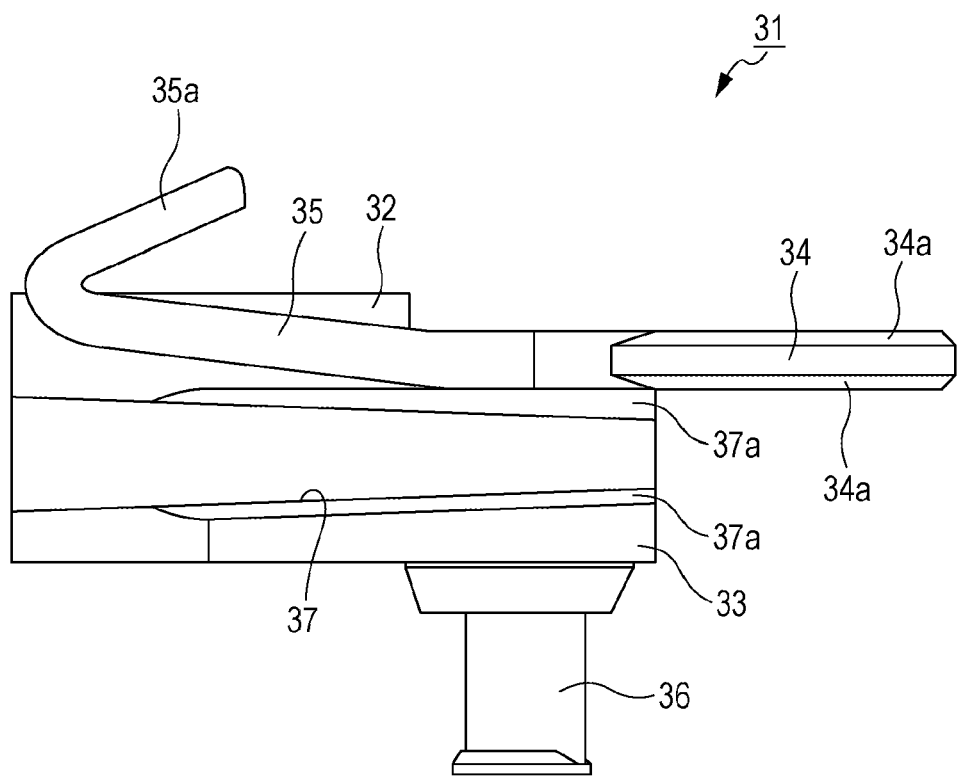
FIG. 16 is an enlarged side face view of a route adjuster.
Figure 17:
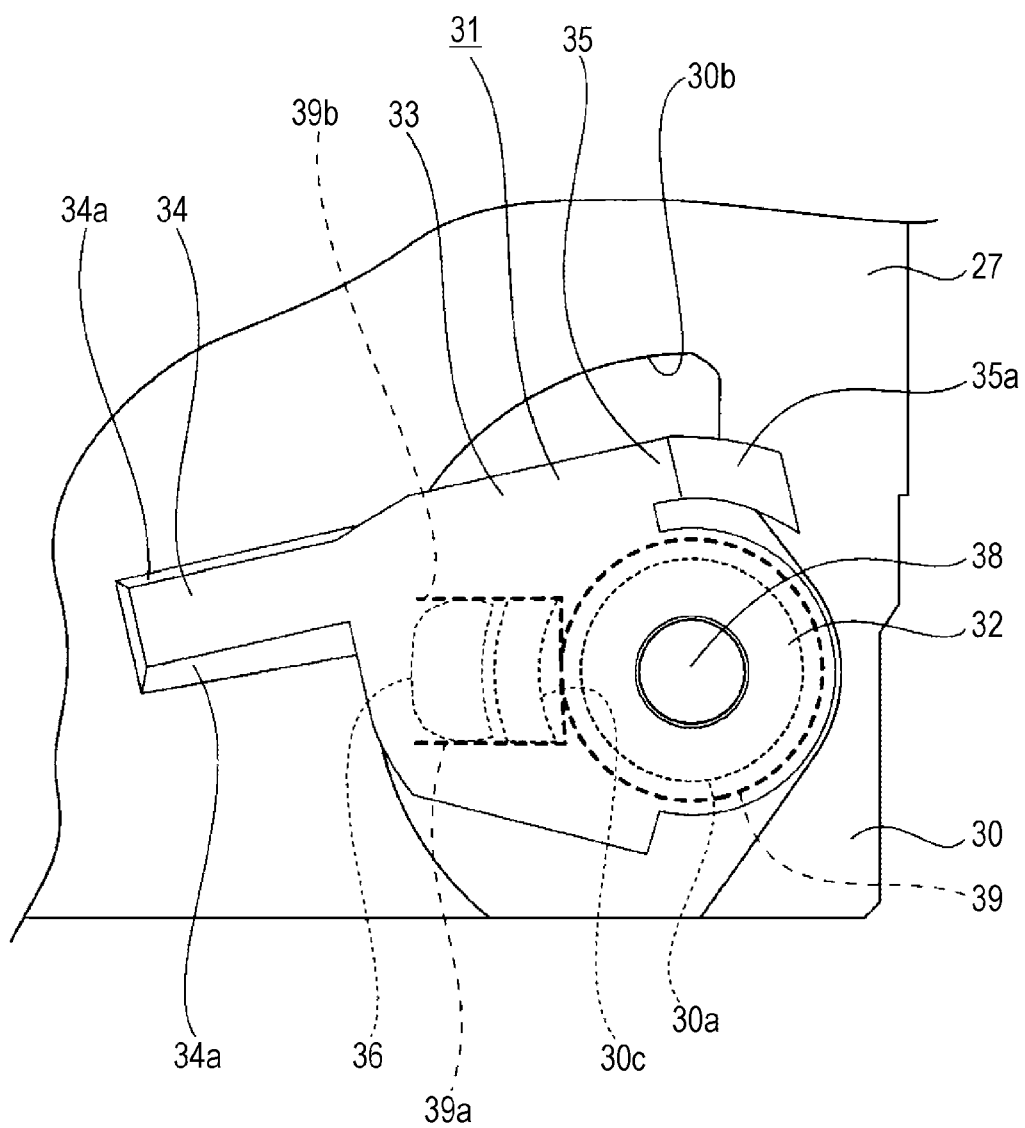
FIG. 17 is a schematic plan view illustrating a state wherein a route adjuster is in a central position, and illustrate the actions of the route adjuster together with FIGS. 18 and 19.

The route adjuster 31 is turnably supported by the adjuster supporter 30 having a supporting shaft 38, attached to the shaft attaching portion 30a, as its fulcrum (see FIGS. 13 through 15). In the state of the route adjuster 31 being supported by the adjuster supporter 30, a return spring 38 is supported on the shaft attaching portion 30a of the adjuster supporter 30 (see FIG. 17). The return spring 38 is a torsion coil spring, for example.

Figure 18:
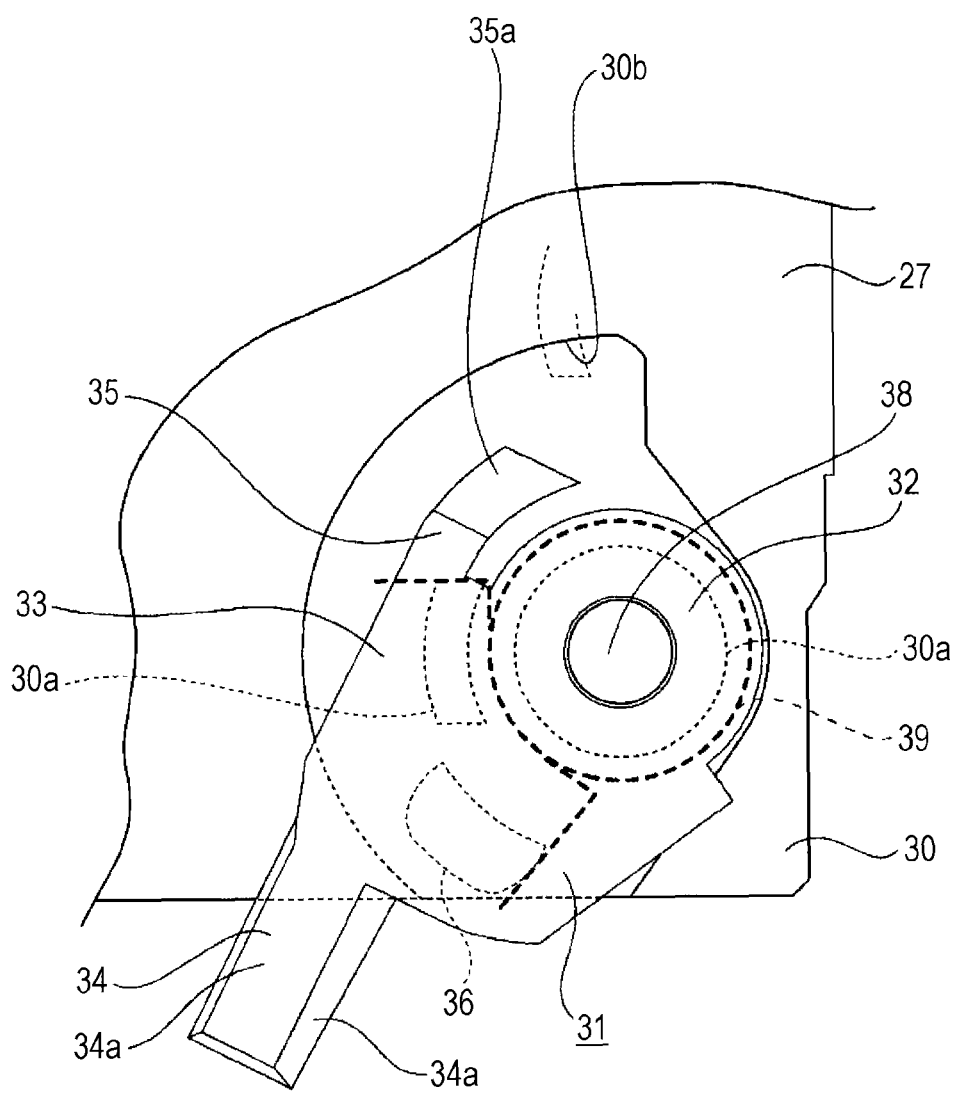
FIG. 18 is a schematic expanded plan view illustrating a state wherein the route adjuster is turned in one direction.
Figure 19:
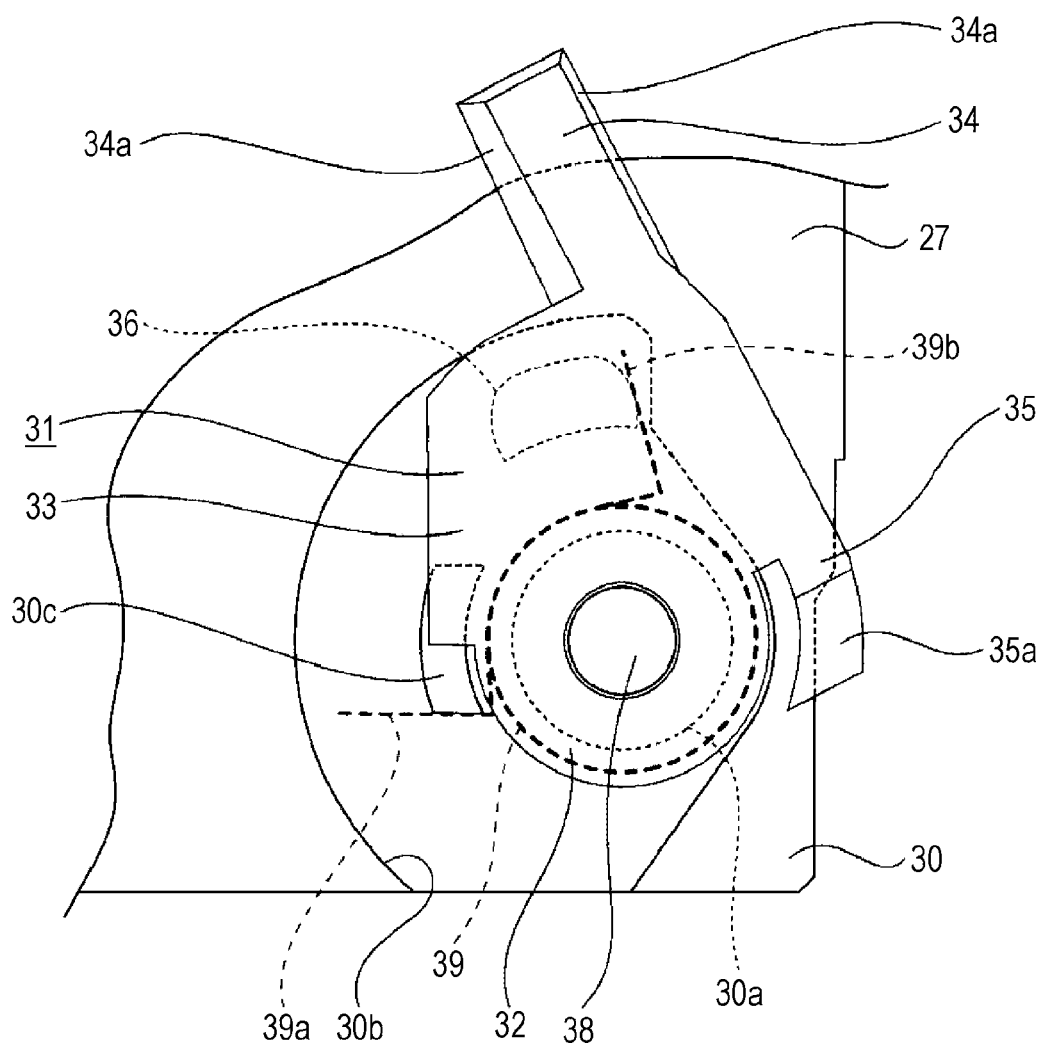
FIG. 19 is a schematic expanded plan view illustrating a state wherein the route adjuster is turned in another direction.

Upon the route adjuster 31 being turned in the direction for the positioning protrusion 34 to move toward the front, an edge portion 39a of the return spring 39 is engaged to the spring engaging portion 36, while the other edge portion 39b of the return spring 39 is engaged to the spring engaging protrusion 30c, and biasing force is applied to the route adjuster 31 by the return spring 39 in the turning direction of the positioning protrusion 34 being moved toward the rear side (see FIG. 18). Conversely, upon the route adjuster 31 being turned in the direction for the positioning protrusion 34 to move toward the rear side, the other edge portion 39b of the return spring 39 is engaged to the spring engaging portion 36, while the one edge portion 39a is engaged to the spring engaging protrusion 30c, and biasing force is applied to the route adjuster 31 by the return spring 39 in the turning direction of the positioning protrusion 34 being moved toward the front side (see FIG. 17). Accordingly, in a state wherein external force is not applied, the route adjuster 31 is held in a neutral position by the return spring 39.

The neutral position of the route adjuster 31 positioned on the left side is the position held in the direction of the positioning protrusion 34 extending to the right, and the neutral position of the route adjuster 31 positioned on the right side is the position held in the direction of the positioning protrusion 34 extending to the left.

Base Chassis

A base chassis 40 is attached to the base plate 26 (see FIG. 7). The base chassis 40 is made up of a first base 41 and a second base 42 that is attached to the front edge side on the upper face of the first base 41. The first base 41 is made of a resin material, for example, and the second base 42 is made of a metallic material, for example.

Figure 20:
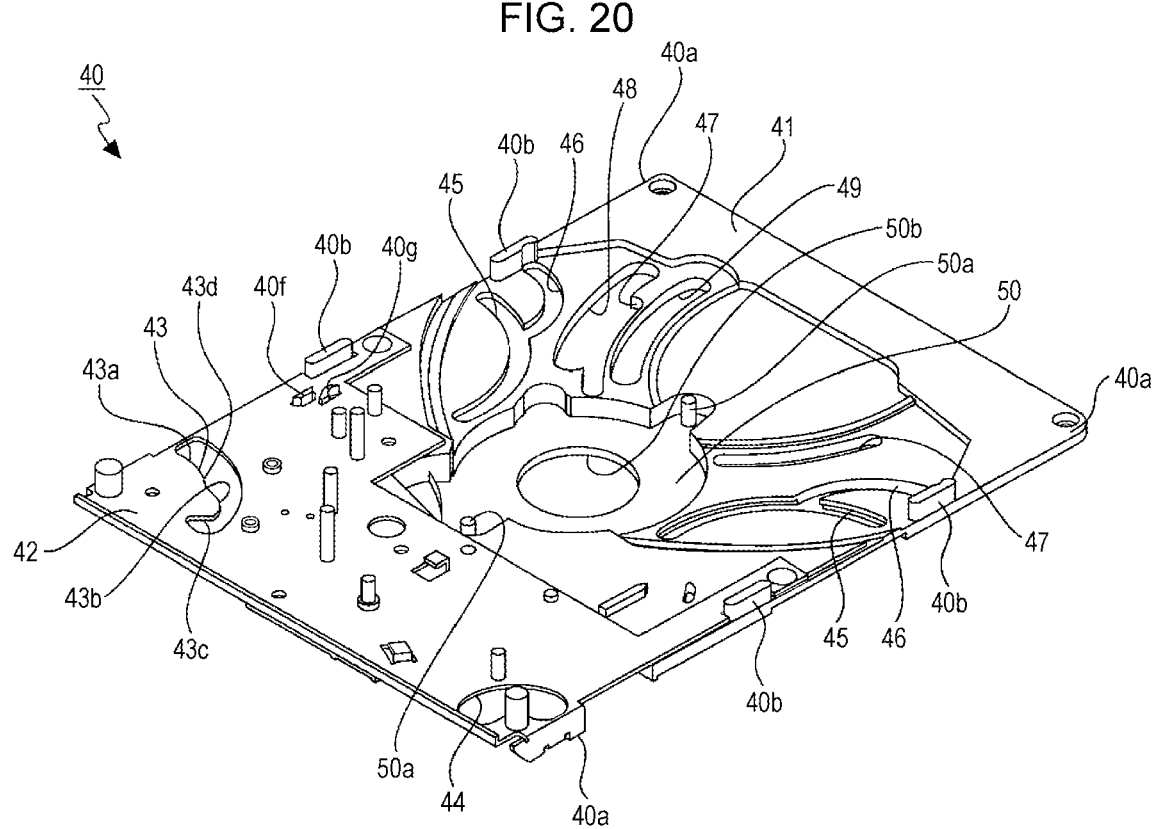
FIG. 20 is a perspective view of a base chassis.

The base chassis 40 is formed having an outline of an erected, roughly rectangular shape, and attachment receiving protrusions 40a are provided to the periphery thereof (see FIG. 20). The attachment receiving protrusions 40a of the base chassis 40 are attached to the attaching protrusions 29 of the base plate 26 with screws or the like, and the base chassis 40 is positioned above the base plate 26.

Guide protrusions 40b that protrude upward are provided, separated to the front and back, on the left and right edges of the base chassis 40.

An operating cam portion 43 is formed on the front edge portion of the left edge portion of the base chassis 40 in a manner passing through vertically. The operating cam portion 43 is made up of a first cam portion 43a that is formed in roughly an arc shape having the left front corner of the base chassis 40 as the center thereof, a second cam portion 43b that is similarly formed in roughly an arc shape having the corner as the center thereof and continuing from the front edge of the cam portion 43a, and a third cam portion 43c that continues from the front edge of the second cam portion 43b and extends to the left and right for a short distance. The first cam portion 43a is wider than the second cam portion 43b, and a stepped edge 43d that faces roughly toward the rear is formed on the continuing portions of the first cam portion 43a and second cam portion 43b.

A gear moving hole 44 is formed on the front edge portion of the right edge portion of the base chassis 40. The gear moving hole 44 is formed in an arc shape having the right front corner of the base chassis 40 as the center thereof.

First shaft moving holes 45 and second shaft moving holes 46 are formed on the left and right edge portions, respectively, in the roughly center portion in the front/back direction of the base chassis 40. The first shaft moving holes 45 and second shaft moving holes 46 are each formed in a protruding arc shape toward the inner side, the center position of which each differs, and the front edge portion of the second shaft moving hole 46 positioned toward the rear side is linked to the middle portion of the first shaft moving hole 45.

Pin moving holes 47 are formed on the inner side of each second shaft moving holes 46 on the base chassis 40. The pin moving holes 47 are formed in a gentle arc shape protruding toward the outer side.

A connecting portion moving hole 48 is formed in a manner continuing to the outer side of the pin moving hole 47 that is positioned on the left side of the base chassis 40. The connecting portion moving hole 48 is formed in an arc shape having the same center as the center of the pin moving hole 47, and is formed in a state linking to the pin moving hole 47.

An action shaft moving hole 49 is formed on the inner side of the pin moving hole 47 that is positioned on the left side of the base chassis 40. The action shaft moving hole 49 is formed in an arc shape having the same center as the center of the pin moving hole 47.

A disposing recess 50 that opens upward is formed on the central portion of the base chassis 40. Supporting pins 50a that protrude upwards are provided to both front and rear edges of the disposing recess 50. A circular table inserting hole 50b is formed in roughly the center of the disposing recess 50.

Sliding protrusions 40c that protrude downward are provided in positions on the front edge side on the lower face of the base chassis 40 in a manner separated to the left and right. The sliding protrusions 40c are formed in an arc shape having the left front angle of the base chassis 40 as the center thereof, and the front edge thereof matches the front edge of the base chassis 40.

Spring supporting shafts 40d that protrude downward from the lower face to positions near each of the left and right edges are provided to the base chassis 40, and spring holding portions 40e are provided to the left and right edge portions. The spring holding portions 40e are positioned near each of the spring supporting shafts 40d.

A locking action protrusion 40f and lock disengaging action protrusion 40g that protrude upward are provided in positions near the left edge of the base chassis 40 (see FIG. 20). The locking action protrusion 40f is positioned somewhat to the front of the lock disengaging action protrusion 40g.

Driving Motor, Gears, Etc.

An attaching plate 51 is attached to the front edge portion on the left edge portion of the base chassis 40 by screws or the like (see FIG. 7). The attaching plate has a motor attaching portion 51a and board attaching portion 51b (see FIG. 22). On the attaching plate 51, a driving motor 52 is attached to the motor attaching portion 51a and a sensor board 53 is attached to the board attaching portion 51b.

The driving motor 52 and sensor board 53 are connected to the circuit board disposed on the floor plate 23 of the base frame 22 by an unshown flexible print wiring plate.

The driving motor 52 is attached to the motor attaching portion 51a in the direction that the output shaft extends in the left and right direction, and a worm 54 is fixed to the output shaft.

Figure 8:
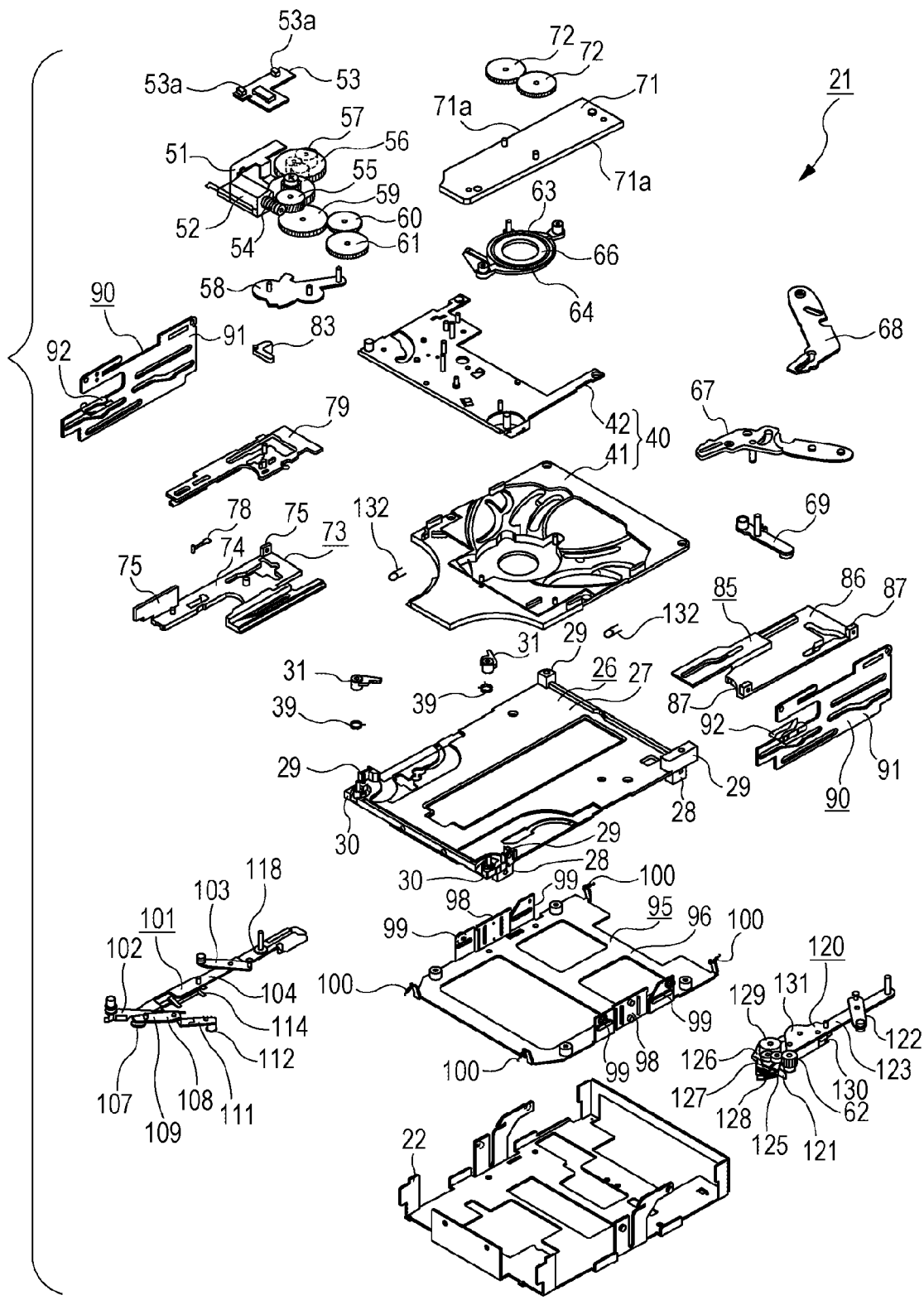
FIG. 8 is an exploded perspective view of the disc conveying device.

Sensors 53a are mounted on the sensor board 53 (FIGS. 7 and 8).

A worm gear 55 and a transmitting gear group 56 are each supported on the upper side of the base chassis 50 (see FIGS. 7, 8, and 22). The worm gear 55 meshes with the worm 54, and the transmitting gear group 56 meshes with the worm gear 55.

A driving gear 57 is supported in a position near the left edge of the base chassis 40, and the driving gear 57 meshes with the final level of the transmitting gear group 56. Accordingly, upon the driving motor 52 being rotated, the driving force thereof is transmitted in sequence to the worm 54, worm gear 55, and the driving gear 57 via the transmitting gear group 56, and the rotations of the driving gear 57 are reduced by the transmitting gear group 56.

A gear supporting plate 58 is turnably supported on the front edge in the center portion in the left/right direction of the base chassis 40. The gear supporting plate 58 is made up of a gear supporting portion 58a, an arm portion 58b that protrudes towards the back from the gear supporting portion 58a, and a sliding pin 58c that protrudes upward from the tip portion of the arm portion 58b.

A first transmitting gear 59 and a switching gear 50 are supported in a meshed state on the gear supporting plate 58. The first transmitting gear 59 is meshed with the worm gear 55.

A second transmitting gear 61 and a third transmitting gear 62 are supported in a meshed state on the right edge portion on the front edge portion of the base chassis 60.

The second transmitting gear 61 is meshed with the switching gear 60 or disengaged from meshing, according to the turning position of the gear supporting plate 58. The third transmitting gear 62 is supported on the right front angle of the base chassis 60.

Upon the driving motor 52 being rotated while the second transmitting gear 61 is meshed with the switching gear 60, the driving force thereof is transmitted in sequence to the worm 54, worm gear 55, first transmitting gear 59, switching gear 60, and the third transmitting gear 62 via the second transmitting gear 61.

Pulley Holder and Chucking Pulley

Figure 9:
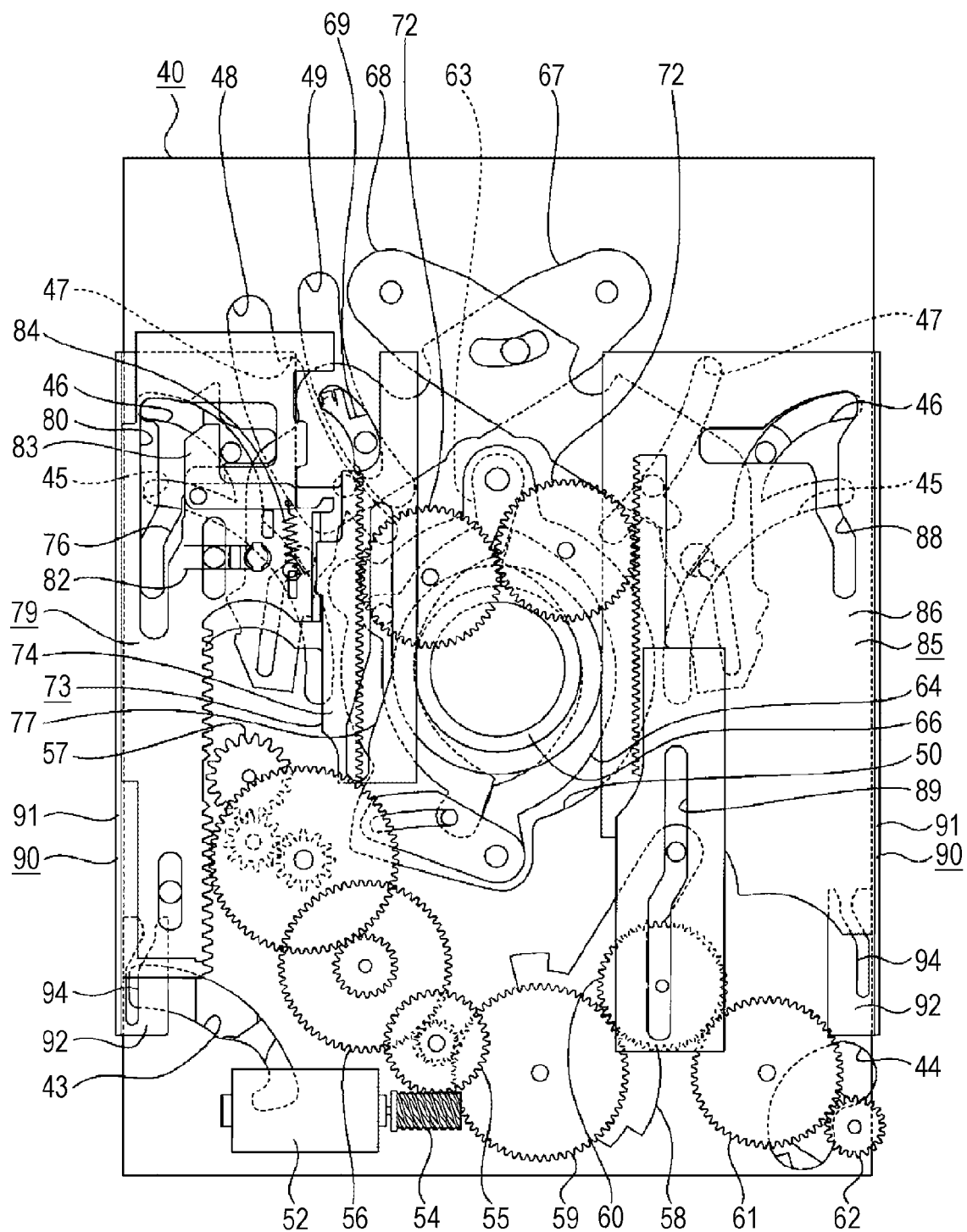
FIG. 9 is a schematic plan view illustrating the members primarily disposed on the upper side of a base chassis.

A first pulley holder 63 and second pulley holder 64 are disposed in a disposing recess 50 of the base chassis 40 (see FIGS. 8 and 9).

Figure 23:
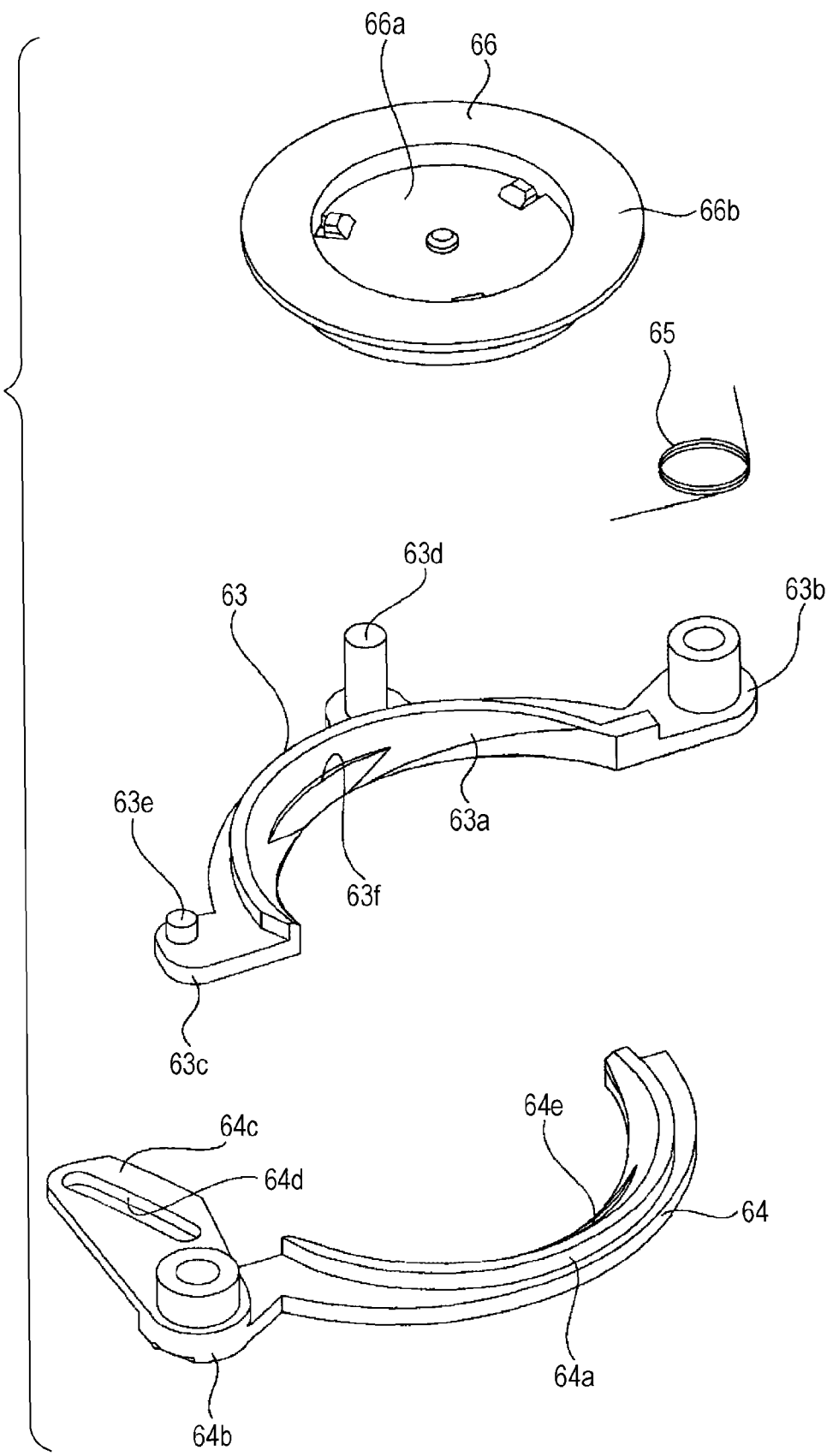
FIG. 23 is an enlarged exploded perspective view illustrating a pulley holder and a chucking pulley.
Figure 24:
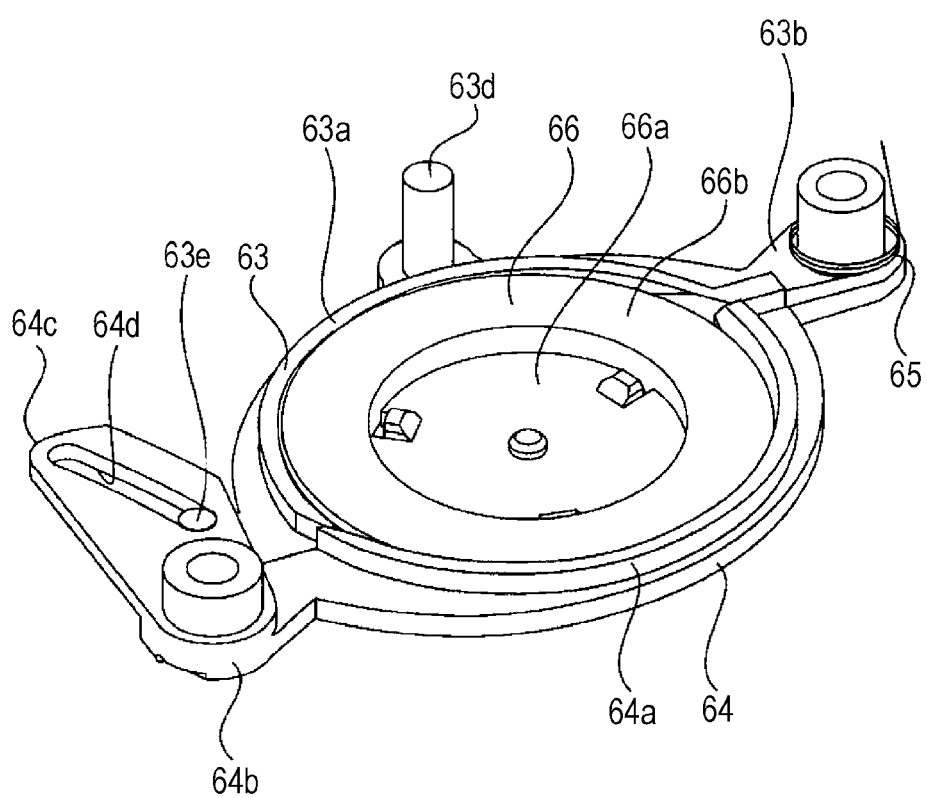
FIG. 24 is an enlarged perspective view illustrating a chucking pulley being held by a pulley holder.

The first pulley holder 63 is made up of a holding portion 63*a* that is formed in a semi-circle arc protruding toward the left side, a support receiving portion 63*b* that protrudes backward from the rear edge portion of the holding portion 63*a*, and a connecting portion 63*c* that protrudes frontward from the front edge portion of the holding portion 63*a* (see FIGS. 23 and 24). A slave pin 63*d* that protrudes upward is provided to the center portion of the holding portion 63*a*, and a connecting pin 63*e* that protrudes upward is provided to a connecting portion 63*c*. The holding portion 63*a* is formed in an inverse conical shape that slopes downward, excluding the periphery portion. A stepped portion 63*f* is formed on the upper face of the center portion in the lengthwise direction of the holding portion 63*a*.

The second pulley holder 64 is made up of a holding portion 64*a* that is formed in a semi-circle arc having the concave portion toward the right side, a support receiving portion 64*b* that protrudes frontward from the front edge portion of the holding portion 64*a*, and a connecting portion 64*c* that protrudes sideways from the support receiving portion 64*b*. A connecting hole 64*d* that is formed in a gentle arc shape is formed on the connecting portion 64*c*. The holding portion 64*a* is formed in an inverse conical shape that slopes downward, excluding the periphery portion. A stepped portion 64*e* is formed on the upper face of the center portion in the lengthwise direction of the holding portion 64*a*.

The first pulley holder 63 has one supporting pin 50*a* provided to the disposing recess 50 that is inserted in the support receiving portion 63*b*, and is turnable having the one support pin 50*a* as the fulcrum in the disposing recess 50.

The second pulley holder 64 has the other supporting pin 50*a* provided to the disposing recess 50 that is inserted in the support receiving portion 64*b*, and is turnable having the other support pin 50*a* as the fulcrum in the disposing recess 50.

The connecting pin 63*e* of the first pulley holder 63 is inserted in the connecting hole 64*d* of the second pulley holder 64*d* so as to be slidably engaged, whereby the second pulley holder 64 is turned according to the turning action of the first pulley holder 63. The first pulley holder 63 and second pulley holder 64 synchronously turn in the direction that the holding portions 63*a* and 64*b* attach and separate. In a state of the first pulley holder 63 and second pulley holder 64 being supported by supporting pins 50*a*, a torsion coil spring 65 is supported between one of the supporting pins 50*a* and the first pulley holder 63, whereby biasing force is applied to the first pulley holder 63 and second pulley holder 64 in the direction that the holding portions 63*a* and 64*b* approach each other.

A chucking pulley is held by the first pulley holder 63 and second pulley holder 64. The chucking pulley is formed of a magnetic material, and has a mounted part 66*a* having an externally round shape, and a flange portion 66*b* that is flared outward from the mounted part 66*a*.

Figure 25:
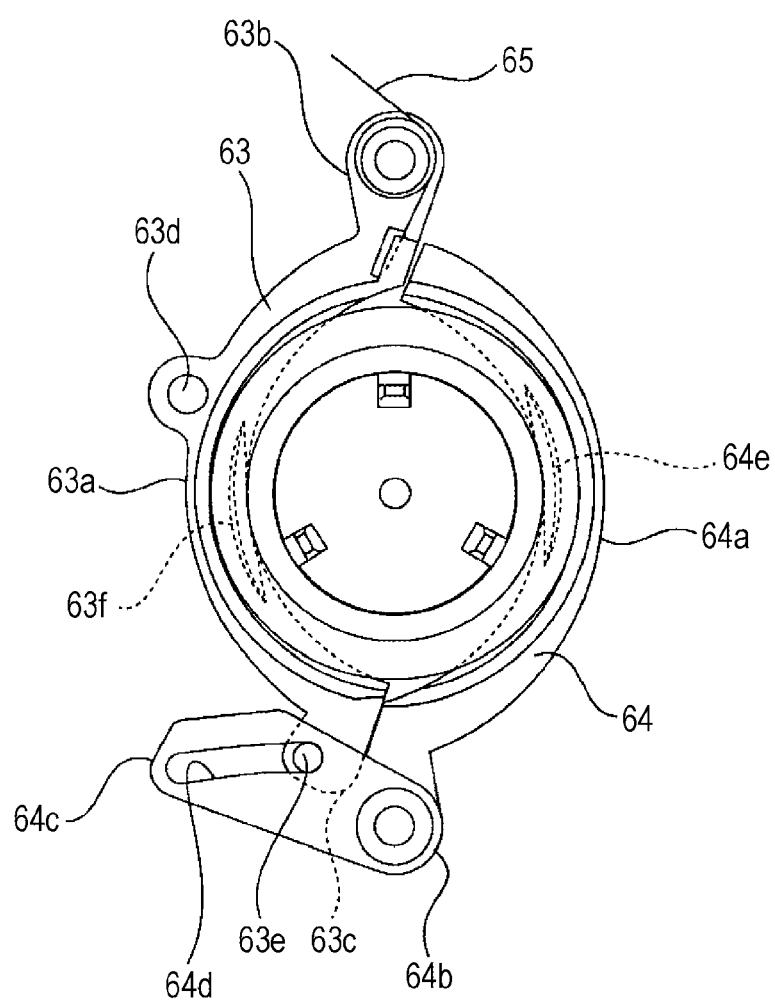
FIG. 25 is a plan view illustrating a state wherein a first pulley holder and second pulley holder are closed.
Figure 26:
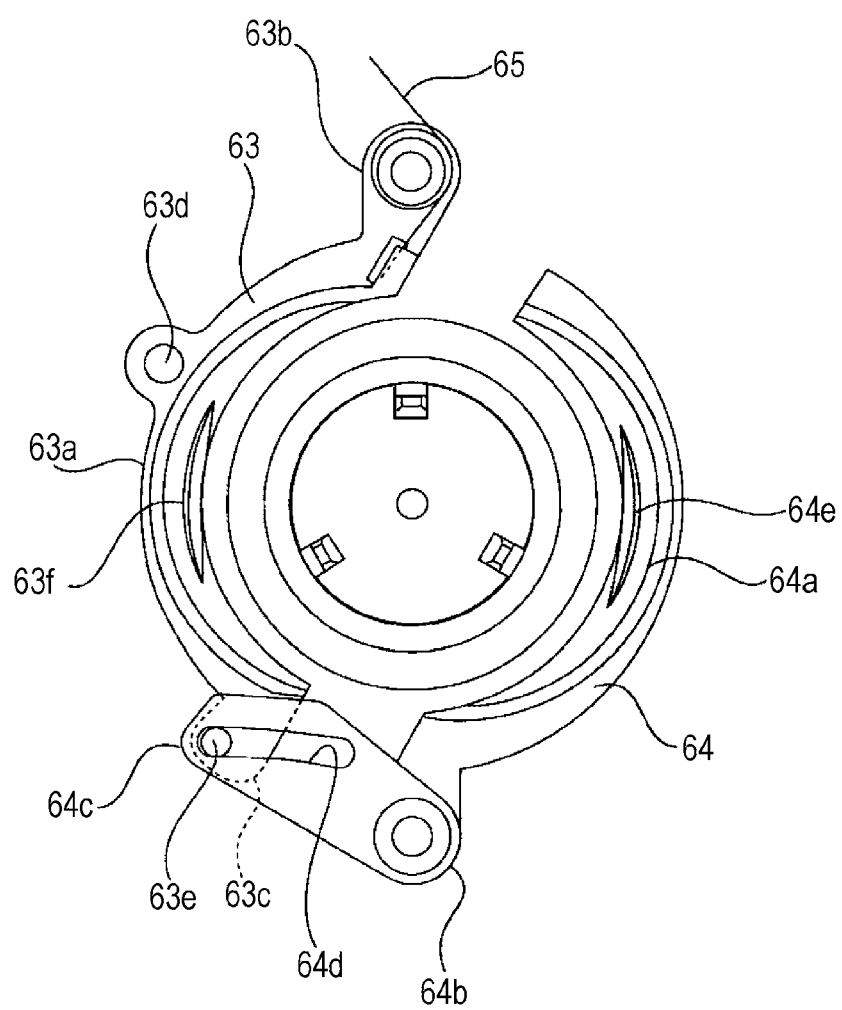
FIG. 26 is a plan view illustrating a state wherein a first pulley holder and second pulley holder are open.

The chucking pulley 66 is held in a state of being held up upwards by the holding portion 63*a* of the first pulley holder 63 and the holding portion 64*a* of the second pulley holder 64 being positioned on the lower side of the flange portion 66*b* (see FIGS. 24 and 25). The chucking pulley is turned from the state of being held, in the direction of the first pulley holder 63 and second pulley holder 64 separating against the bias force of the coil spring 65, and the holding portions 63*a* and 64*a* open and are positioned outside the flange portion 66*b*, whereby the holding state of the first pulley holder 63 and second pulley holder 64 as to the chucking pulley 66 is disengaged, and the chucking pulley 66 is in a state that can be moved downward (see FIG. 26).

Note that stepped portions 63*f* and 64*e* are formed on the first pulley holder 63 and second pulley holder 64, respectively, and as the holding portions 63*a* and 64*a* of the first pulley holder 63 and second pulley holder 64 separate, the chucking pulley 66 moves downwards, the process during which the flange portion 66*b*, when sloping as to a horizontal state, engages with one of the stepped portions 63*f* and 64*e*, and movement is restricted in the state of the chucking pulley 66 sloping. While in the state of movement being restricted while in a sloped state, the holding portions 63*a* and 64*a* continue to separate, the chucking pulley 66 moves until the flange portion 66*b* engages with both stepped portions 63*f* and 64*a*, and is in a horizontal state. Accordingly, when the holding portions 63*a* and 64*a* further separate, the chucking pulley moves downward in a horizontal state, whereby movement of the chucking pulley 66 is performed in an appropriate direction.

Interlocking Lever

Figure 10:
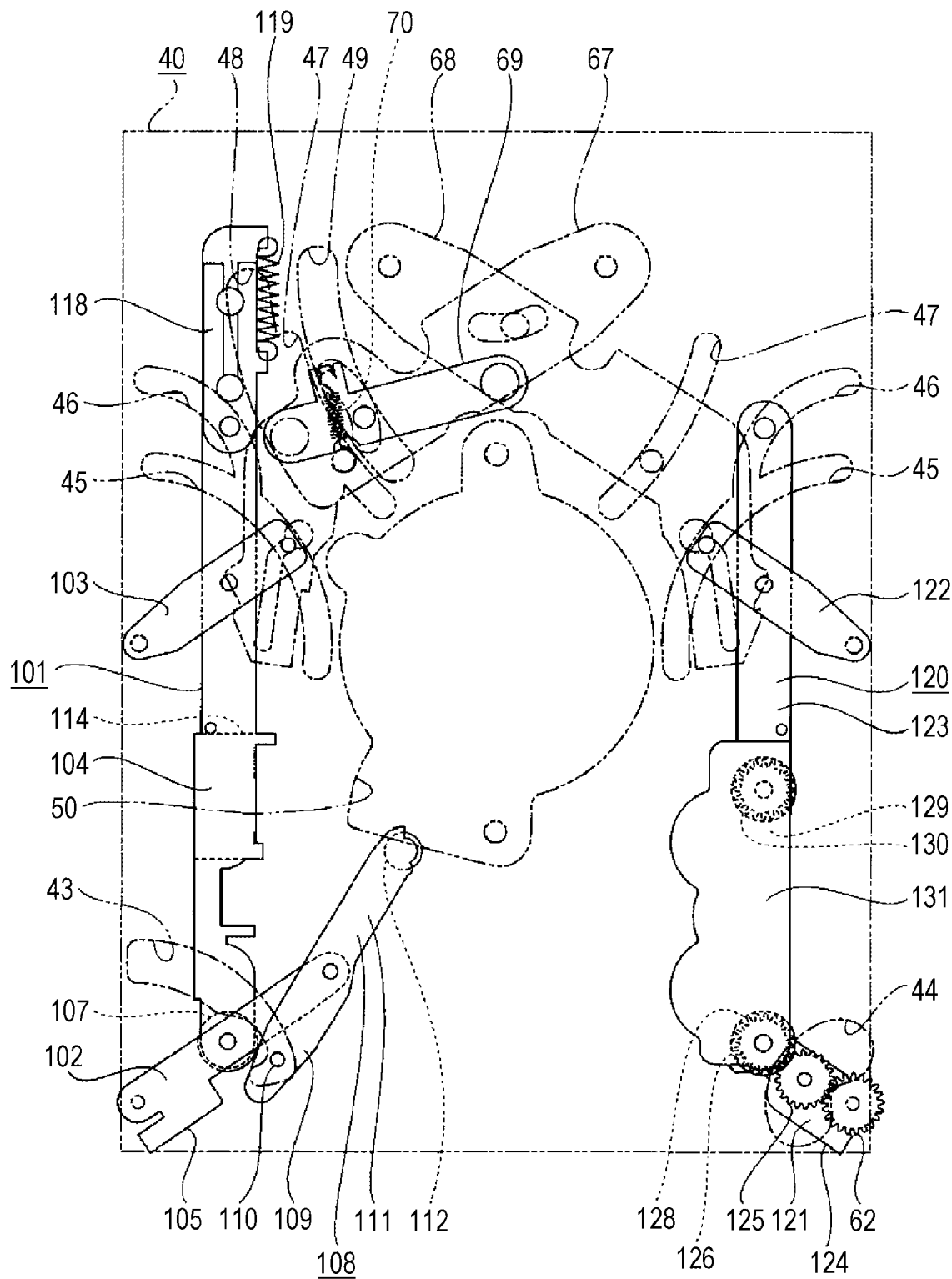
FIG. 10 is a schematic plan view illustrating the members primarily disposed on the lower side of the base chassis.

A first interlocking lever 67 and second interlocking lever 68 are movably supported in the state of being connected in positions near the rear edge on the front face of the base chassis 40 (see FIGS. 8 through 10).

Figure 27:
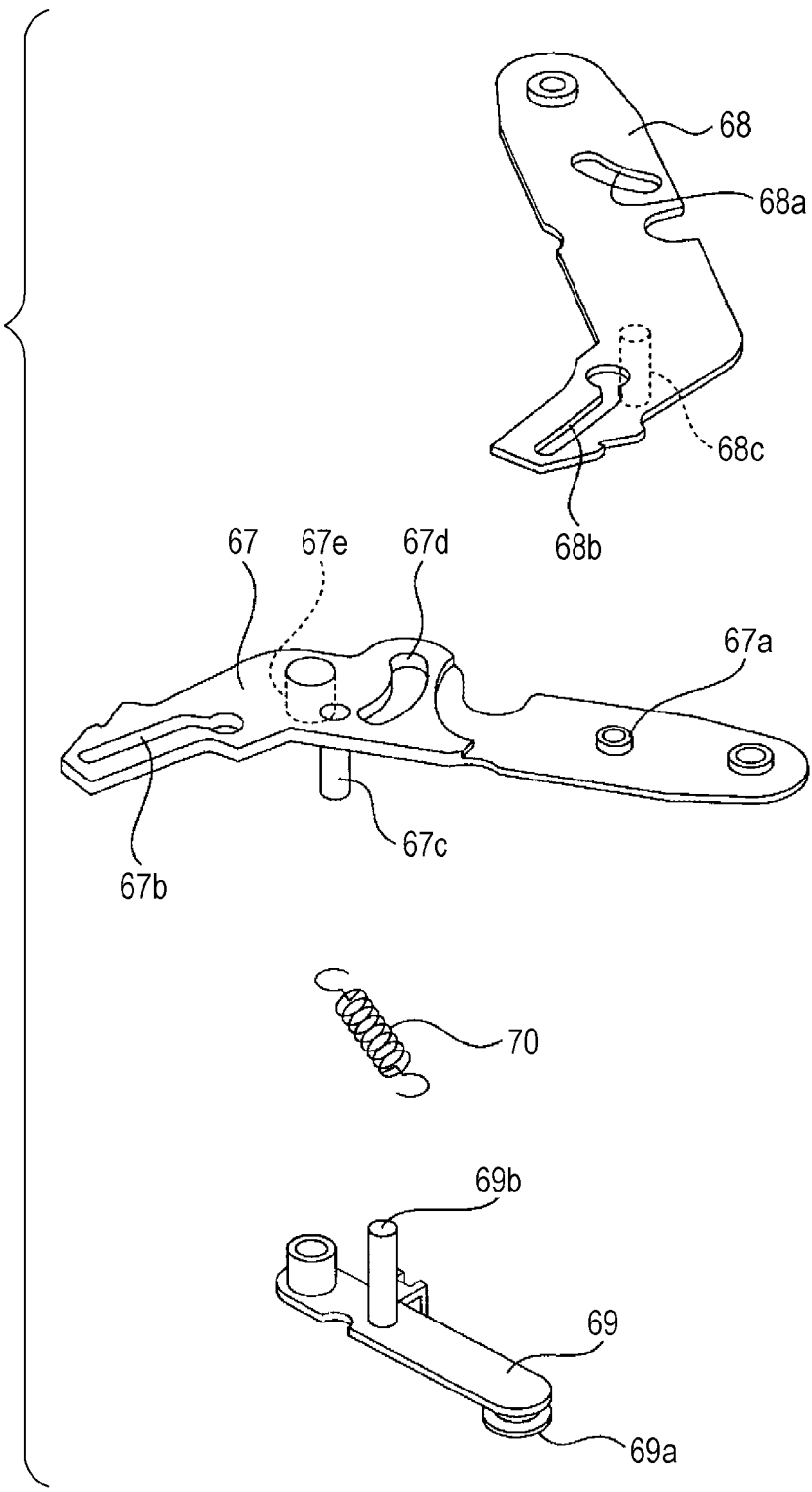
FIG. 27 is an exploded perspective view illustrating an interlocking lever and a starting level.

The first interlocking lever 67 is formed as a plate facing the up/down direction, and is in a dogleg shape protruding behind in the left diagonal direction (see FIG. 27). A connecting shaft 67*a* that protrudes upward in a position near the right edge is provided to the first interlocking lever 67, an arc-shaped engaging hole 67*b* is formed on the left edge portion, and a disc holding pin 67*c* protruding downward is provided to the right side of the engaging hole 67*b*. An arc-shaped shaft inserting hole 67*d* is formed in roughly the center portion in the left/right direction of the first interlocking lever 67, and a supporting axis 67*e* protruding downward is provided between the engaging hold 67*b* and shaft inserting hole 67*d*.

The right edge portion of the first interlocking lever 67 is turnably supported by the base chassis 40.

The second interlocking lever 68 is formed as a plate facing the up/down direction, and is in a dogleg shape protruding behind roughly in the right diagonal direction. The second interlocking lever 68 has an arc-shaped connecting hole 68*a* formed at a position near the left edge, and roughly an arc-shaped connecting hole 68*b* formed on the right edge portion. A disc holding pin 68*c* protruding downward near the engaging hole 68*b* is provided to the second interlocking lever 68.

The left edge portion of the second interlocking lever 68 is turnably supported by the base chassis 40.

The connecting shaft 67a of the first interlocking lever 67 is inserted in the connecting hold 68a of the second interlocking lever 68 so as to be slidably engaged, and the first interlocking lever 67 and second interlocking lever 68 are synchronously turned having the right edge portion and left edge portion, respectively, as the fulcrum. The disc holding pins 67c and 68c of the first interlocking lever 67 and second interlocking lever 68 are each inserted into the pin moving holes 47 of the base chassis 40 and protrude downward from the base chassis 40.

The supporting shaft 67e of the first interlocking lever 67 is inserted in the connecting portion moving hole 48 of the base chassis 40 and protrudes downward. A starting lever 69 is turnably supported by the supporting shaft 67e of the first interlocking lever 67 (see FIG. 10 and FIG. 27).

The starting lever 69 is positioned on the lower face side of the base chassis 40. The starting lever 69 is formed to be long in one direction, and has a pressed shaft 69a that protrudes downward toward an edge portion. The other edge portion of the starting lever 69 is the turning fulcrum as to the first interlocking lever 67. An action shaft 69b that protrudes upward is provided in a position near the turning fulcrum of the starting lever 69, and the action shaft 69b is inserted through the action shaft moving hole 49 of the base chassis 40 and the shaft inserting hole 67d of the first interlocking lever 67 and protrudes upwards.

A coil spring 70 is supported between the starting lever 69 and the disc holding pin 67c of the first interlocking lever 67, and bias force is applied to the starting lever 69 by the coil spring 70 in the turning direction for the pressed shaft 69a to move forward.

Cover Plate

A cover plate 71 is attached from above by screws or the like in the center portion in the left/right direction of the first base portion 41 of the base chassis 40 (see FIGS. 7 and 8). The cover plate 71 is formed having an erected, roughly rectangular shape, and the first pulley holder 63, second pulley holder 64, chucking pulley 66, a portion of the first interlocking lever 67, and a portion of the second interlocking lever 68 are closed off from above by the cover plate 71. Both the left and right edge portions of the cover plate 71 are provided as guide portions 71a.

Synchronizing Gear

Synchronizing gears 72 are supported in a meshed state on the upper face side of the cover plate 71.

First Main Slider

A first main slider 73 is movably supported in the front/back direction on the left edge portion on the upper face of the base chassis 40 (see FIGS. 7 through 9).

Figure 28:
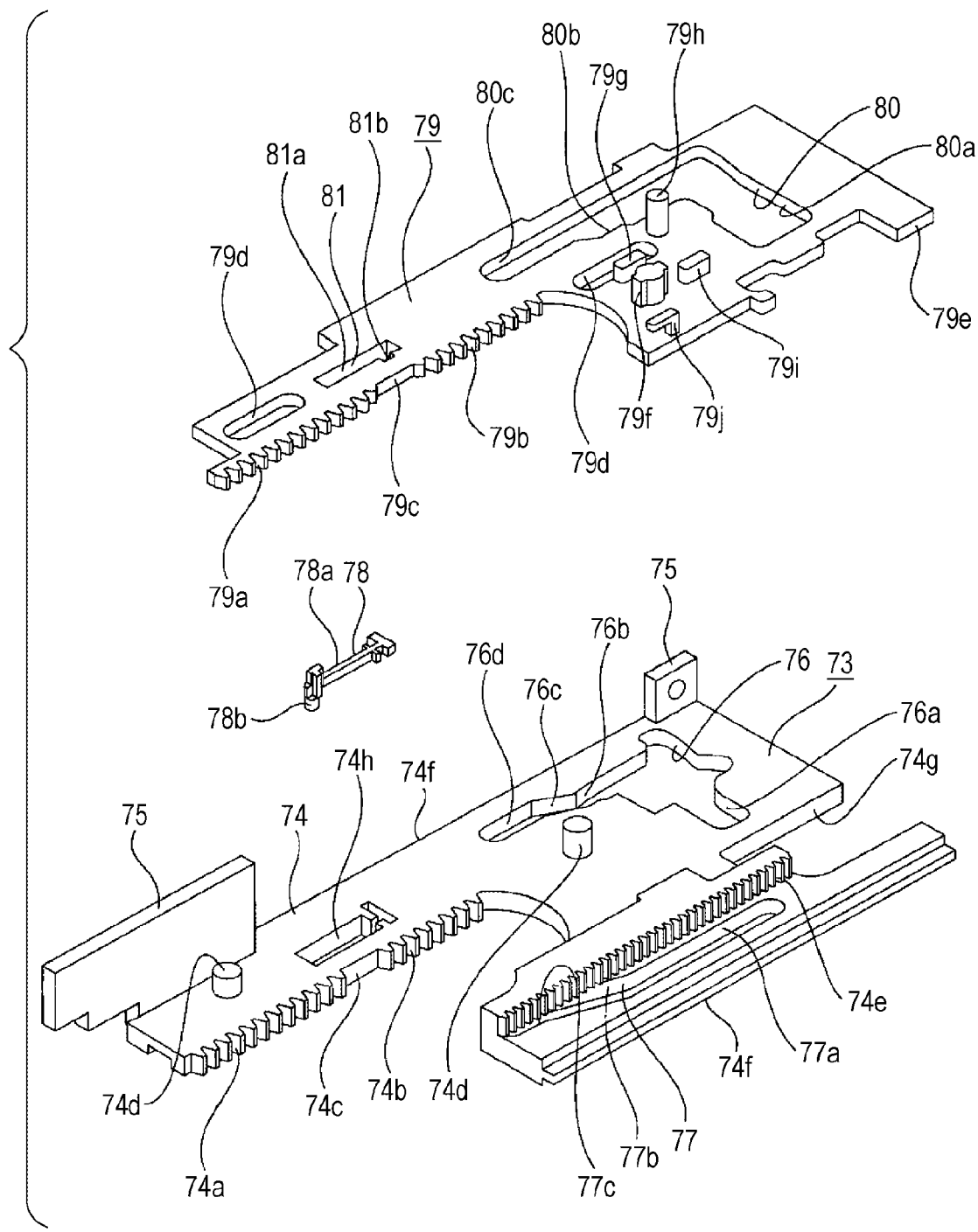
FIG. 28 is an exploded perspective view illustrating a first main slider and sub slider.
Figure 29:
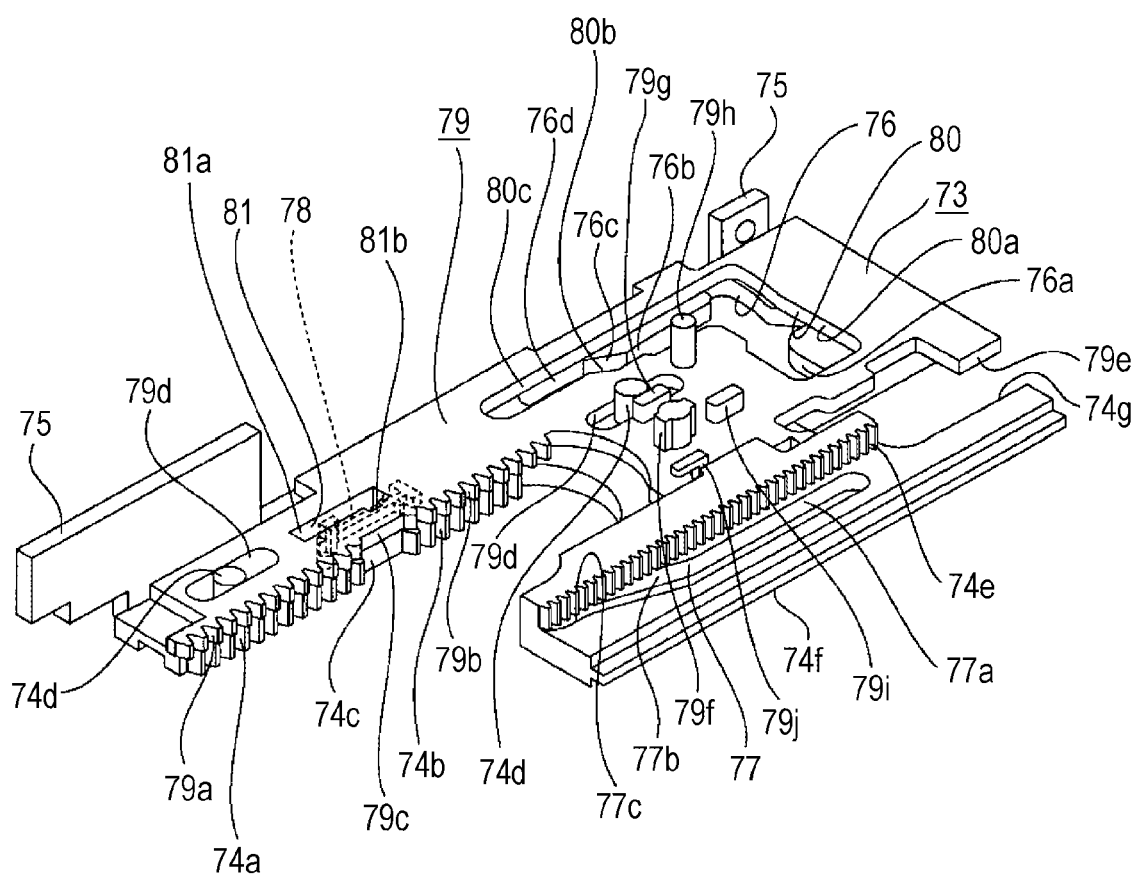
FIG. 29 is a perspective view illustrating the first main slider and sub slider.
Figure 30:
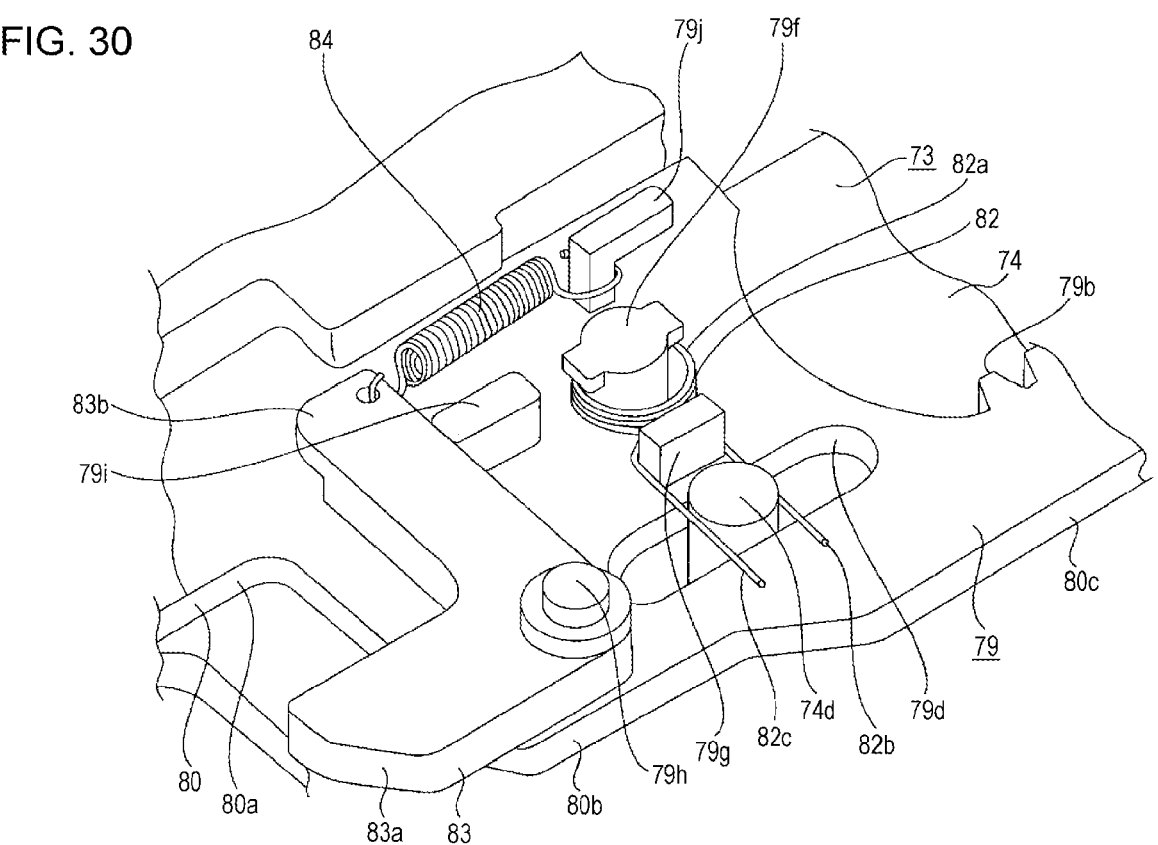
FIG. 30 is an enlarged perspective view illustrating a portion of the sub slider and an operating lever and so forth.
Figure 31:
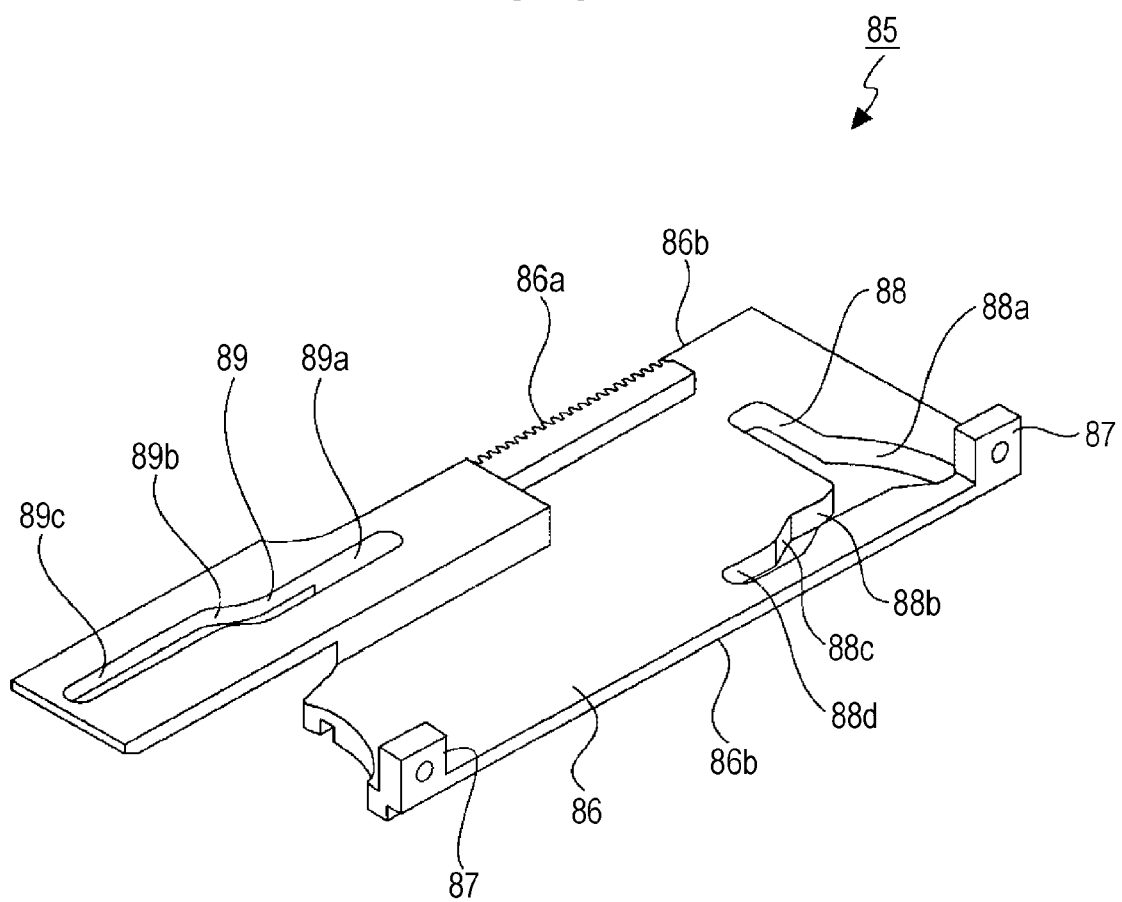
FIG. 31 is a perspective view illustrating a second main slider.

The first main slider 73 has a plate-shaped sliding portion 74 that faces in the up/down direction and connecting portions 75 that each protrude upward from both the front and back edge portions on the left edge portion of the sliding portion 74 (see FIGS. 28 and 29).

A first main rack portion 74a and a second main rack portion 74b that face the right, in a manner separated front and back, on the front half portion on the left edge portion of the sliding portion 74, and the portion between the first main rack portion 74a and second main rack portion 74b is formed as a non-rack portion 74c.

Supporting pins 74d that are separated front and back, and protrude upward are provided to the sliding portion 74. A connecting rack portion 74e that faces the right in a position near the right edge is provided to the sliding portion 74, and guide receiving portions 74f that extend front to back are provided on each of the left and right edge portions. An inserting notch 74g that is opened to the rear is formed on the rear edge portion in a position near the right edge of the sliding portion 74.

A cam hole 76 is formed in a position near the rear edge on the left edge portion of the sliding portion 74. The cam hole 76 is made up of a waiting portion 76a having a large open area, a first straight line portion 76b that continues to the front edge on the left edge portion of the waiting portion 76a and extends front to back, a sloping portion 76c that continues to the front edge of the first straight line portion 76b and is sloped so as to move towards the left as movement is made closer to the front edge, and a second straight line portion 76d that continues to the front edge of the sloping portion 76c and extends front to back.

A cam supporting hole 77 is formed between the connecting rack portion 74e and the guide receiving portion 74f on the right side, on the sliding portion 74. The cam supporting hole 77 is made up of a rear side portion 77a that extends front to back, an intermediate portion 77b that continues to the front edge of the rear side portion 77a and is sloped so as to be displaced towards the left as movement is made closer to the front, and a front side portion 77c that continues to the front edge of the intermediate portion 77b and extends front to back.

A lever action hole 74h that extends front to back is formed in a position near the front edge of the sliding portion 74.

A locking lever 78 that is disposed in the lever action hole 74h is attached to the sliding portion 74. The locking lever 78 is made up of a elastic deformation portion 78a that extends front to back and a locking portion 78b that protrudes to the right from the front edge side of the elastic deformation portion 78a, and the rear edge portion of the elastic deformation portion 78a is attached to the sliding portion 74. Accordingly, the elastic deformation portion 78a is elastically deformed and the locking lever 78 is operated in the lever action hole 74h.

On the first main slider 73, the guide receiving portions 74f are guided by the guide protrusions 40b provided on the left edge portion of the base chassis 40 and the guide portions 71a on the left side of the cover plate 71, and are movably supported in the front/back direction of the base chassis 40.

In a state wherein the first main slider is supported by the base chassis 40, the connecting rack portion 74e is meshed with the synchronizing gear 72 on the left side (see FIG. 7). Accordingly, the synchronizing gears 72 turn according to the movement in the front/back direction of the first main slider 73.

Also, in a state wherein the first main slider 73 is supported by the base chassis 40, the slave pin 63d provided to the first pulley holder 63 is inserted into the cam supporting hole 77.

Sub Slider

A sub slider 79 is movably supported in the front/back direction on the first main slider 73 (see FIGS. 7 through 9).

The sub slider 79 is formed in a plate shape facing the up/down direction, and a first sub rack portion 79a and a second sub rack portion 79b that face the right, in a manner separated front and back, are provided on the front half portion on the left edge portion of the sub slider 79 (see FIGS. 28 and 29). The portion between the first sub rack portion 79a and second sub rack portion 79b is formed as a non-rack portion 79c.

The pitch of the first sub rack portion 79a and second sub rack portion 79b of the sub slider 79 is the same as the pitch of the first main rack portion 74a and second main rack portion 74b, and the distance in the front/back portion of the non-rack portion 79c is the same as the distance in the front/back portion of the non-rack portion 74c.

Supported holes 79d that are separated front to back and extend front to back are formed on the sub slider 79. An action protrusion 79e that protrudes to the right is provided to the rear edge portion of the sub slider 79.

A spring support protrusion 79f and spring engaging protrusion 79g that protrude upward are provided in the roughly center portion in the front/back direction of the sub slider 79. The spring support protrusion 79f is positioned to the right of the supported hole 79d at the rear side, and the spring engaging protrusion 79g is positioned between the spring support protrusion 79f and the supported hole 79d on the rear side.

A lever support pin 79h that protrudes upward toward the rear of the supported hole 79d on the rear side is provided to the sub slider 79. A turn-restricting protrusion 79i that protrudes upward on the rear of the spring support protrusion 79f is provided to the sub slider 79. A spring hooking protrusion 79j that protrudes upward in the opposite direction from the spring engaging protrusion 79g is provided to the sub slider 79, sandwiching the spring support protrusion 79f therebetween.

A cam action hole 80 is formed in a position near the rear edge on the left edge portion on the sub slider 79. The cam action hole 80 is made up of a waiting portion 80a having a large open area, a rear side straight line portion 80b that continues to the front edge on the left edge portion of the waiting portion 80a and extends front to back, and a front side straight line portion 80d that continues to the front edge of the rear side straight line portion 80b and extends front to back. The horizontal width of the rear side straight line portion 80b is greater than the horizontal width of the front side straight line portion 80c.

A lever inserting hole 81 is formed in a position near the front edge of the sub slider 79. The lever inserting hole 81 is made up of an inserting portion 81a that extends front to back and a recessed lever engaging portion 81b that is open towards the left, wherein the lever engaging portion 81b is linked to the portion near the rear edge of the inserting portion 81a.

A position control spring 82 is supported by the spring support protrusion 79f of the sub slider 79. The position control spring 82 is a torsion coil spring, and the coil portion 82a is supported by the spring supporting protrusion 79f, one edge portion 82b is positioned on the front side of the spring engaging protrusion 79g, and the other edge portion 82c is positioned on the rear side of the spring engaging protrusion 79g.

A supporting pin 74d of the first main slider 73 inserted into the supported hole 79d on the rear side is positioned between the one edge portion 82b and other edge portion 82c on the position control spring 82.

An L-shaped action lever 83 is turnably supported by the lever support pin 79h of the sub slider 79. The action lever 83 is made up of a first portion 83a that extends roughly in the front/back direction and a second portion 83b that extends roughly in the left/right direction, and the portion connecting to the first portion 83a and second portion 83b are supported by the lever supporting pin 79h.

A portion of the first portion 83a of the action lever 83 is positioned on the upper side of the waiting portion 80a of the cam action hole 80. A pulling coil spring 84 is supported between the second portion 83b of the action lever 83 and the spring hooking protrusion 79j. Accordingly, the action lever 83 is biased toward the direction of the second portion 83b moving toward the front, and the second portion 83b touches the turn-restricting portion 83i, whereby the turning as to the sub slider 79 is restricted.

The sub slider 79 is movably supported in the front/back direction by the first main slider 73, by the supporting pins 74d being inserted into the supported holes 79d from the bottom (see FIG. 29).

In a state wherein the sub slider 79 is supported on the first main slider 73, the locking lever 78 attached to the first main slider 83 is inserted into the lever inserting hole 81.

Second Main Slider

A second main slider is movably supported in the front/back direction on the right edge portion on the upper face of the base chassis 40 (see FIGS. 7 through 9).

The second main slider 85 has a plate-shaped sliding portion 86 that faces the up/down direction, and connecting portions 87 that protrude upward from each of the front and back edge portions on the right edge portion of the sliding portion 86.

A cam hole 88 is formed in a position near the rear edge of the sliding portion 86. The cam hole 88 is made up of a waiting portion 88a having a large open area, a first straight line portion 88b that continues to the front edge on the right edge portion of the waiting portion 88a and extends front to back, a sloping portion 88c that continues to the front edge of the first straight line portion 88b and is sloped so as to be displaced towards the right as movement is made closer to the front edge, and a second straight line portion 88d that continues to the front edge of the sloping portion 88c and extends front to back.

A connecting rack portion 86a that faces the left in a position near the left edge is provided to the sliding portion 86, and guide receiving portions 86b that extend front to back are provided on each of the left and right edge portions.

A cam sliding hole 89 is formed in a position on the front edge side of the sliding portion 86. The cam sliding hole 89 is made up of a rear side sliding portion 89a that extends front to back, a sloping sliding portion 89b that continues to the front edge of the rear side sliding portion 89a and is sloped so as to be displaced towards the left as movement is made closer to the front edge, and a front side sliding portion 89c that continues to the front edge of the sloping sliding portion 89b and extends front to back.

The guide receiving portions 86b are guided by the guide protrusions 40b provided to the right edge portion of the base chassis 40 and a guide portion 71a on the right side of the cover plate 71, and the second main slider 85 is movably supported in the front/back direction by the base chassis 40. In the state of the second main slider 85 being supported by the base chassis 40, the connecting rack portion 86a is meshed with the synchronizing gear 72 on the right side (see FIG. 7). Accordingly, movement force of the first main slider 73 is transmitted to the second main slider 85 via the synchronizing gears 72, whereby the first main slider 73 and second main slider 85 synchronously move in the front/back direction.

Side Slider

Side sliders 90 are connected to the connecting portions 75 of the first main slider 73 and the connecting portions 87 of the second main slider 85 (see FIGS. 7 through 9). The side sliders 90 are made up of a plate-shaped side face portion 91 that faces the left/right direction and a plate-shaped guide portion 92 that faces the up/down direction which is attached to the upper edge portion of the side face portion 91 (see FIG. 32).

Figure 33:
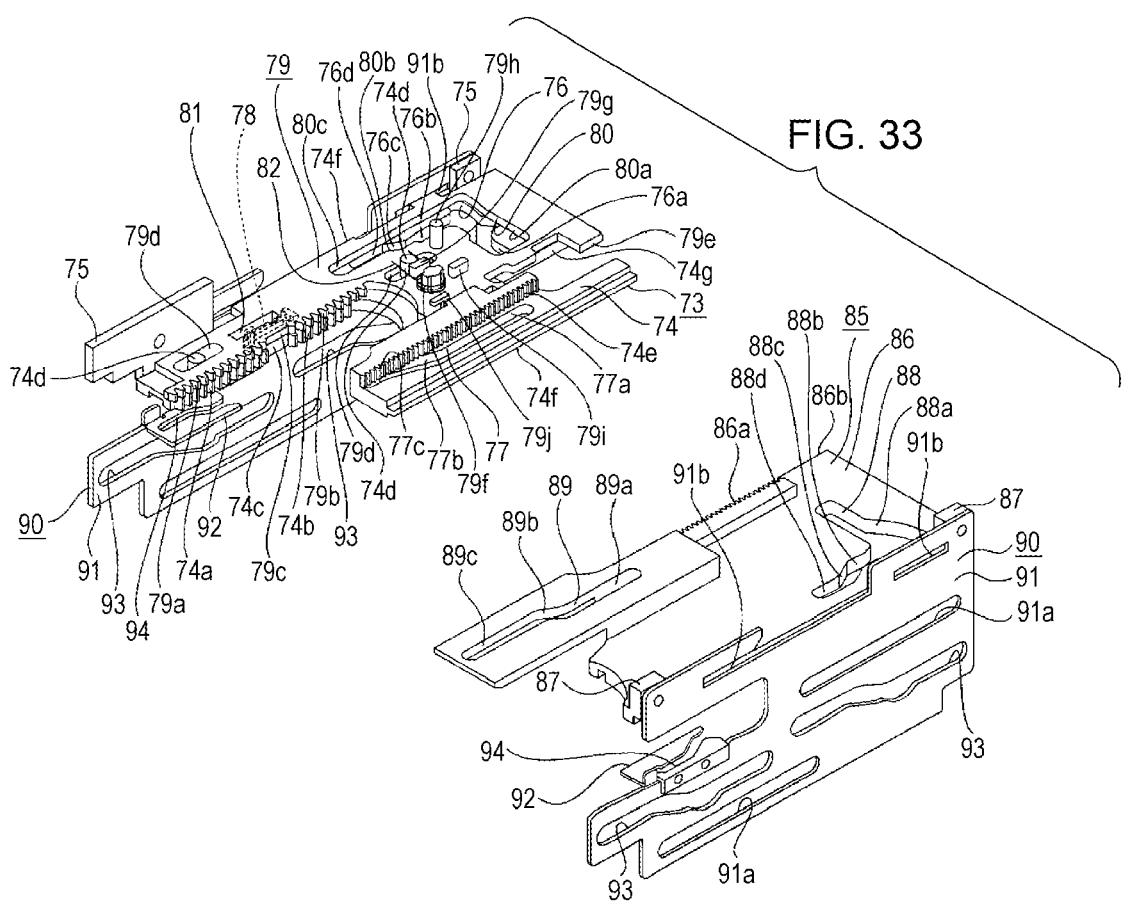
FIG. 33 is a perspective view illustrating a first main slider and a sub slider and second main slider and side slider.

The edge portions on both the front and back sides on the upper edge side of the side sliders 90 are connected to connecting portions 75 of the first main slider 73 and connecting portions 87 of the second main slider 85, and the side face portions 91 are positioned on the outside of the left and right side faces on the base chassis 40 (see FIG. 33).

Figure 32:
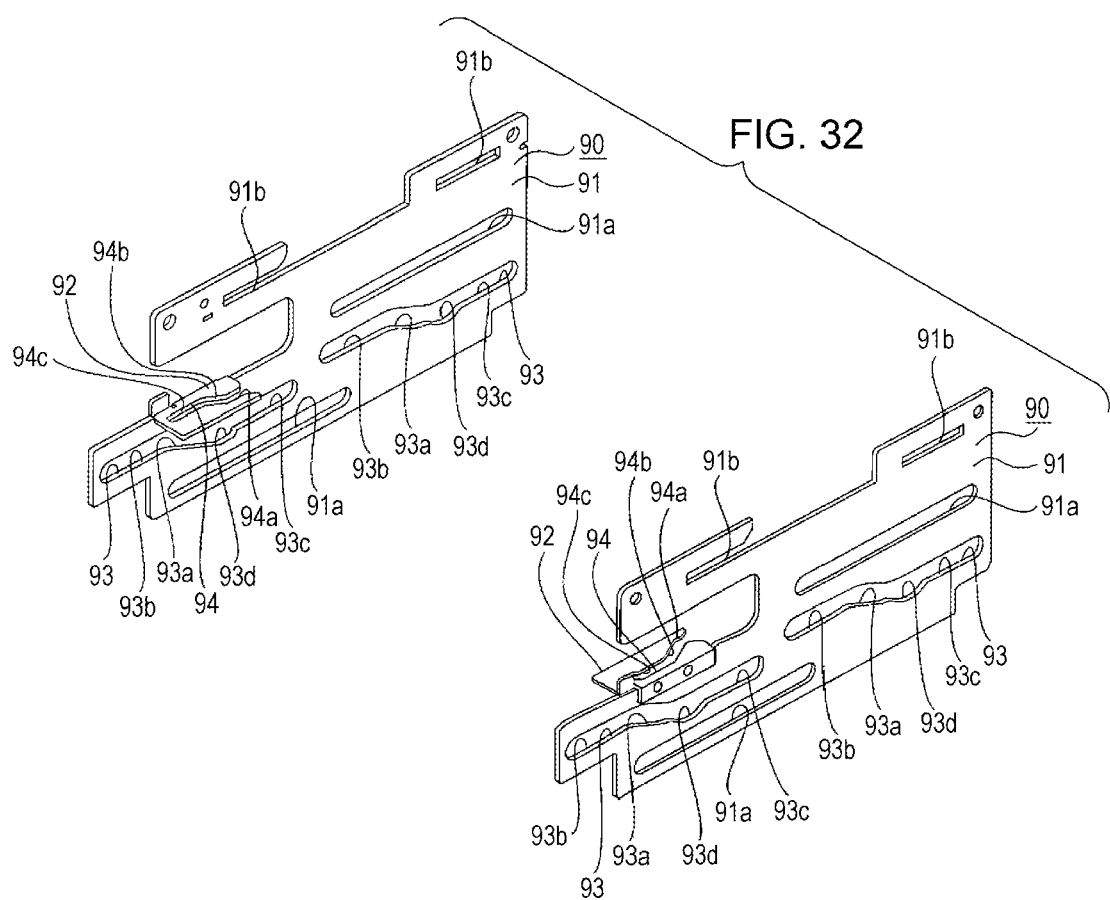
FIG. 32 is a perspective view illustrating a side slider.

Elevator cam holes 93 are formed on the side face portion 91 in a manner separated front to back (see FIGS. 32 and 33). The elevator cam holes 93 are made up of a sloping cam portion 93a that is displaced towards the right as movement is made closer to the front, a front side cam portion 93b that continues to the front edge of the sloping cam portion 93a and extends front to back, a rear side cam portion 93c that continues to the rear edge of the sloping cam portion 93a and extends front to back, and a holding recess 93d that opens upward is formed on the rear edge portion of the sloping cam portion 93a.

Guide receiving holes 91a that extend front to back are formed below the front side elevator cam holes 93 and above the rear side elevator cam holes 93 on the side face portions 91. Holding holes 91b that extend front to back are formed in a manner separated front to back, in positions near the upper edge of the side face portions 91.

A cam sliding hole 94 is formed on the guide portion 92. The cam sliding hole 94 is open towards the rear, and is made up of a rear side sliding portion 94a that extends front to back, a sloping sliding portion 94b that continues to the front edge of the rear side sliding portion 94a and is sloped so as to be displaced outwards (to the side) as movement is made closer to the front edge, and a front side sliding portion 94c that continues to the front edge of the sloping sliding portion 94b and extends front to back.

Guide restriction pins 25 of the base frame 22 are inserted into each of the guide receiving holes 91a, whereby the side slider 90 is movably supported in the front/back direction as to the base frame 22. In a state of the side slider 90 being supported by the base frame 22, the side edge portion on the left side of the sub slider 79 is slidably engaged by the holding holes 91b, whereby the sub slider 79 can be suppressed from floating from the first main slider 73.

Unit Plate and Base Unit, Etc.

A unit plate 95 is movably supported in the up/down direction by the side sliders 90 (see FIG. 7).

Figure 12:
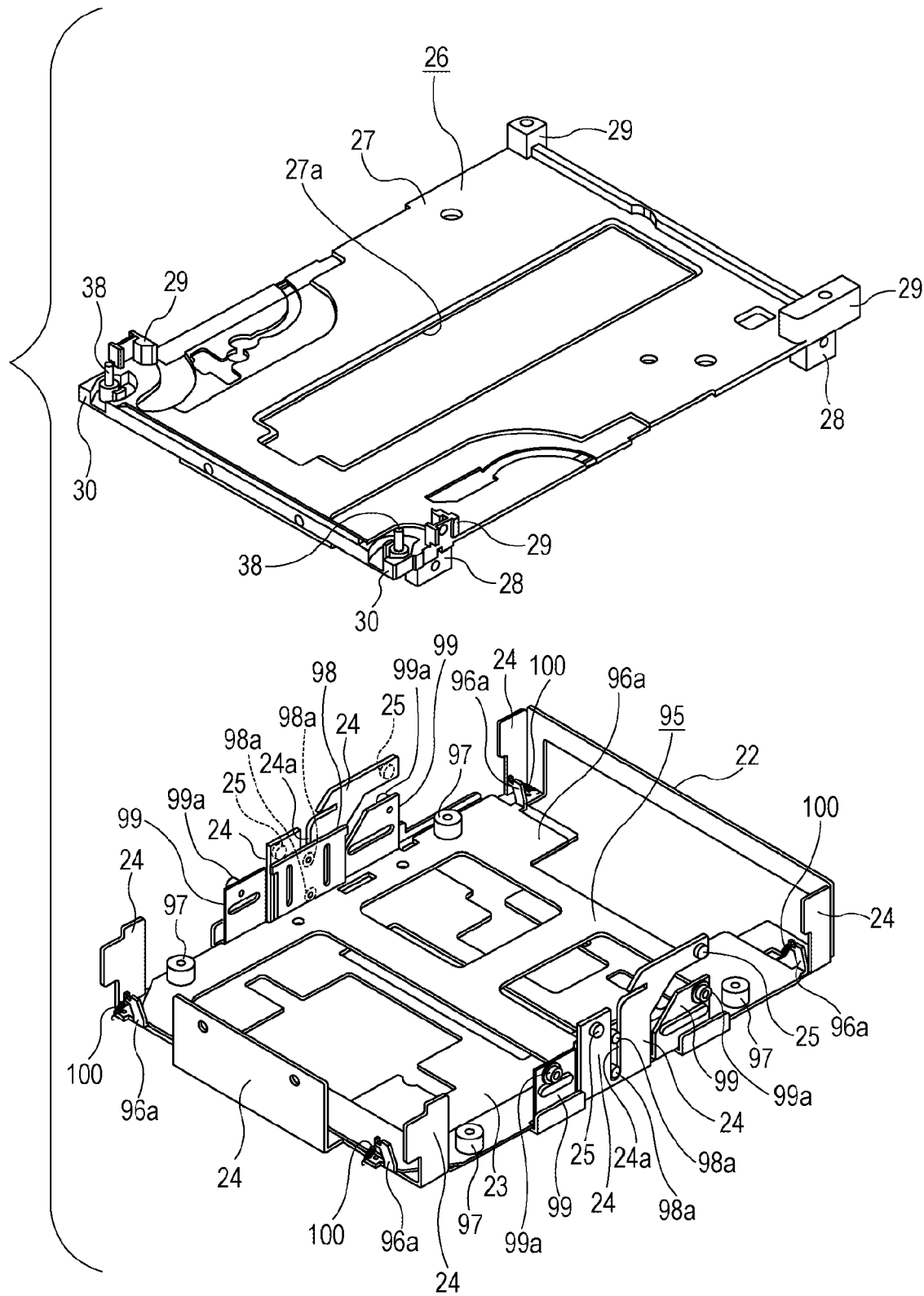
FIG. 12 is a perspective view illustrating a base frame, unit plate, and base plate.

The unit plate 95 has a base face portion 96 that faces the up/down direction, first side face portions 98 that protrude upward from each of the left and right side edges of the base face portion 96, and second side face portions 99 that protrude upward from each of the left and right side edges of the base face portion 97 (see FIGS. 11 and 12).

The base face portion 96 is formed having an erected, roughly rectangular shape, and has spring hooking pieces 96a that protrude upward in a manner separated to the left and right on both front and back edge portions. Springs 100 are supported between the spring hooking pieces 96a and the base frame 22, and the unit plate 95 is biased downward.

A first side face portion 98 is positioned somewhat inward from the side face portion 99, and guide receiving pins 98a are provided in a manner up and down on the outer face of the first side face portion 98. The guide receiving pins 98a are slidably engaged to the guide restricting holes 24a formed between the side face plates 24 of the base frame 22, whereby movement of the unit plate 95 in the left/right direction is restricted by the base frame 22.

The second side face portions 99 are positioned front to back, each having a first side face portion 98 sandwiched between. Guide receiving pins 99a are provided to the outer side of the second side face portion 99. The guide receiving pins 99a are slidably engaged to the elevator cam holes 93, whereby the unit plate 95 is slidably supported in the up/down direction by the side sliders 90.

In a state of the unit plate 95 being supported by the side sliders 90, a base face portion 96 is positioned between the base plate portion 27 of the base plate 26 and the base chassis 40.

Upon the side sliders 90 being moved in the front/back direction together with the movement in the front/back direction of the first main slider 73 and second main slider 85, the guide receiving pins 98a are guided into the guide restricting holes 24a of the base frame 22, and the guide receiving pins 99a are slid into the elevator cam holes 93 of the side sliders 90, whereby the user plate 96 is moved in the up/down direction.

Four dampers 97 are provided to the base face portion 96 in a manner separated front to back and left to right, and an unshown base unit is attached to the base face portion 97 via the dampers 97b. The base unit has a disc table to which a disc-shaped recording medium 200 is mounted, a spindle motor that rotates the disc table, an optical pick-up that moves in the radius direction of the disc-shaped recording medium 200, and so forth. The disc table is positioned directly below the chucking pulley 66, and has a magnet to attract and hold the chucking pulley 66.

The base used is moved in the up/down direction according to the movement of the unit plate 95, and the disc table is attached and detached from the chucking pulley 66.

First Link Mechanism, Etc.

A first link mechanism 101 is supported on the lower face side of the base chassis 40 (see FIG. 10). The first link mechanism 101 has a first front side link arm 102, a first rear side link arm 103, and a first rail 104 (see FIGS. 34 and 35).

The first front side link arm 102 is formed as a plate that faces the up/down direction and extends in one direction, and one edge portion in the lengthwise direction is turnably supported by the lower left corner of the base chassis 40. The turning fulcrum of the first front side link arm 102 is formed in a position shifted somewhat to the rear side as to the turning fulcrum of the route adjuster 31 which is supported by the adjuster supporting portion 30 on the left side of the base plate 26.

A slave piece 105 protruding toward the side is provided on one edge side of the first front link arm 102. A hooking portion 105a is formed on the slave piece 105, by a part thereof being cut and bent downwards.

A sleeve 106 is supported on the lower face side of the other edge portion in the lengthwise direction of the first front side link arm 102. A fixed roller 107 is supported on the lower face side in the center portion in the lengthwise direction of the first front side link arm 102. At least the periphery portion of the fixed roller 107 is made of a highly adhesive material that can be elastically deformed, such as rubber or the like.

An ejecting lever 108 is turnably supported by the first front side link arm 102. The ejecting lever 108 has a supported face portion 109 and roller support face portion 111 that are connected in the lengthwise direction (see FIGS. 34 through 36).

The supported face portion 109 is made up of a base portion 109a that is long in one direction, a bending portion 109b that protrudes downward from one edge of the base portion 109a, and a connecting portion 109c that extends from the lower edge of the bending portion 109b in the same direction as the base portion 109a.

A cam engaging portion 110 that protrudes upward is provided on the other edge portion of the supported face portion 109.

The roller support face portion 111 extends in the same direction as the base portion 109a, and an edge portion thereof is connected to the connecting portion 109c.

A pressing roller 112 is attached to the lower face side on the other edge portion of the roller support face portion 111. The pressing roller 112 is made up of a roller portion 112a and a flange portion 112b that flares outward from the lower edge portion of the roller portion 112a, and the periphery portion of the roller portion 112a is made of a highly adhesive material that can be elastically deformed, such as rubber or the like.

Figure 36:
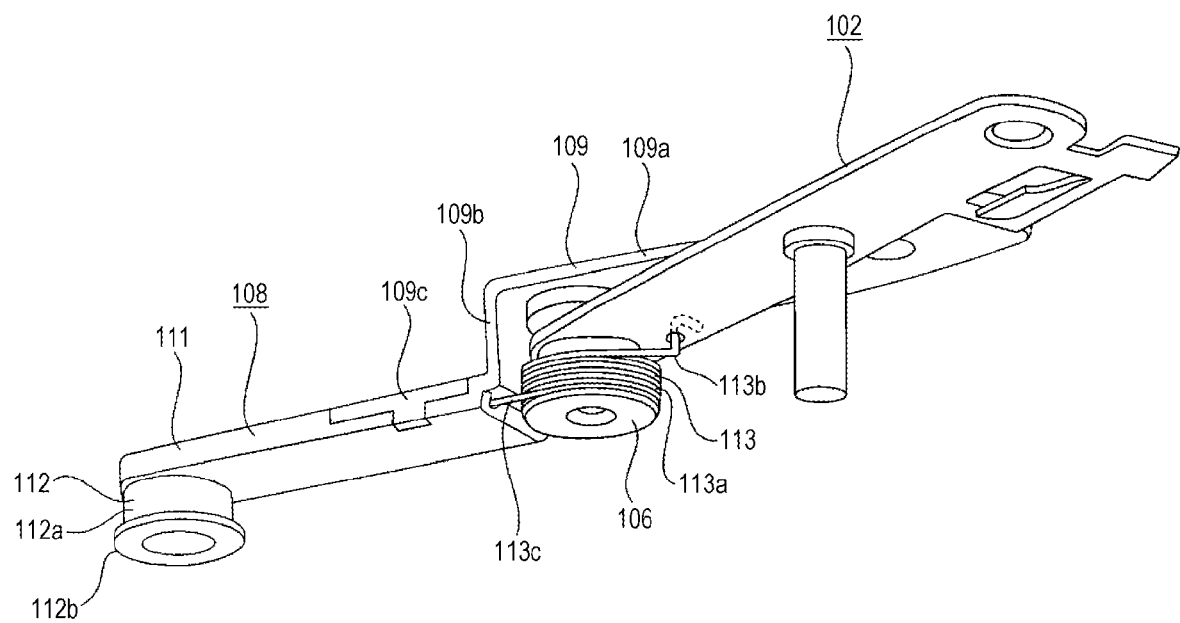
FIG. 36 is an enlarged perspective view illustrating a first front side link arm and ejecting level.
Figure 37:
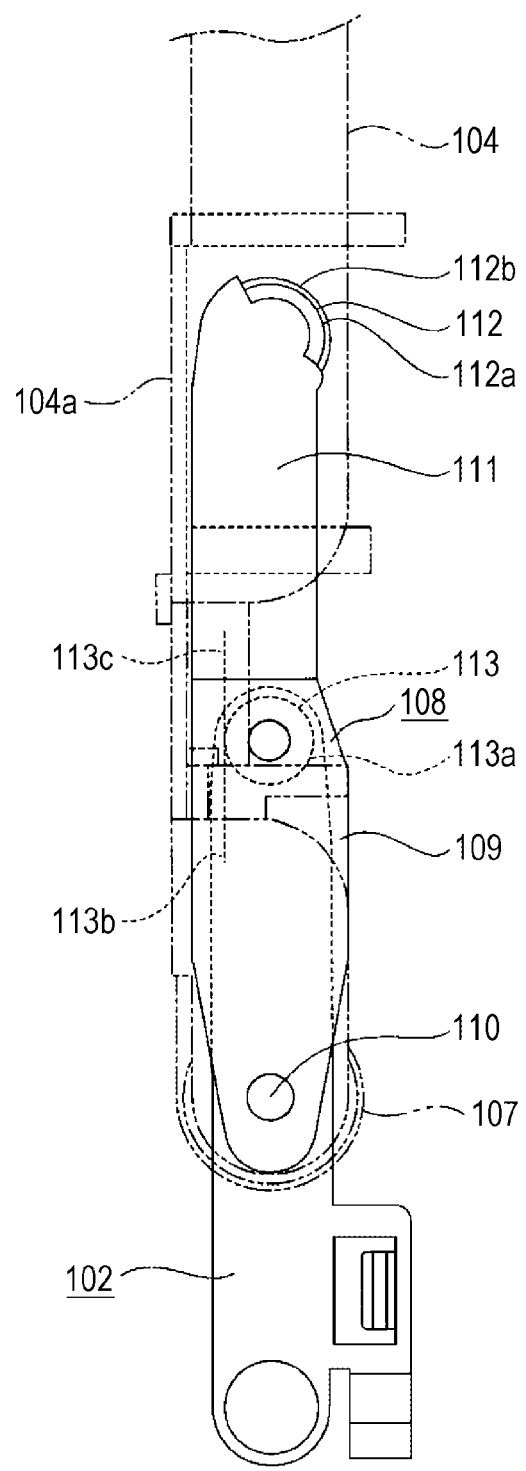
FIG. 37 is a schematic enlarged plan view illustrating a state of a pressing roller and so forth being stored in a storage.
Figure 38:
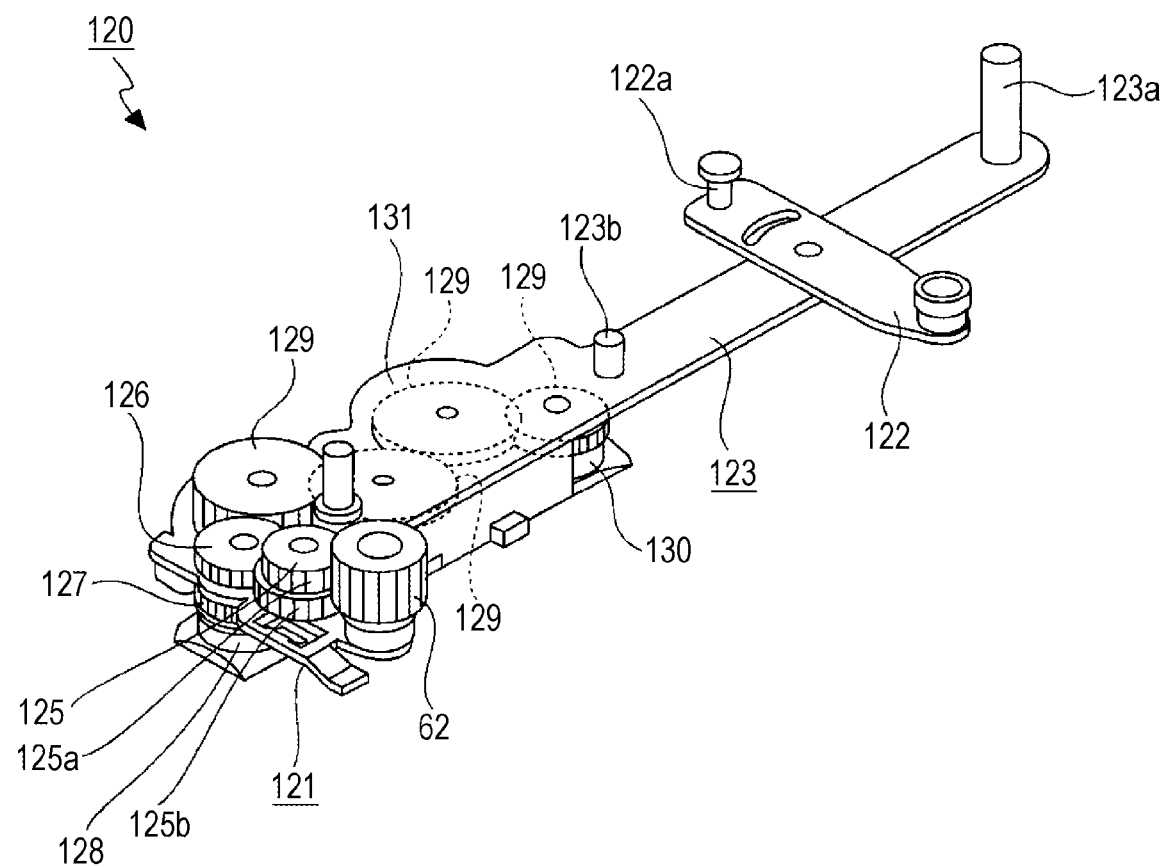
FIG. 38 is a perspective view illustrating a second link mechanism.

In a state wherein the ejecting lever 108 is supported by the first front side link arm 102, a biasing spring 113 is supported between the first front side link arm 102 and the ejecting lever 108 (see FIG. 36). The biasing spring 113 is a torsion coil spring, wherein the coil portion 113a is supported by the sleeve 106, one edge portion 113b is engaged with the other edge portion of the first front side link arm 102, and the other edge portion 113c is inserted and engaged between the connecting portion 109c of the first front side link arm 102 and the one edge portion of the ejecting lever 108. Accordingly, the biasing spring 113 applies turning force in the counter-clockwise direction as seen from above as to the first front side link arm 102 to the ejecting lever 108, while applying moving force upward.

In a state wherein the first front side link arm 102 is supported by the base chassis 40, the cam engaging portion 110 of the ejecting lever 108 is inserted from below into the operating cam portion 43 of the base chassis 40, and is slidably engaged (see FIG. 10).

Figure 34:
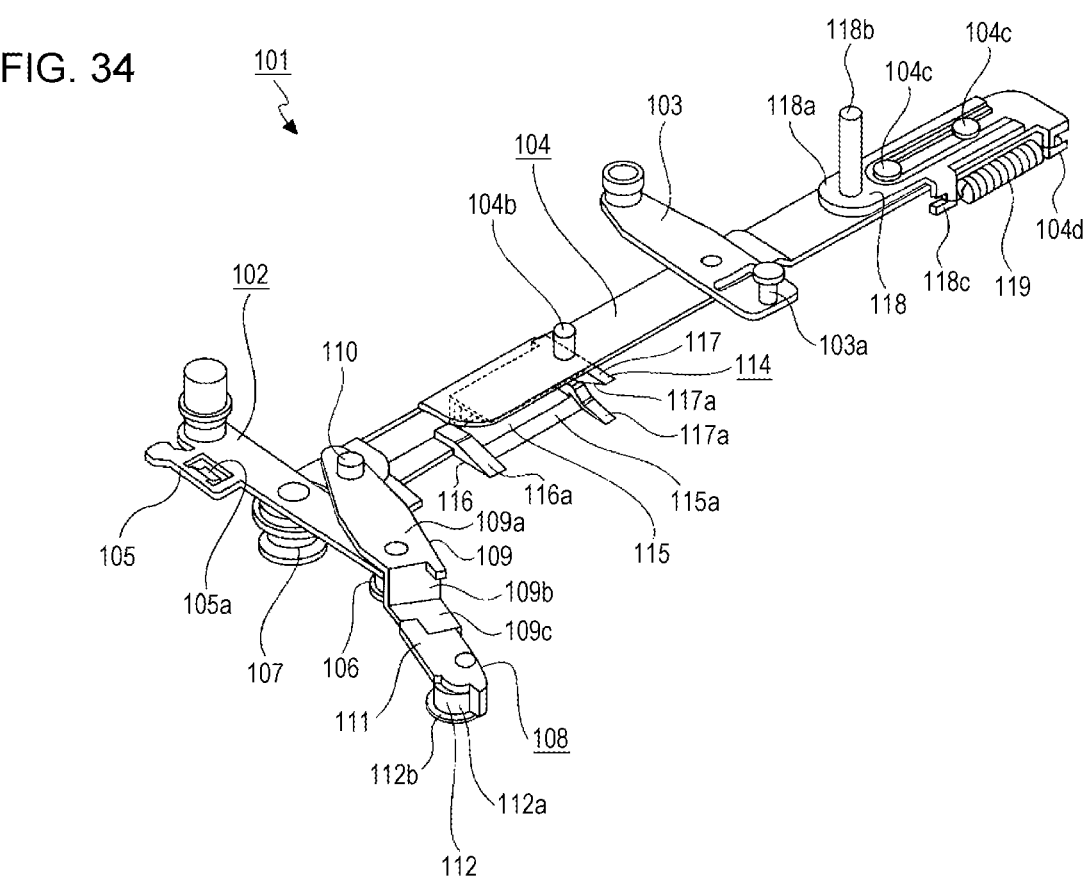
FIG. 34 is a perspective view illustrating a first link mechanism and storage.
Figure 35:
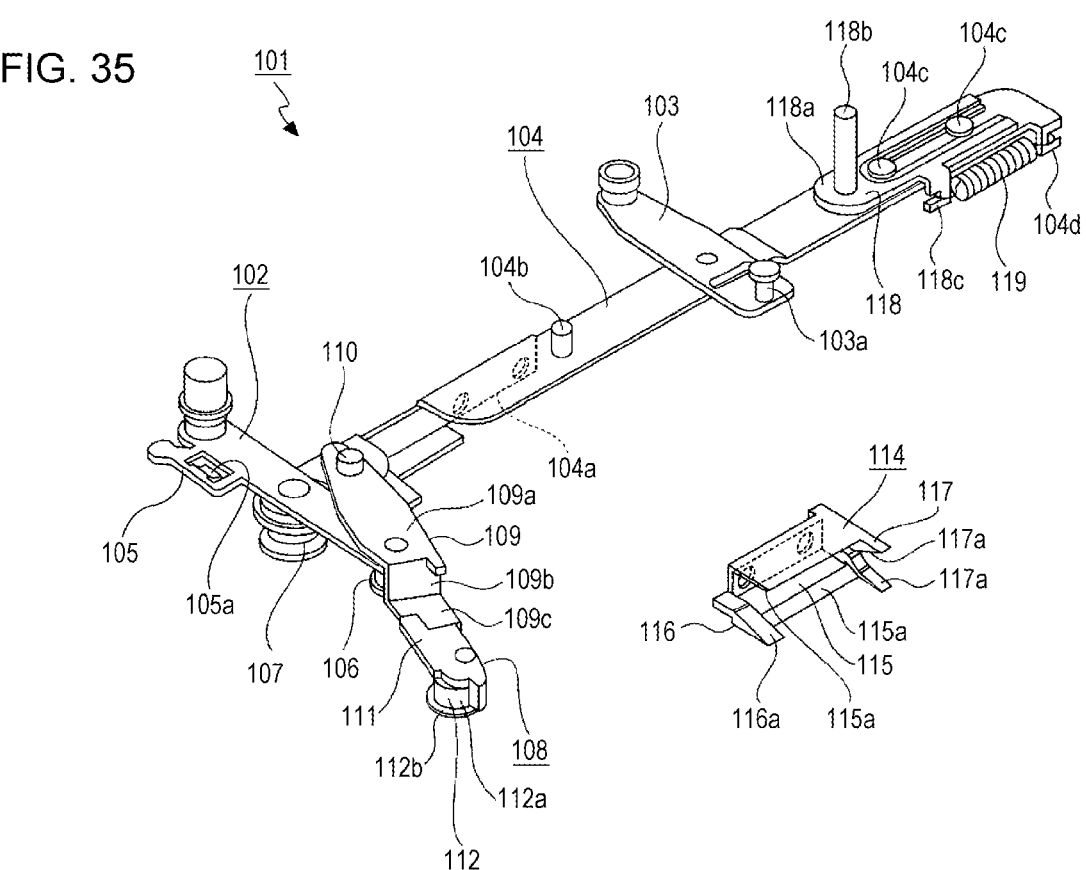
FIG. 35 is a perspective view separately illustrating the first link mechanism and storage.

The first rear side link arm 103 is formed as a plate extending in one direction facing the up/down direction, and is turnably supported by the left edge portion in the center portion in the front/back direction of the base chassis 40. A connecting shaft portion 103a that protrudes upward is provided to the edge portion on the opposite side from the turning fulcrum of the first rear side link arm 103 (FIGS. 34 and 35). In a state wherein the first rear side link arm 103 is supported by the base chassis 40, the connecting shaft portion 103a is inserted from below into the first shaft moving hole 45 on the left side of the base chassis 40, is inserted into the engaging hole 67b formed on the first interlocking lever 67 on the left side, and is slidably engaged. Accordingly, the first interlocking lever 67 is operated synchronously with the operation of the first rear side link arm 103.

The first rail 104 is turnably connected to the first front side link arm 102 and the first rear side link arm 103. The first rail 104 extends front to back, and is moved in the left/right direction so as to be extended facing the front/back direction, according to the turning operation of the first front side link arm 102 and first rear side link arm 103. The front edge portion and the roughly center portion in the front/back direction of the first rail 104 is turnably connected to the first front side link arm 102 and the first rear side link arm 103.

A fixed roller 107 that is supported by the first front side link arm 102 is positioned on the lower face side on the front edge portion of the first rail 104.

A member attaching portion 104a that faces the right is provided in a position near the front edge of the first rail 104.

An inserting pin 104b that protrudes upward is provided to the front edge side of the first rail 104 (see FIGS. 34 and 35). Supporting pins 104c that protrude upward are provided in a manner separated front to back in positions near the rear edge of the first rail 104. A spring hooking protrusion 104d that protrudes toward the right is provided to the rear edge portion of the first rail 104.

A storage 114 is attached by screws or the like to the member attaching portion 104a of the first rail 104. The storage 114 is made up of a storage portion 115 that is shaped in a sideways U-shape opening to the left, a front side guiding portion 116 provided so as to be connected to the front side of the lower edge portion of the storage portion 115, and a rear side guiding portion 117 provided so as to be connected to the rear side of the storage portion 115.

A pair of sloping faces that mutually separate as movement is farther to the right are formed on the right edge portion of the storage portion 115, in a manner separated up and down, and the pair of sloping faces herein are formed as lever guiding faces 115a.

A front side disc guiding face 116a that slopes so as to be displaced downward as movement is farther to the right is formed on the right edge portion of the front side guiding portion 116.

Rear side disc guiding faces 117a that slope so as to mutually separate as movement is farther to the right are formed on the right edge portion of the rear side guiding portion 117, in a manner separated up and down.

A limit lever 118 is movably supported in the front/back direction on the supporting pins 104c of the first rail 104. The limit lever 118 is made up of a supported plate portion 118a that faces the up/down direction, a slave shaft 118b that protrudes upward from the front edge portion of the supported plate portion 118a, and a spring hooking piece 118c that protrudes downward from the right edge portion of the supported plate portion 118a.

A tension spring 119 is supported between the spring hooking piece 118c of the limit lever 118 and the spring hooking protrusion 104d of the first rail 104, and the limit lever is biased towards the rear as to the first rail 104.

In a state wherein the first rail 104 is supported by the first front side link arm 102 and the first rear side link arm 103, the slave shaft 118b of the limit lever 118 is inserted from below into the second shaft moving hole 46 on the left side of the base chassis 40 and is inserted into the cam hole 76 of the first main slider 73 and the cam action hole 80 of the sub slider 79.

Second Link Mechanism, Etc.

A second link mechanism 120 is supported by the lower face side of the base chassis 40 (see FIG. 10). The second link mechanism 120 has a second front side link arm 121, second rear side link arm 122, and second rail 123 (see FIG. 38).

The second front side link arm 121 is formed as a plate extending in one direction facing the up/down direction, and one edge portion in the lengthwise direction is turnably supported by the lower right corner of the base chassis 40. The turning fulcrum of the second front side link arm 121 is formed in a position shifted somewhat to the rear side as to the turning fulcrum of the route adjuster 31 that is supported by the adjuster supporting portion 30 on the right side of the base plate 26.

A slave piece 124 that protrudes to the side is provided to one edge side of the second front link arm 121. A hooking portion 124a is formed on the slave piece 124 by a part thereof being cut and bent downwards.

A third transmitting gear 62 that is supported by the base chassis 40 is connected to an edge portion of the second front side link arm 121, and the third transmitting gear 62 is rotated as to the second front side link arm 121.

A two-speed gear 125 is supported in the central portion in the lengthwise direction of the second front side link arm 121. The gear portion 125a on the upper side of the two-speed gear 125 is meshed with the third transmitting gear 62.

Feeding gears 126 and 127 having the shaft portions linked together are each supported on the upper face side and lower face side of the other edge portion in the lengthwise direction of the second front side link arm 121. The feeding gear 126 is meshed with the gear portion 125b on the lower side of the two-speed gear 125. A driving roller 128 is connected to the lower edge portion of the axis portions of the feeding gears 126 and 127. The periphery portion of the driving roller 128 is made of a highly adhesive material that can be elastically deformed, such as rubber or the like.

As described above, upon the driving motor 52 being rotated while in a state wherein the second transmitting gear 61 is meshed with the switching gear 60, the driving force thereof is transmitted in sequence to the worm 54, worm gear 55, first transmitting gear 59, switching gear 60, and third transmitting gear 62 via the second transmitting gear 61. The driving force transmitted to the third transmitting gear 62 is transmitted in sequence to the two-speed gear 125, feeding gear 126, and feeding gear 127, and the driving roller 128 is rotated.

In a state wherein the second front side link arm 121 is supported by the base chassis 40, the gear portion 125a on the upper side of the two-speed gear 125 is inserted from below into the gear moving hole 44 of the base chassis 40.

The second rear side link arm 122 is formed as a plate extending in one direction facing the up/down direction, and is turnably supported by the right edge portion in the center portion in the front/back direction of the base chassis 40. A connecting shaft portion 122a protruding upward is provided to the edge portion on the opposite side from the turning fulcrum of the second rear side link arm 122. In a state wherein the link arm 122 is supported by the base chassis 40, the connecting shaft portion 122a is inserted from below into the first shaft moving hole 45 on the right side of the base chassis 40, is inserted into the engaging hole 68b formed on the second interlocking lever 68 on the right side, and is slidably engaged. Accordingly, the second interlocking lever 68 is operated synchronously with the operation of the second rear side link arm 122.

The second rail 123 is turnably connected to the second front side link arm 121 and the second rear side link arm 122. The second rail 123 extends front to back, and is moved in the left/right direction so as to be extended facing the front/back direction, according to the turning operation of the second front side link arm 121 and second rear side link arm 122. Accordingly, the first rail 104 and second rail 123 are moved in the left/right direction in a constantly parallel state.

The second rail 123 is shorter in the front/back direction than the first rail 104, and the front edge portion and a portion near the rear edge are turnably connected to the second front side link arm 121 and second rear side link arm 122, respectively.

A slave shaft 123a that protrudes upward is provided to the rear edge portion of the second rail 123.

An inserting pin 123b that protrudes upward is provided to the front edge side of the second rail 123.

Sending flat gears 129 that sequentially mesh are supported by the front half portion of the second rail 123. The sending flat gear 129 that is positioned at the front-most side is meshed with the feeding gear 126. The sending flat gear 129 that is positioned at the rear-most side is connected to a rotating roller 130 on the same axis thereof.

Accordingly, the driving force of the driving motor 52 transmitted to the feeding gear 126 is transmitted to the rotating roller 130 via the sending flat gears 129 and the rotating roller 130 is rotated, in sequence. The rotating roller 130 is synchronized with the driving roller 128 and rotated in the same direction.

The feeding gear 126 and flat gears 129 are covered from the lower face side by a gear cover 131.

Figure 21:
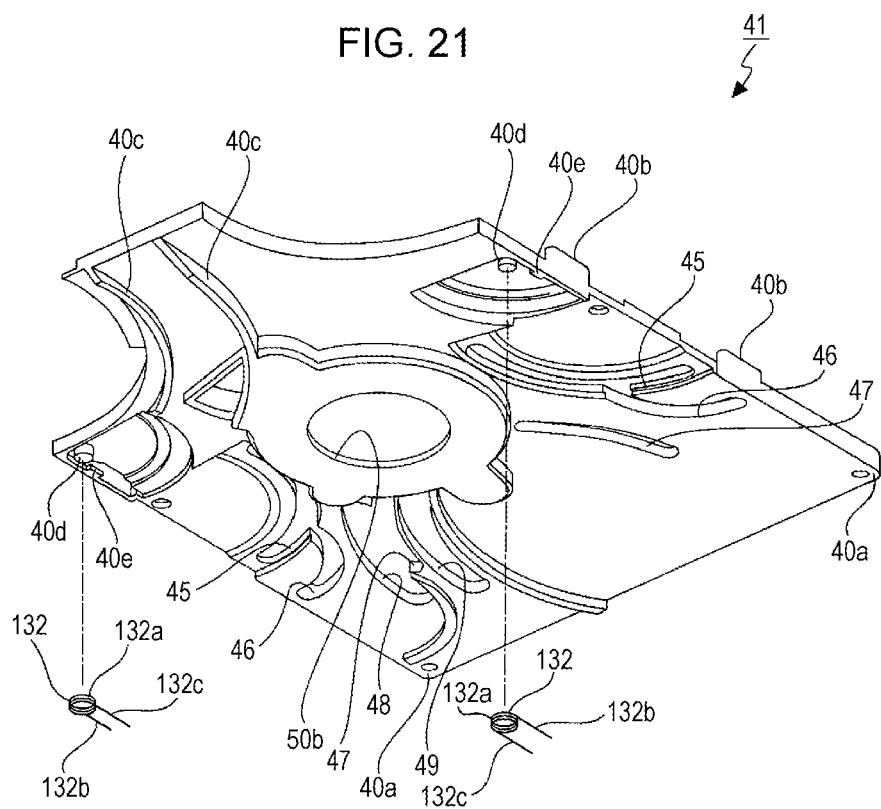
FIG. 21 is a perspective view of a floor side of a first base of the base chassis and a spring member.

The first rail 104 of the first link mechanism 101 and the second rail 123 of the second link mechanism are each biased in the direction of nearing one another in the left/right direction by spring members 132 (see FIG. 21).

The spring member 132 are coil springs, and the coil portions 132a are each supported by a spring supporting shaft 40d of the base chassis 40, the one edge portions 132b are each engaged with the spring pressing portions 40e of the base chassis 40, and the other edge portions 132c are each engaged with the first rail 104 and second rail 123.

In a state wherein the second rail 123 is supported by the second front side link arm 121 and second side link arm 122, the slave shaft 123a of the second rail 123 is inserted from below into the second shaft moving hole 46 on the right side of the base chassis 40 and is inserted into the cam hole 88 on the second main slider 85.

Also, as described above, the first interlocking lever 67 and second interlocking lever 68 have the connecting shaft 67a slidably engaged with the connecting hole 68a, the first rear side link arm 103 has the connecting shaft portion 103a slidably engaged with the connecting hole 67b of the first interlocking lever 67, and the second rear side link arm 122 has the connecting shaft portion 122a slidably engaged with the engaging hole 68b of the second interlocking lever 68.

Accordingly, the first rail 104 supported by the first front side link arm 102 and first rear side link arm 103 and the second rail 123 supported by the second front side link arm 121 and second rear side link arm 122 are connected via the first interlocking lever 67 and second interlocking lever 68, and move in parallel in the left/right direction toward the direction of mutually separating.

Operation of Disc Conveying Device

The conveying operation as to the disc-shaped recording medium 200 of the disc conveying device 21 will be described (FIGS. 39 through 76).

The disc conveying device 21 starts operation from an initial state before loading the disc-shaped storage medium 200, the disc-shaped storage medium 200 that is removed from the disc cartridge is conveyed in a lead-in direction (toward the rear) to a chucking position with a loading operation, the disc-shaped storage medium 200 is chucked in a chucking position and recording or playing of the information signals recorded on the disc-shaped storage medium 200 is performed. Upon the recording or playing of the information signals recorded on the disc-shaped storage medium 200 ending, the chucking as to the disc-shaped storage medium 200 is disengaged, the disc-shaped storage medium 200 is conveyed from the chucking position to the ejecting direction (toward the front) by an ejecting operation and stored in the disc cartridge 1, and the disc conveying device 21 is returned to the initial state after storing the disc-shaped storage medium 200 in the disc cartridge 1.

In the loading operation and ejecting operation, the disc-shaped storage medium 200 is conveyed by a fixed roller 107, pressing roller 112, driving roller 128, and rotating roller 130, and the fixed roller 107, pressing roller 112, driving roller 128, and rotating roller 130 herein function as conveying rollers.

Initial State

Figure 39:
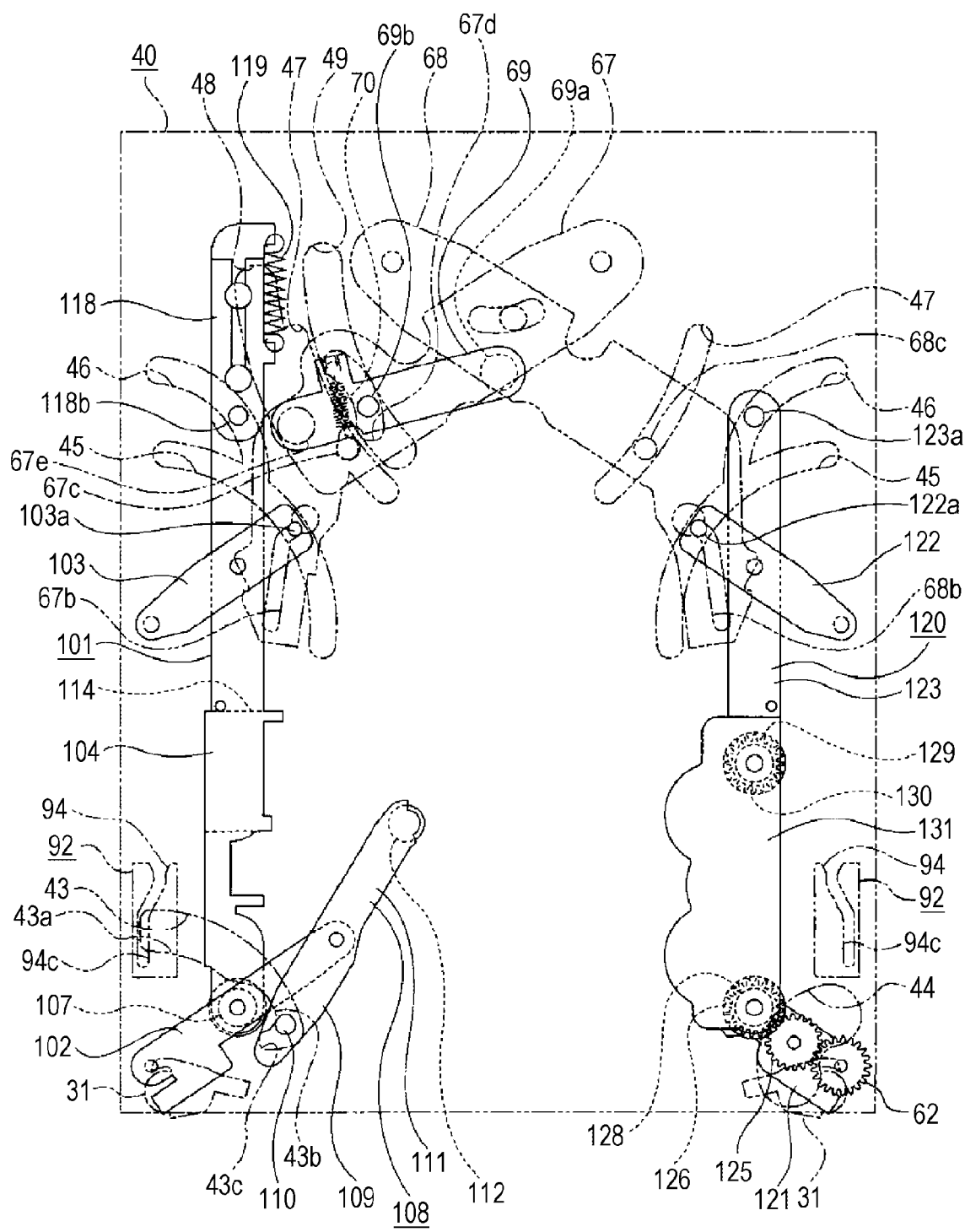
FIG. 39 is a schematic plan view illustrating an initial state of the link mechanism and so forth, and illustrates the operations of the disc conveying device together with FIGS. 40 through 76.
Figure 40:
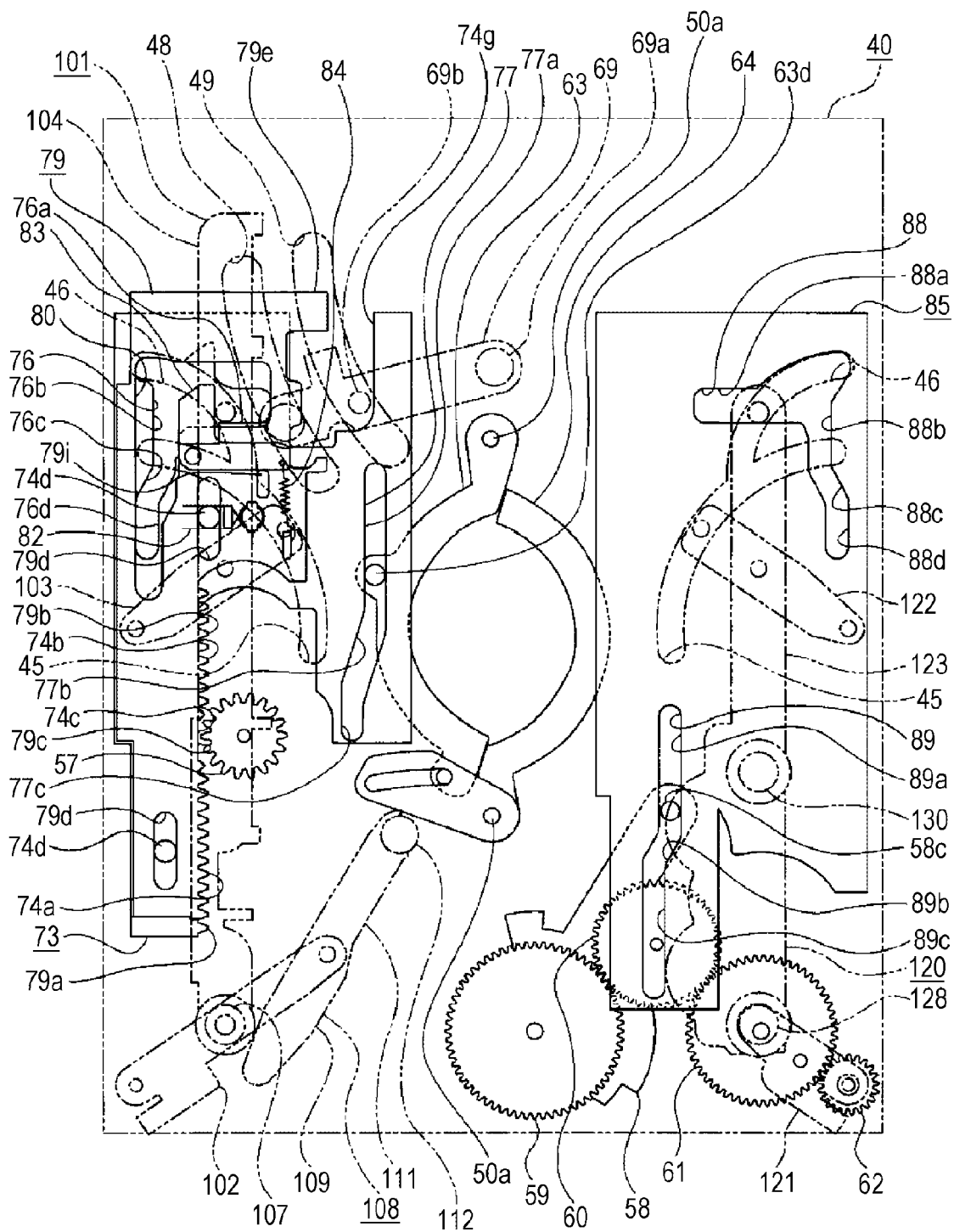
FIG. 40 is a schematic plan view illustrating an initial state of the slider and so forth.
Figure 41:
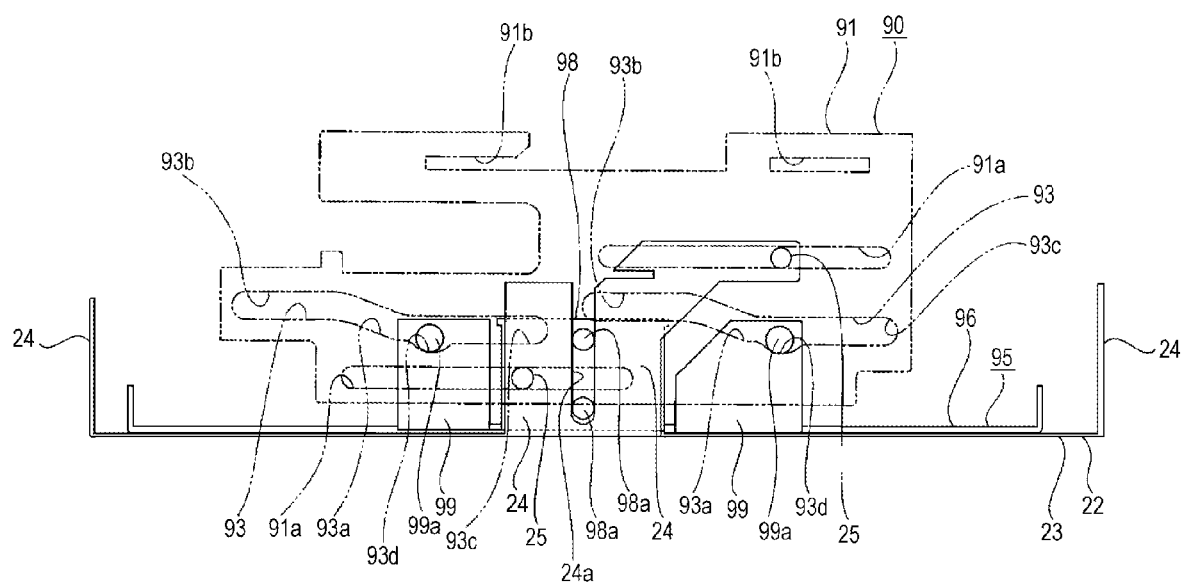
FIG. 41 is a schematic side view illustrating an initial state of the unit plate and so forth.

First, the initial state of the various parts will be described (see FIGS. 39 through 41).

In the initial state, the route adjusters 31 are held in a neutral position by returning springs 39.

The neutral position of the route adjuster 31 positioned on the left side is a position held wherein the positioning protrusion 34 extends in the direction facing the right, and the neutral position of the route adjuster 31 positioned on the right side is a position held wherein the positioning protrusion 34 extends in the direction facing the left.

In the initial state, the driving motor 52 is not rotating, and the driving gear 57 and driving roller 128 are not rotating.

In the initial state, the first main slider 73 is in a non-meshed state wherein neither the first main rack portion 74a or the second main rack portion 74b are meshed with the driving gear 57, and the non-rack portion 74c is in a position facing the driving gear 57.

In the initial state, the sub slider 79 has the non-rack portion 79c positioned directly above the non-rack portion 74c, the non-rack portion 79c is in a non-meshed position that is a position facing the driving gear 57, and neither the first sub rack portion 79a nor the second sub rack portion 79b are meshed with the driving gear 57. At this time the support pins 74d of the first main slider 73 are each positioned in the center portion in the front/back direction of the supported holes 79d of the sub slider 79.

The locking lever 78 that is attached to the first main slider 73 is in a state of being connected to the opening edge of the inserting portion 81a of the lever inserting hole 81, and the sub slider 79 is not locked as to the first main slider 73.

The second main slider 85 is held in the center of the moving range according to the position of the first main slider 73.

When the first main slider 73 is in the initial state, the slave shaft 118b of the limit lever 118 supported by the first rail 104 is in a state of touching the front side opening edge of the waiting portion 76a on the cam hole 76. Also, at this time, the slave shaft 123a of the second rail 123 is in a state of touching the front side opening edge of the waiting portion 88a on the cam hole 88 of the second main slider 85.

In the initial state, the first front side link arm 102, first rear side link arm 103, second front side link arm 121, and second rear side link arm 122 are in a sloped state inwards, and the ejecting lever 108 is also in a sloped state inwards. Accordingly, the roller supporting face portion 111 of the ejecting lever 108 and the pressing roller 112 are in a state of being pulled out from the storage 114 towards the right.

At this time, the distance between the fixed roller 107 supported by the first front side link arm 102 and the driving roller 128 supported by the second front side rink arm 121 is smaller than the diameter of the disc-shaped recording medium 200.

When the first main slider 73 is in the initial state, the slave pin 63d of the first pulley holder 63 is engaged with the rear side portion 77a of the cam supporting hole 77 of the first main slider 73. Accordingly, the holding portions 63a and 64a of the first pulley holder 63 and second pulley holder 64 are in holding positions that are positioned on the lower side of the chucking pulley 66, and the chucking pulley 66 is held in a state of being held up upwards by the holding portions 63a and 64a.

When the second main slider 85 is in the initial state, the sliding pin 58c of the gear supporting plate 58 is engaged with the rear side sliding portion 89a of the cam sliding hole 89 of the second main slider 85. Accordingly, the gear supporting plate 58 is in a state wherein the switching gear 60 is turned in the direction nearing the transmitting gear 61, the switching gear 60 is meshed with the second transmitting gear 61, whereby the driving force of the driving motor 52 can be transmitted to the driving roller 128.

When the sub slider 79 is in an initial state, the second portion 83b of the action lever 83 that is biased toward the front by the tension coil spring 84 is pressed to the turn restricting protrusion 79i and held at the turning edge in the clockwise direction as seen from a plane view. At this time, the action shaft 69b of the starting lever 69 that is turnably supported by the first interlocking lever 67 is positioned further toward the front than the action protrusion 79e of the sub slider 79.

The sub sliders 90 are connected to the first main slider 73 and second main slider 85, and are held in positions according to the moving positions of the first main slider 73 and second main slider 85. At this time the unit plate 96 which is biased downward by the springs 100 is engaged in a state wherein the guide receiving pins 99a of the second side face portions 99 are pressed to the holding recesses 93d of the elevator cam holes 93. Accordingly, the unit plate 95 and the base unit disposed on the unit plate 95 are held at the lower moving edge.

The guide receiving pins 99a of the unit plate 95 are pressed to the holding recesses 93d of the elevator cam holes 93 with the biasing force of the springs 100, whereby positioning accuracy in the up/down direction of the unit plate 95 and base unit is improved.

Loading Operation

Upon the disc-shaped recording medium 200 being removed from the disc cartridge 1 to the rear (lead-in direction) by a removing mechanism provided in the disc changer 20, loading operations such as described below are performed by the disc conveying device (see FIGS. 42 through 54).

Figure 42:
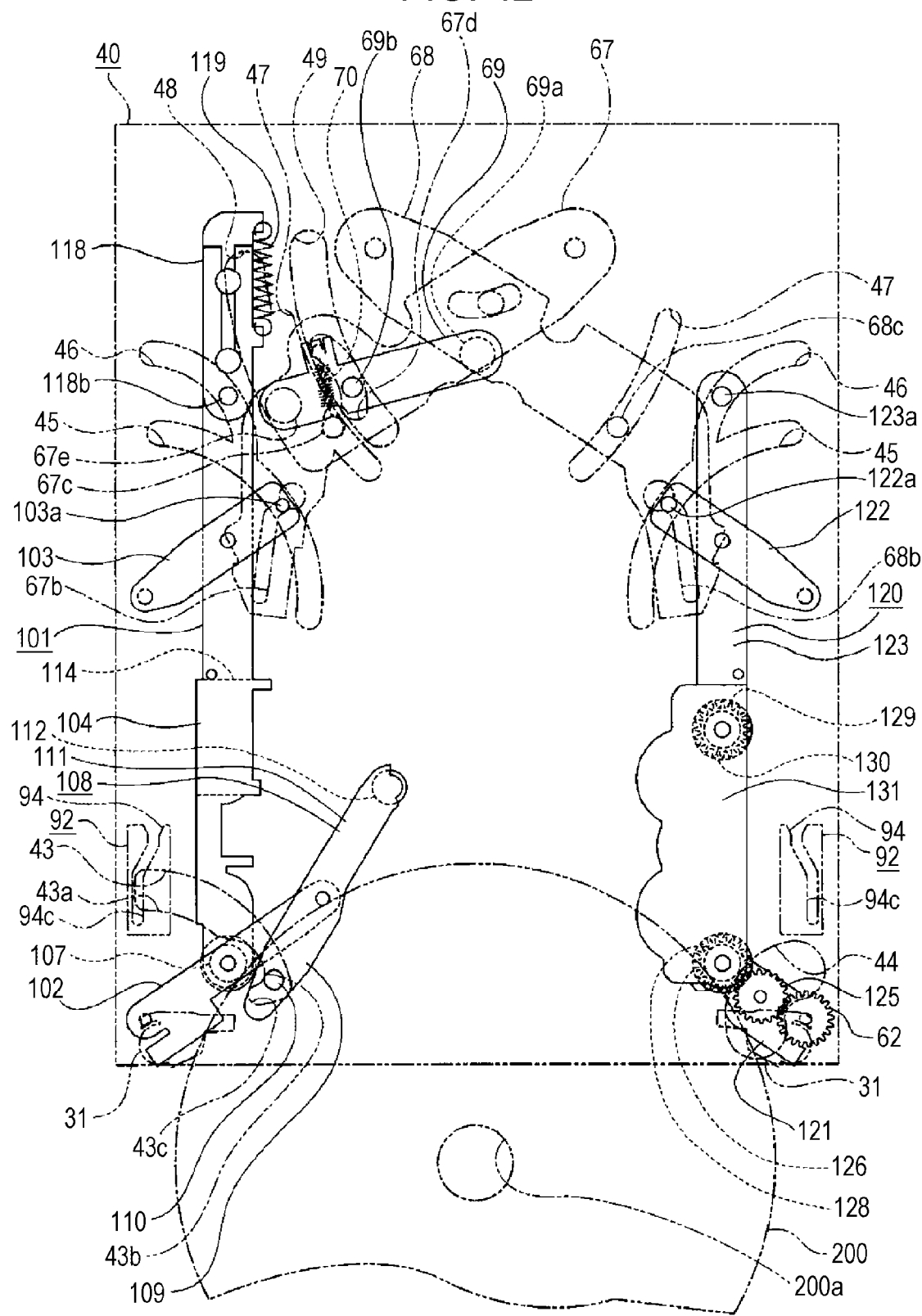
FIG. 42 is a schematic plan view illustrating a state wherein a loading operation is started, and the disc-shaped recording medium is conveyed towards a chucking position.

Upon the disc-shaped recording medium 200 being removed from the disc cartridge 1, the peripheral face of the disc-shaped recording medium 200 touches the route adjusters 31, and the route adjuster 31 are pressed toward the rear by the disc-shaped recording medium 200 (see FIG. 42). Positioning grooves 37 are formed on the route adjusters 31, and the peripheral portion of the disc-shaped recording medium 200 is guided by the guiding faces 37a and is inserted into the positioning grooves 37.

Accordingly, the peripheral portion of the disc-shaped recording medium 200 is inserted to the positioning grooves 37 by the guiding faces 37a in a sure manner, thereby improving positional accuracy in the vertical direction of the disc-shaped recording medium 200.

The route adjusters 31 pressed by the disc-shaped recording medium 200 are turned counter to the biasing force of the return springs 39, each in the state of positioning the disc-shaped recording medium 200.

The peripheral face of the disc-shaped recording medium 200 makes contact with the driving roller 128 and fixed roller 107. At this time the driving motor 52 is rotated by a detecting operation of the sensor 53a mounted on the sensor board 53, based on the insertion of the disc-shaped recording medium 200. Upon the driving motor 52 being rotated, the driving force thereof is transmitted to the driving gear 57 in sequence via the worm 54, worm gear 55, and transmitting gear group 56, and the driving gear 57 is reduced and rotated by the transmitting gear group 56. Also, the driving force of the driving motor 52 is transmitted in sequence to the worm 54, worm gear 55, first transmitting gear 59, switching gear 60, second transmitting gear 61, third transmitting gear 62, two-speed gear 125, feeding gear 126, and feeding gear 127, whereby the driving roller 128 is rotated. At this time the driving force of the driving motor 52 is also transmitted to the rotating roller 130 via the flat gears 129 from the feeding gear 126, and the rotating roller 130 is synchronized with the driving roller 129 and rotated in the same direction.

The first main slider 73 and sub slider 79 are in non-meshed positions with one another even when the driving gear 57 is rotated, so the first main slider 73, sub slider 79, and second main slider 85 are not moved.

Figure 43:
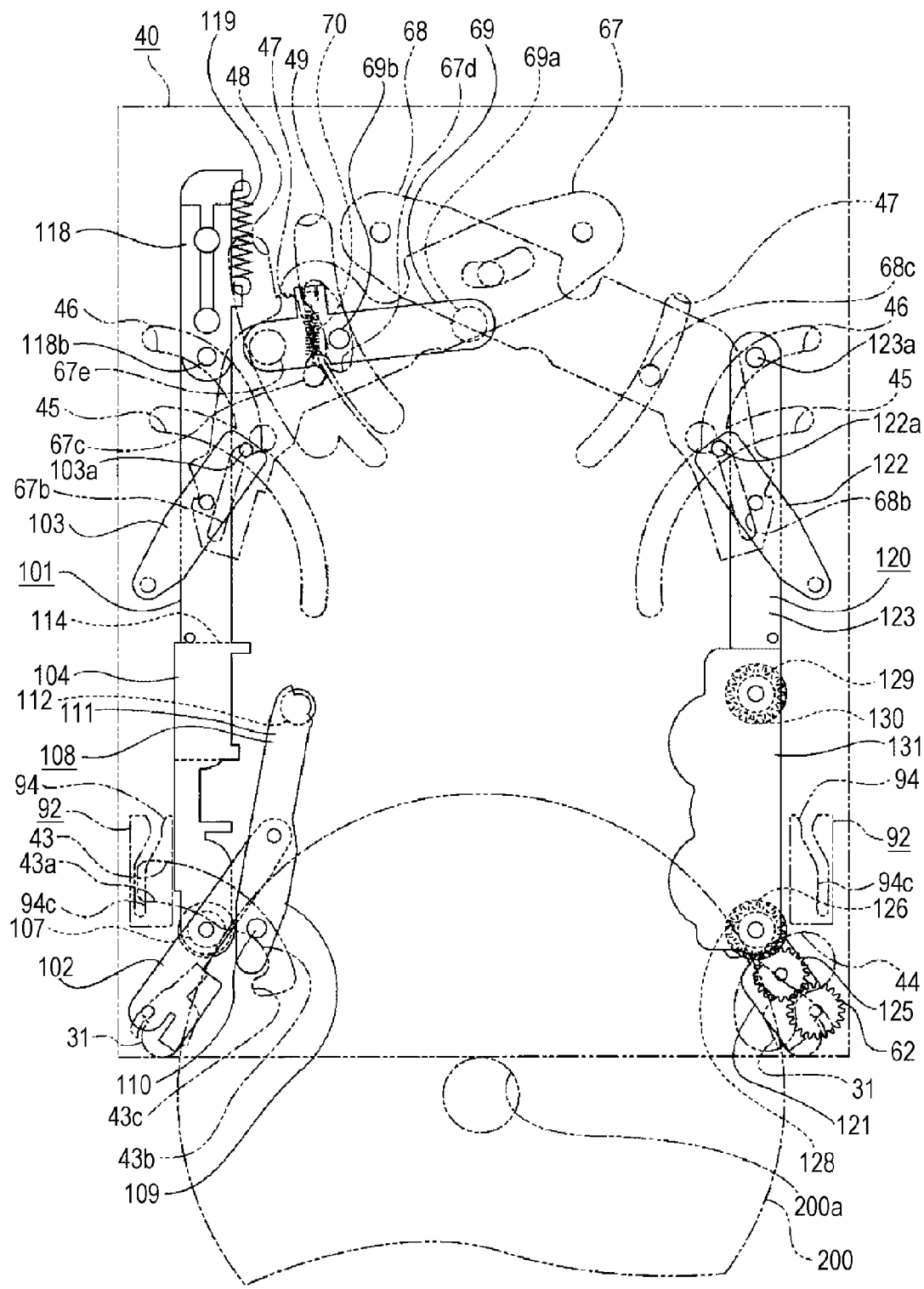
FIG. 43 is a schematic plan view illustrating a state wherein the disc-shaped recording medium continues to be conveyed towards a chucking position.

Upon the driving roller 128 being rotated, the disc-shaped recording medium 200 is conveyed toward the back by the driving roller 128 and fixed roller 107 (see FIG. 43).

When the disc-shaped recording medium 200 is conveyed toward the rear, the route adjusters 31 are further turned counter to the biasing force of the return springs 39, in a state of having positioned the disc-shaped recording medium 200.

As the disc-shaped recording medium 200 is conveyed toward the rear, the first rail 104 and second rail 123 are moved in parallel so as to mutually separate, and the first front side link arm 102, first rear side link arm 103, second front side link arm 121, and second rear side link arm 122 are also turned outwards. At this time the ejecting lever 108 is also turned outwards together with the turning operation of the first front side link arm 102.

Also, the first interlocking lever 67 and second interlocking lever 68 are each turned in the predetermined direction according to the turning operation of the first front side link arm 102 and second front side link arm 121.

As the first rail 104 is moved, the slave shaft 118b of the limit lever 118 is moved along the second shaft moving hole 46 on the left side of the base chassis 40.

When the ejecting lever 108 is turned together with the turning operation of the first front side link arm 102, the cam engaging portion 110 of the ejecting lever 108 is slidably moved by the operating cam portion 43 of the base chassis 40.

When the first rear side link arm 103 is turned, the connecting shaft portion 103a is moved along the first shaft moving hole 45 on the left side of the base chassis 40 and the engaging hole 67b formed on the first interlocking lever 67.

When the second rail 123 is moved, the slave shaft 123a is moved along the second shaft moving hole 46 on the right side of the base chassis 40.

When the second front side link arm 121 is turned, the gear portion 125a on the upper side of the two-speed gear 125 supported by the link arm 121 is moved along the gear moving hole 44 of the base chassis 40.

When the second rear side link arm 122 is turned, the connecting shaft portion 122a is moved along the first shaft moving hole 45 on the right side of the base chassis 40 and the engaging hole 68b formed on the second interlocking lever 68.

When the first interlocking lever 67 and second interlocking lever 68 are turned, the disc holding pins 67c and 68c are moved along the pin moving holes 47 of the base chassis 40. At this time, the supporting shaft 67e of the first interlocking lever 67 moves along the connecting portion moving hole 48 of the base chassis 40, and the action shaft 69b of the starting lever 69b move along the action shaft moving hole 49 of the base chassis 40 and the shaft inserting hole 67d of the first interlocking lever 67.

The disc-shaped recording medium 200 is further conveyed toward the rear by the driving roller 128 and fixed roller 107.

When the disc-shaped recording medium 200 is conveyed further toward the rear, the route adjusters 31 are turned counter to the biasing force of the return springs 39 while in a state of having positioned the disc-shaped recording medium 200.

Figure 44:
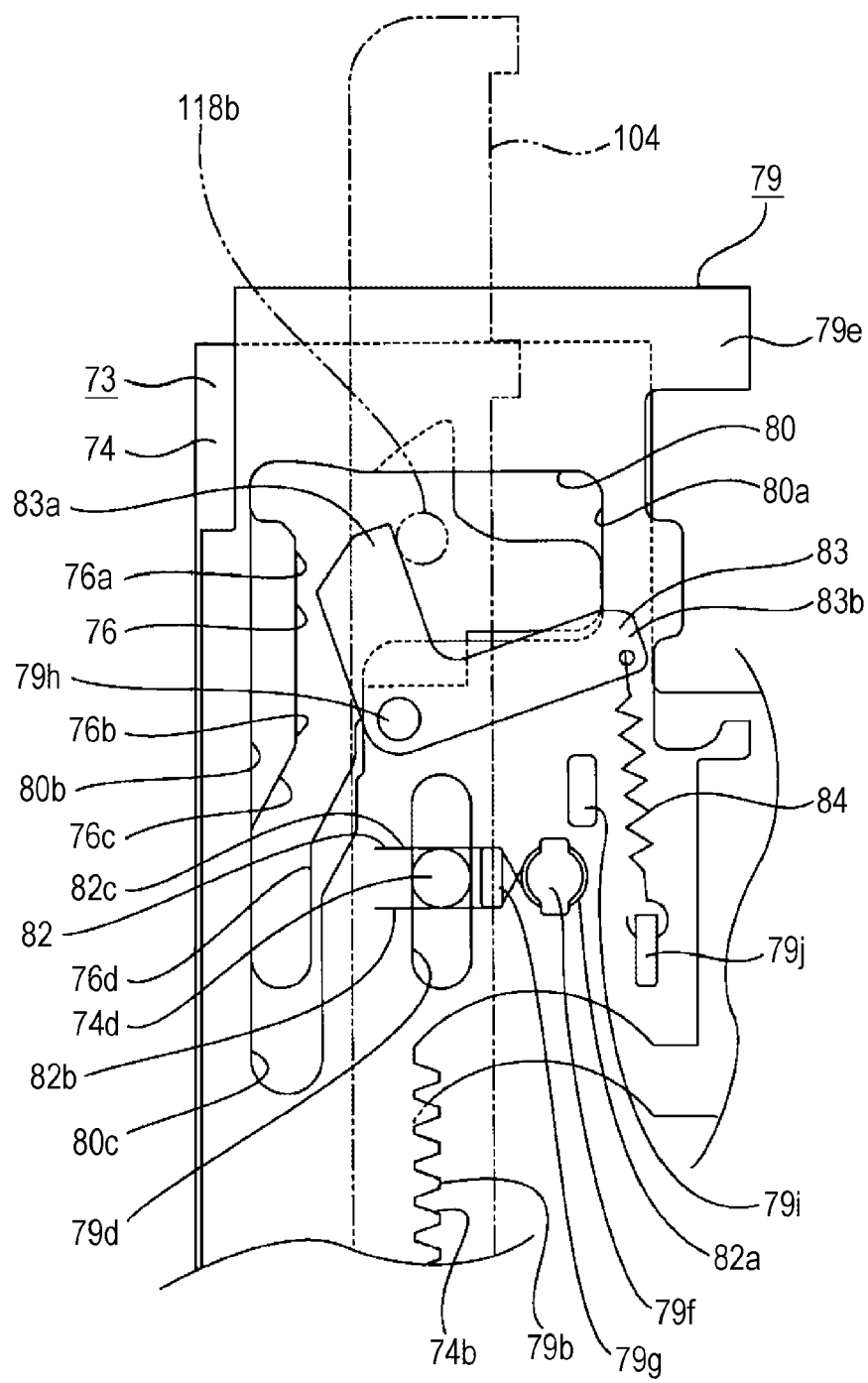
FIG. 44 is a schematic enlarged plan view illustrating a state wherein an operating lever is pressed and turned by a slave shaft of a limit lever.

When the disc-shaped recording medium 200 is conveyed further toward the rear, the first rail 104 and second rail 123 are further moved in parallel so as to mutually separate, whereby the first portion 83a of the action lever 83 supported by the sub slider 79 is pressed towards the left by the slave shaft 118b of the limit lever 118 (see FIG. 44). Accordingly, the action lever 83 turns in the counter-clockwise direction as seen from a plane, counter to the biasing force of the tension coil spring 84. The first rail 104 and second rail 123 continue to move in parallel so as to mutually separate, whereby the slave shaft 118b of the limit lever 118 is moved towards the left so as to cross over, from the upper side, the first portion 83a of the action lever 83, and action lever 83 is turned in the clockwise direction as seen from a plane by the biasing force of the tension coil spring 84, and the second portion 83b is returned to the original position which touches the turn restricting protrusion 79i from behind. The slave shaft 118b of the limit lever 118 is further moved to the left according to the movement of the first rail 104, and is positioned near the left edge of the waiting portion 76a in the cam hole 76 of the first main slider 73.

Figure 45:
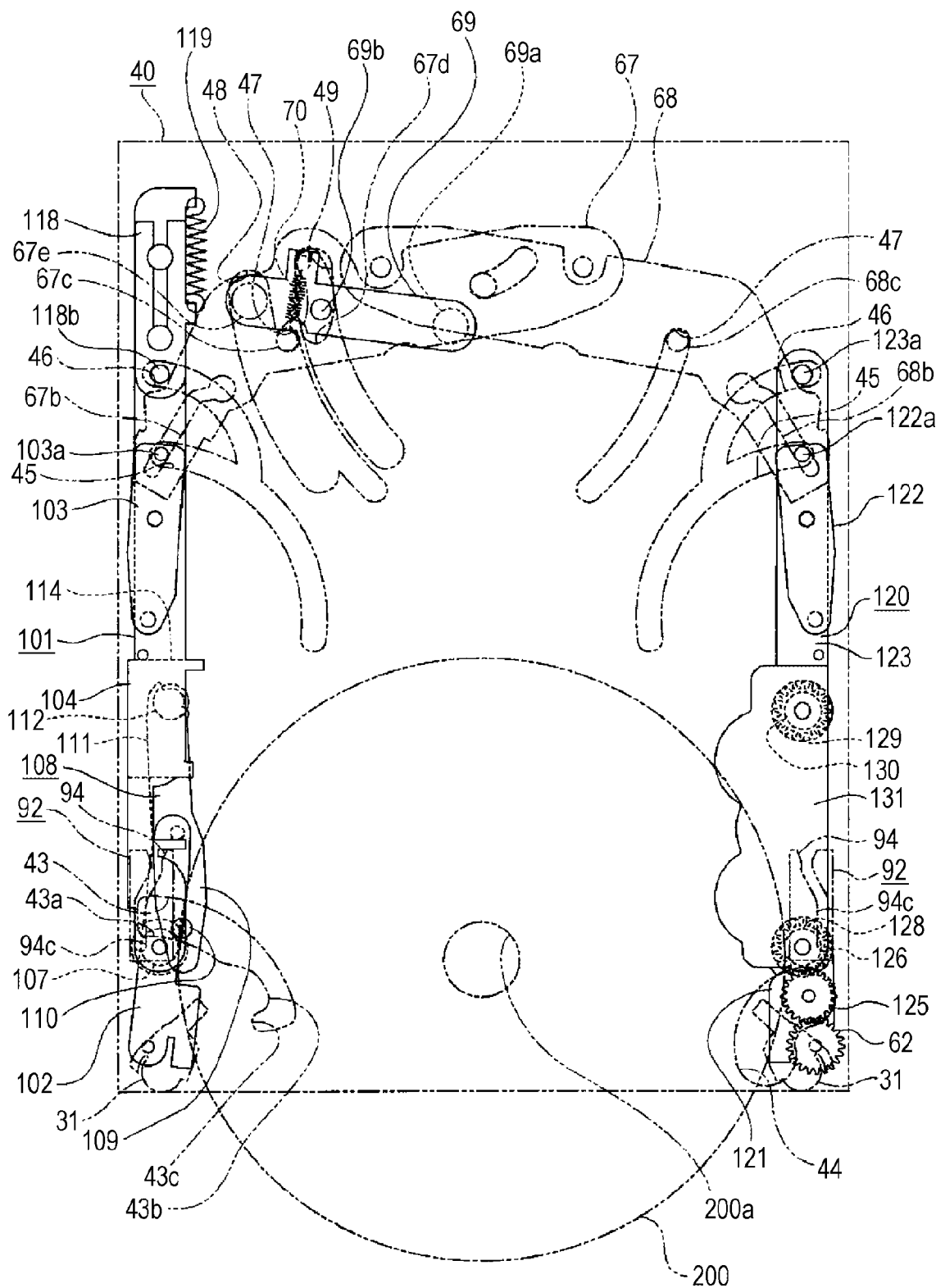
FIG. 45 is a schematic plan view illustrating a state wherein the disc-shaped recording medium continues to be conveyed towards a chucking position.

At this time, the first front side link arm 102, first rear side link arm 103, second front side link arm 121, and second rear side link arm 122 are further turned toward the outside (see FIG. 45). The first rail 104 and second rail 123 are further moved in parallel in a direction so as to mutually separate, and the center of the disc-shaped recording medium 200 is positioned on a line linking the first rail 104 and second rail 123, whereupon the first rail 104 and second rail 123 are widely separated and the first front side link arm 102, first rear side link arm 103, second front side link arm 121, and second rear side link arm 122 are in a state of extending roughly to the front and back.

As described above, when in a state of the disc-shaped recording medium 200 being conveyed toward the rear by the driving roller 128 and fixing roller 107, and the first front side link arm 102 extended roughly front and back, the ejecting lever 108 is also further turned together with the first front side link arm 102, and the roller supporting face portion 111 and pressing roller 112 are stored in the storage portion 115 of the storage 114.

Figure 46:
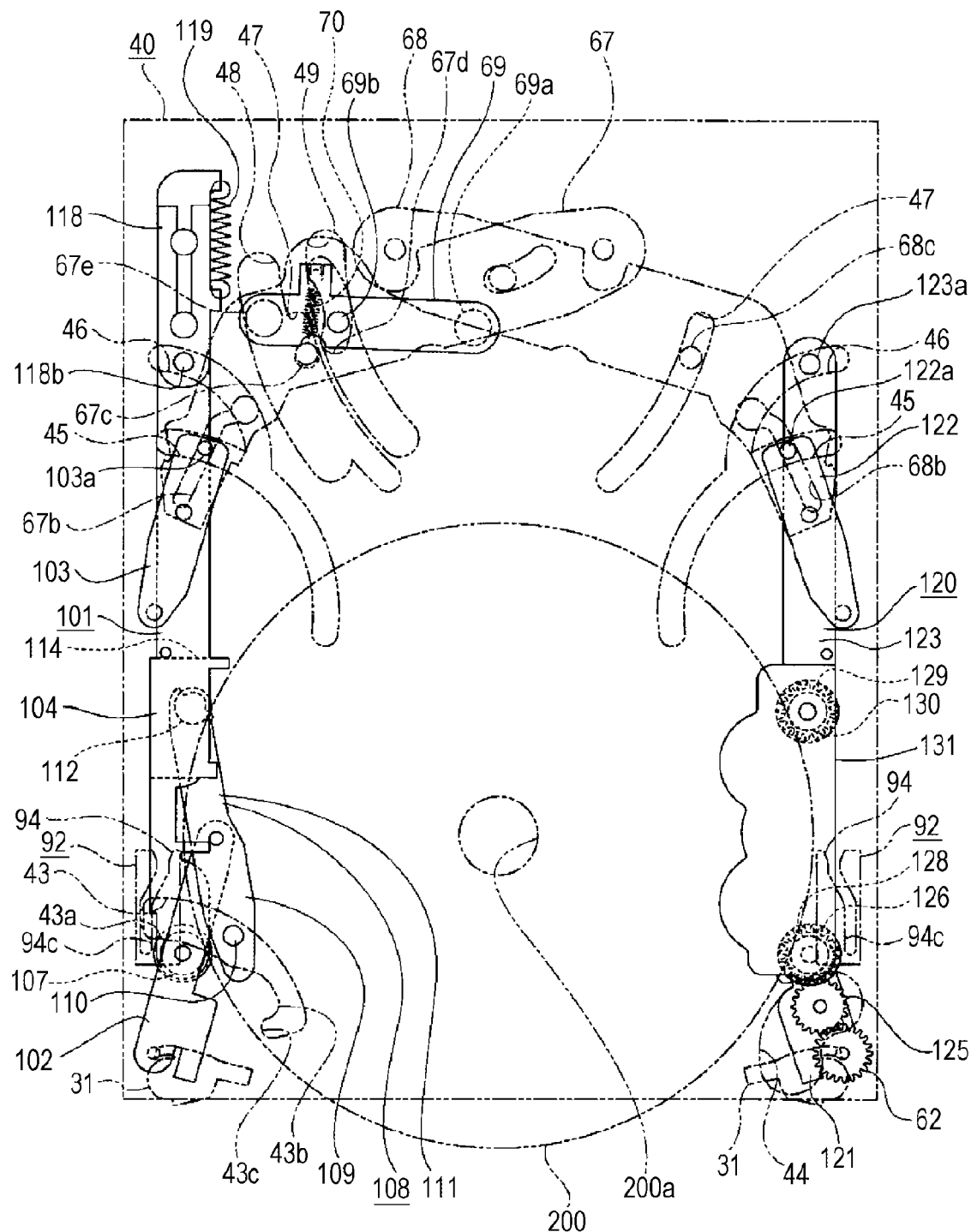
FIG. 46 is a schematic plan view illustrating a state wherein the disc-shaped recording medium continues to be conveyed towards a chucking position.

Further, as the disc-shaped recording medium 200 is conveyed toward the rear by the driving roller 128 and fixing roller 107, the peripheral face of the disc-shaped recording medium 200 is in a state of touching the driving roller 128, fixed roller 107, pressing roller 112, and turning roller 130 (see FIG. 46).

At this time, the peripheral portion of the disc-shaped recording medium 200 is guided by the front side guiding face 116a formed on the front side guiding portion 116 of the storage 114, and is conveyed to the rear.

Further, when the disc-shaped recording medium 200 is conveyed toward the rear, contact between the route adjusters 31 and the disc-shaped recording medium 200 is disengaged, and the route adjusters 31 are turned to a neutral position by the biasing force of the return springs 39.

Further, when the disc-shaped recording medium 200 is conveyed toward the rear, the first rail 104 and second rail 123 are moved in parallel in the direction of nearing each other, and the first front side link arm 102, first rear side link arm 103, second front side link arm 121, and second rear side link arm 122 are turned inwards.

Figure 47:
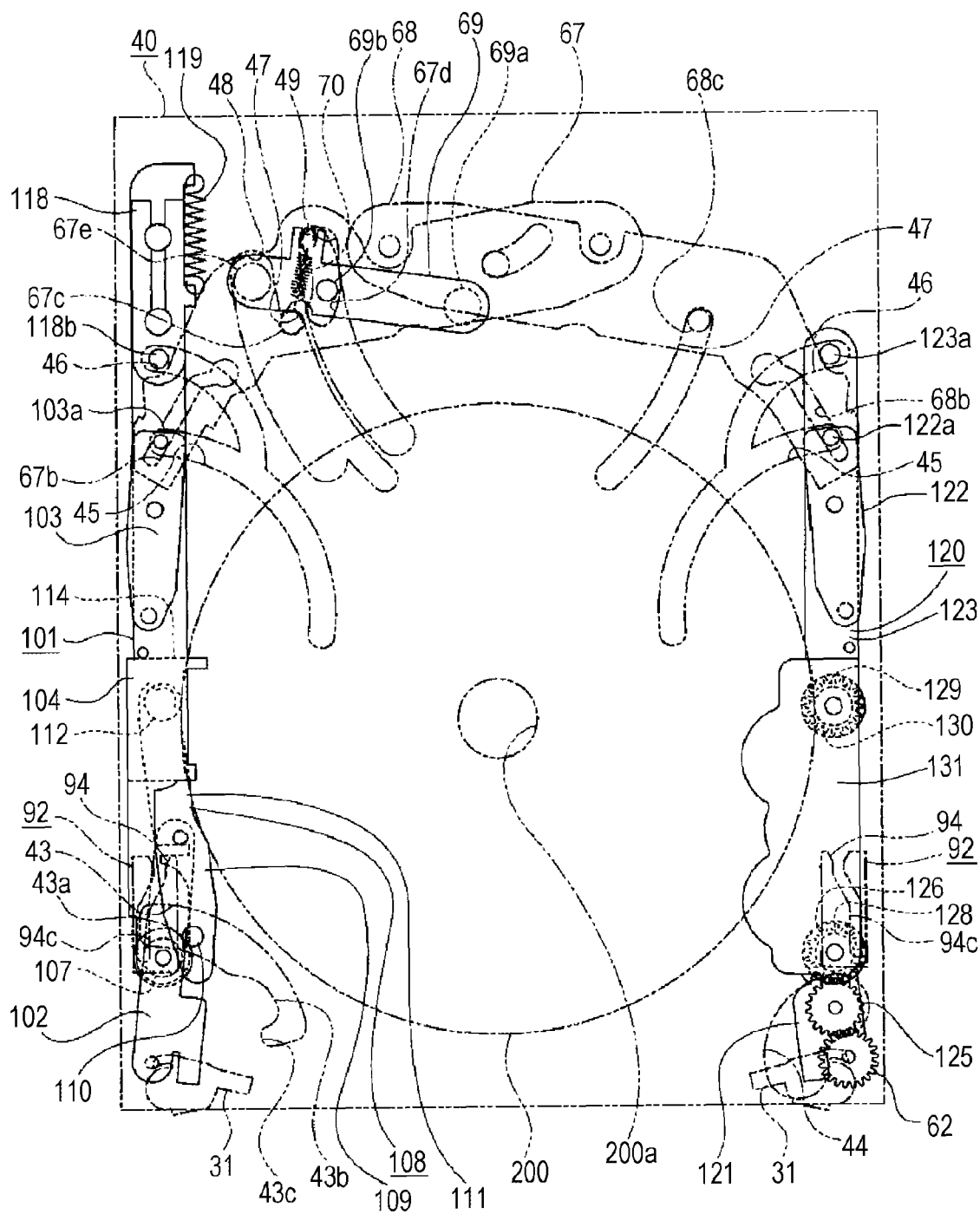
FIG. 47 is a schematic plan view illustrating a state wherein the disc-shaped recording medium continues to be conveyed towards a chucking position.

The disc-shaped recording medium 200 continues to be conveyed toward the rear by the rotating roller 130 and pressing roller 112, and the driving roller 128 and fixed roller 107 separate from the peripheral face of the disc-shaped recording medium 200 (see FIG. 47).

When the disc-shaped recording medium 200 is further conveyed toward the rear, the first rail 104 and second rail 123 are moved in parallel again in the direction of mutually separating, and the first front side link arm 102, first rear side link arm 103, second front side link arm 121, and second rear side link arm 122 are again turned outwards. When the first rail 104 and second rail 123 are moved in parallel in the direction of mutually separating, and the disc-shaped recording medium 200 is positioned on a line linking the turning roller 130 and pressing roller 112, the first rail 104 and second rail 123 widely separate again, and the first front side link arm 102, first rear side link arm 103, second front side link arm 121, and second rear side link arm 122 are in a state of extending front to back again.

As described above, when the disc-shaped recording medium 200 is conveyed toward the rear by the rotating roller 130 and pressing roller 112, the peripheral portion of the disc-shaped recording medium 200 is guided by the front side disc guiding face 116a of the front side guiding portion 116 of the storage 114 and the rear side disc guiding faces 117a of the rear side guiding portion 117, and conveyed toward the rear.

Figure 48:
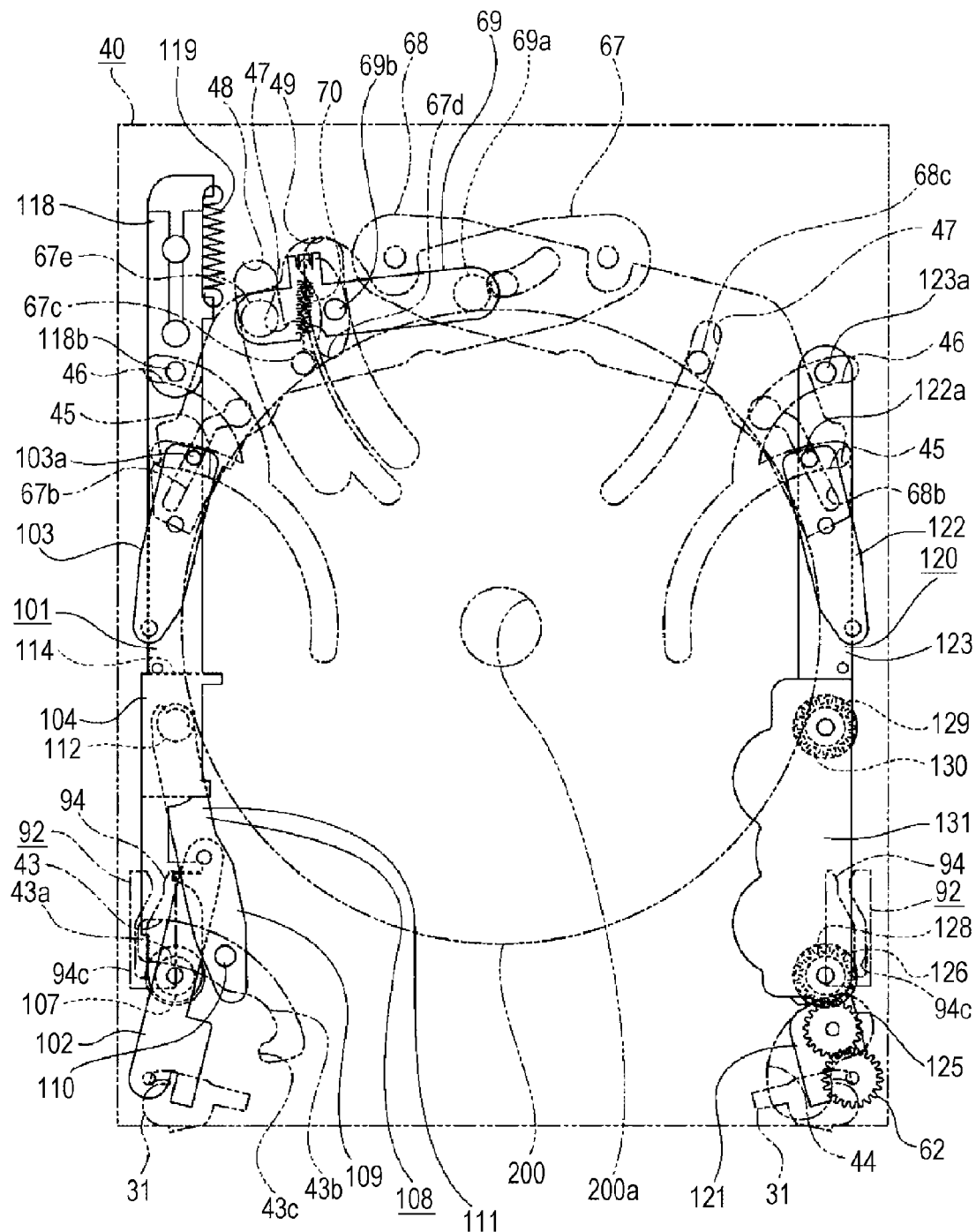
FIG. 48 is a schematic plan view illustrating a state wherein the disc-shaped recording medium continues to be conveyed towards a chucking position.
Figure 49:
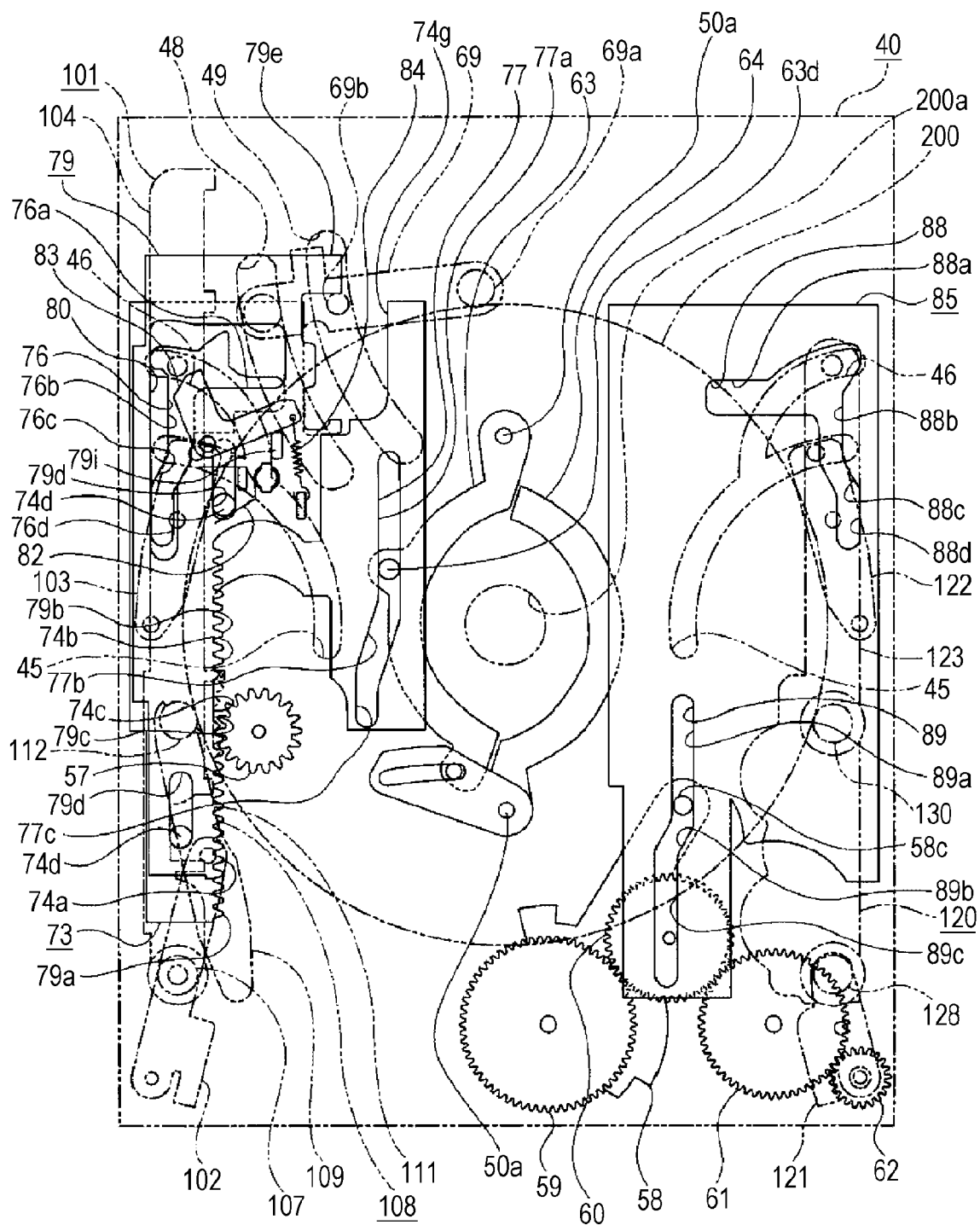
FIG. 49 is a schematic plan view illustrating a state wherein the sub slider is moved to the rear.

The disc-shaped recording medium 200 continues to be conveyed toward the rear to the chucking position by the driving roller 128 and fixed roller 107 (see FIG. 48).

Upon the disc-shaped recording medium 200 being conveyed to a chucking position, i.e. a position where the center hole of the disc-shaped recording medium 200 is existing directly above the disc table of the base unit, the peripheral face of the disc-shaped recording medium 200 is in a state of touching the pressing roller 112, rotating roller 130, disc holding pin 67c of the first interlocking lever 67, and disc holding pin 68c of the second interlocking lever 68, and the disc-shaped recording medium 200 is held at four points and the movement of the disc-shaped recording medium 200 is stopped at the chucking position.

Upon the disc-shaped recording medium 200 being conveyed to the chucking position, the slave shaft 118b of the limit lever 118 is moved to a position near the left edge of the waiting portion 76a in the cam hole 76 of the first main slider 73, and the slave shaft 123a of the second rail 123 is moved to a position near the right edge of the waiting portion 88a in the cam hole 88 of the second main slider 85.

Upon the disc-shaped recording medium 200 being conveyed to the chucking position, pressed shaft 69a of the starting lever 69 turnably supported by the first interlocking lever 67 is pressed toward the rear by the peripheral face of the disc-shaped recording medium 200. Upon the pressed shaft 69a being pressed toward the rear by the disc-shaped recording medium 200, the starting lever 69 is turned counter to the biasing force of the coil spring 70, and the action protrusion 79e of the sub slider 79 is pressed toward the rear by the action shaft 69b (see FIG. 49).

Upon the starting lever 69 being turned and the action protrusion 79e being pressed toward the rear by the action shaft 69b, the sub slider 79 is moved from a non-meshed position toward the rear as to the first main slider 73, and the first sub rack portion 79a meshes with the driving gear 57 that is rotated by the driving force of the driving motor 52. At this time, by the sub slider 79 being moved from the non-meshed position toward the rear as to the first main slider 73, an edge portion 82b of the position control spring 82 is pressed forward to the support pin 74d of the first main slider 73, and movement force toward the front is applied by the position control spring 82 to the sub slider 79.

Upon the first sub rack portion 79a being meshed with the driving gear 57, the sub slider 79 is moved toward the rear by the driving force of the driving motor 52. Upon the sub slider 79 moving toward the rear, the front side opening edges of the supported holes 79d each touch the supporting pins 74d of the first main slider 73. The sub slider 79 is moved toward the rear, whereby the action protrusion 79e is separated from the action shaft 69b toward the rear.

The support pins 74d function as movement restriction portions that restrict the movement of the sub slider 79 as to the first main slider 73, and the supported holes 79d function as restricted portions whereby the movement of the sub slider 79 as to the first main slider 73 is restricted by the support pins 74d that function as movement restricting portions.

Figure 50:
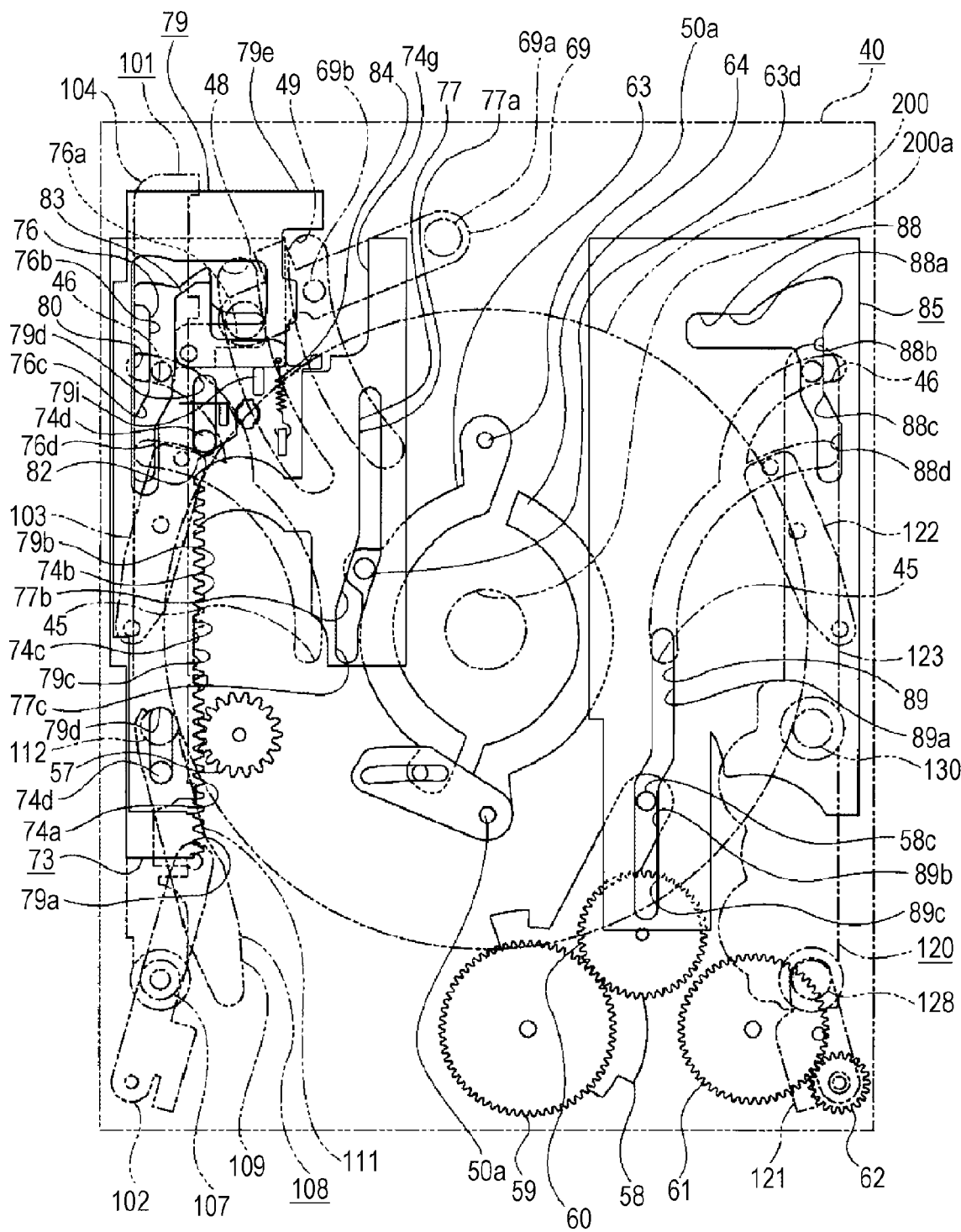
FIG. 50 is a schematic plan view illustrating a state wherein the first main slider and sub slider are integrated and moved to the rear.

As the sub slider 79 continues to be moved toward the rear in the state of the front side opening edges of the supported holes 79d each touching the supporting pins 74d of the first main slider 73, the supporting pins 74d are pressed toward the rear by the front side opening edges of the supported holes 79d, and the first main slider 73 and sub slider 79 are integrally moved toward the rear (see FIG. 50). Accordingly, the first main rack portion 74a of the first main slider 73 meshes with the driving gear 57, and the first main rack portion 74a and the first sub rack portion 79a of the sub slider 79 are meshed together with the driving gear 57.

As the first main slider 73 and sub slider 79 are integrated and moved toward the rear, the slave shaft 118b of the limit lever 118 is moved from the waiting portion 76a in the cam hole 76 of the first main slider 73 to the first straight line portion 76b, and the slave shaft 123a of the second rail 123 is moved from the waiting portion 88a in the cam hole 88 of the second main slider 85 to the first straight line portion 88b.

At this time, with the movement toward the rear of the second main slider 85, the sliding pin 58c of the gear supporting plate 58 is moved from the rear side sliding portion 89a of the cam sliding hole 89 of the second main slider 85 to the front side sliding portion 89c via the sloped sliding portion 89b. Accordingly, the gear supporting plate 58 is turned in a counter-clockwise direction from a planar view, the switching gear 60 is moved and the meshing between the switching gear 60 and the second transmitting gear 61 is disengaged, and the rotation of the driving roller 128 and the rotating roller 130 is stopped.

Figure 51:
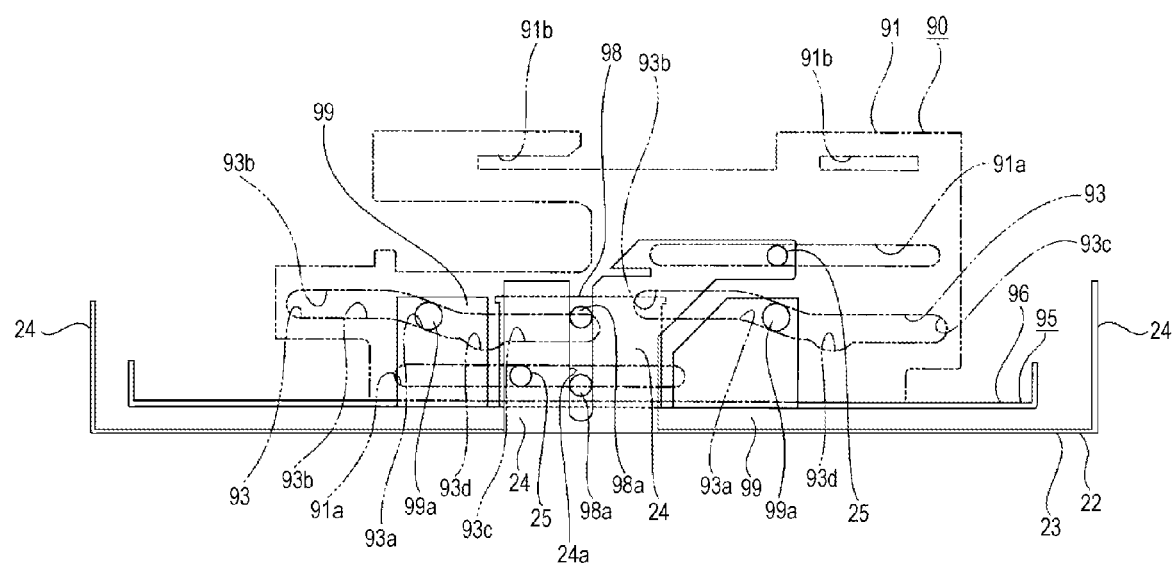
FIG. 51 is a schematic side view illustrating a state of the unit plate being moved upwards.

When the first main slider 73 and second main slider 85 are slid toward the rear as described above, the side sliders 90 are integrated and moved toward the rear (see FIG. 51).

Upon the side sliders 90 being moved toward the rear, the guided pins 99a of the unit plate 95 biased downward by the springs 100 are moved from the holding recesses 93d of the elevator cam holes 93 to the sloping cam portions 93a. Accordingly, the unit plate 95 and the base unit disposed on the unit plate 95 are moved upward and the disc table nears the chucking pulley 66.

Figure 52:
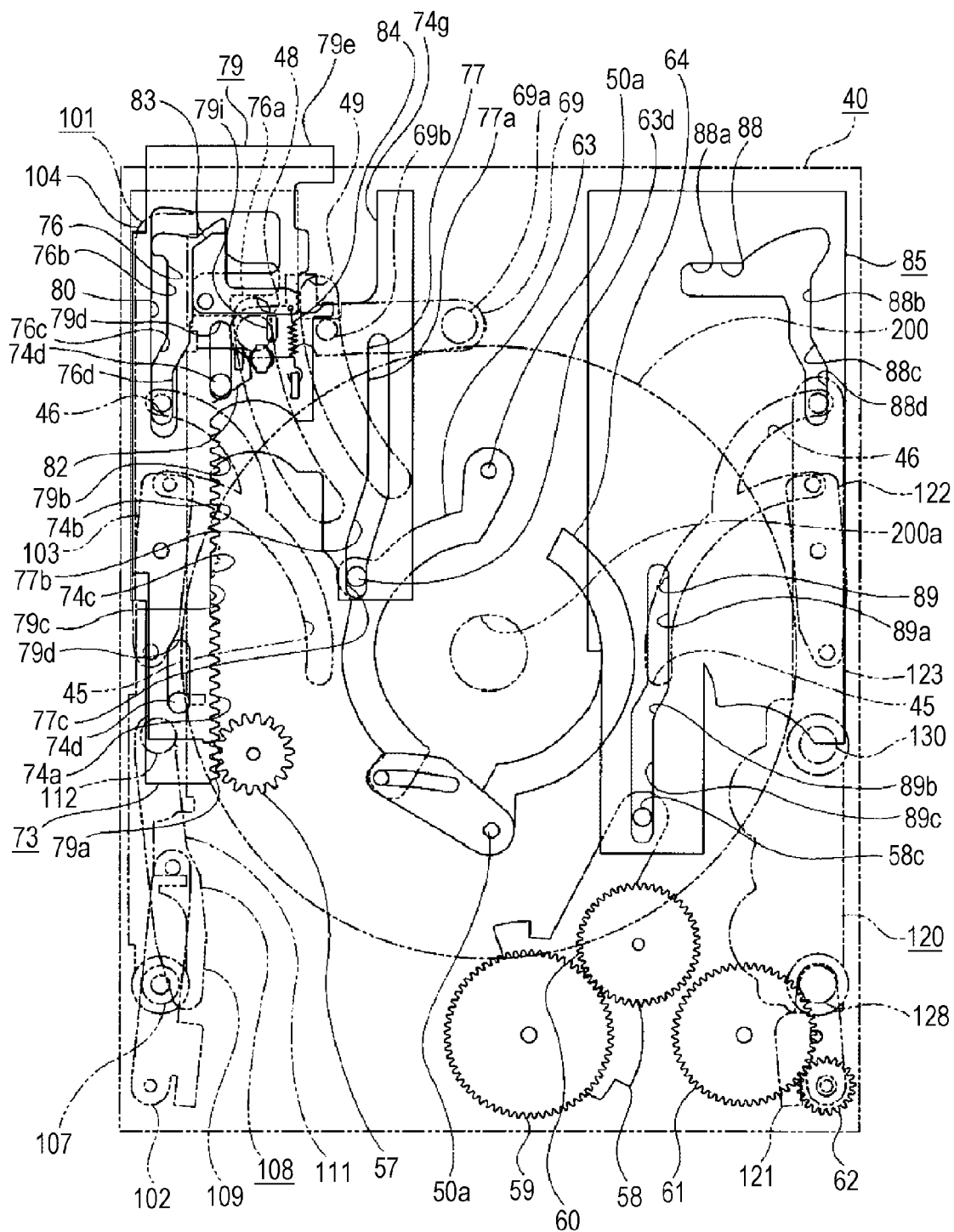
FIG. 52 is a schematic plan view illustrating a state wherein the first main slider and sub slider have been moved to the moving edge at the rear.

Further, the first main slider 73 and sub slider 79 are integrated and move toward the rear by the rotation of the driving gear 57 (see FIG. 52).

Further, by the first main slider 73 and sub slider 79 integrating and moving toward the rear by the rotation of the driving gear 57, the slave shaft 118b of the limit lever 118 is moved from the first straight line portion 76b in the cam hole 76 of the first main slider 73 to the second straight line portion 76d via the sloping portion 76c. At the same time, the slave shaft 123a of the second rail 123 is moved from the first straight line portion 88b in the cam hole 88 of the second main slider 85 to the second straight line portion 88d via the sloping portion 88c.

Figure 53:
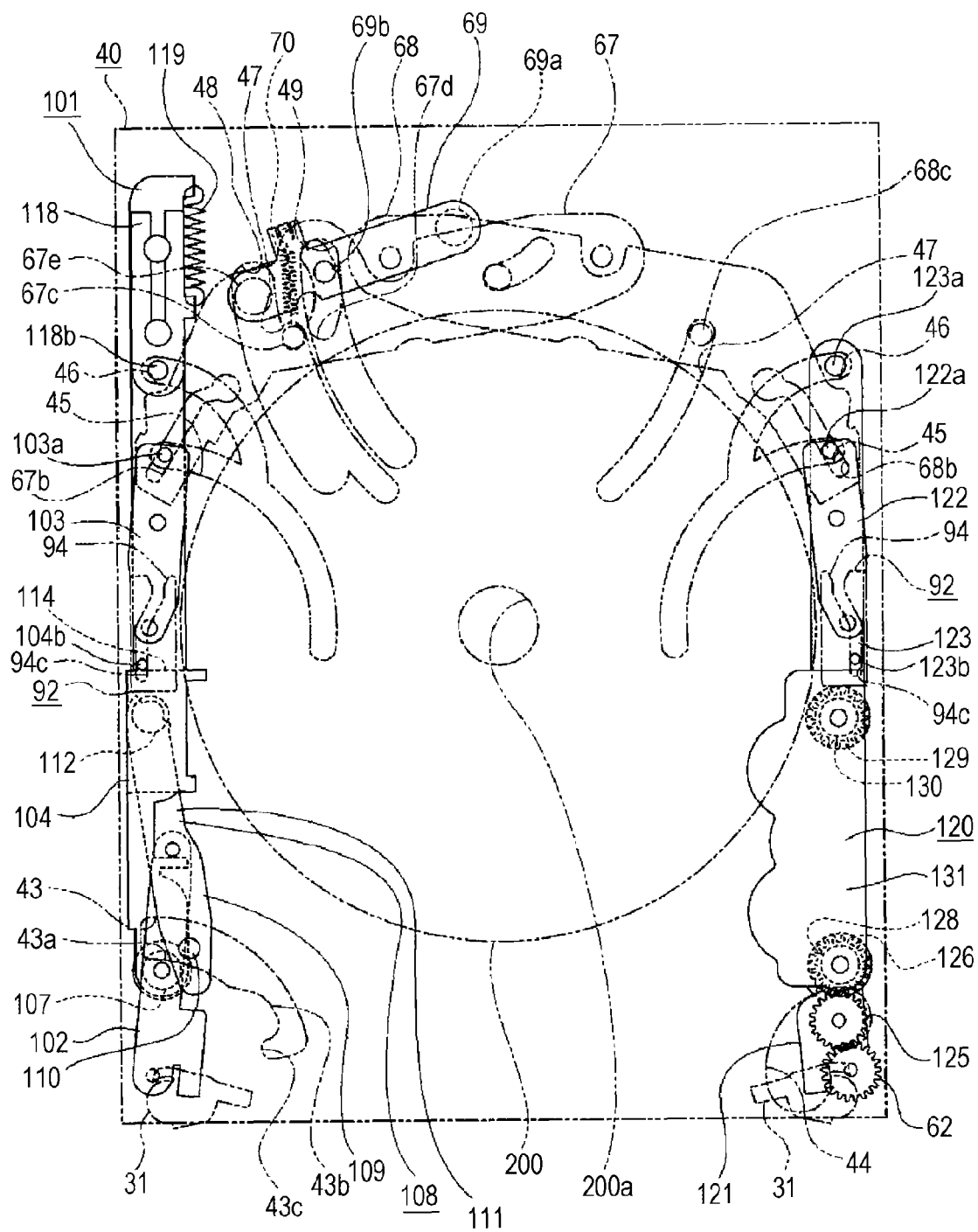
FIG. 53 is a schematic plan view illustrating a state wherein the first rail and second rail are moved in directions so as to mutually separate from each other, and a pressing roller and rotating roller and disc holding pin are separated from the peripheral face of the disc-shaped recording medium.

Accordingly, the first rail 104 and second rail 123 move in the direction of mutually separating, and the pressing roller 112 and rotating roller 130 are separated from the peripheral portion of the disc-shaped storage medium 200 (see FIG. 53). At the same time, the first interlocking lever 67 and second interlocking lever 68 are turned together with the turning operations of the first rear side link arm 103 and second rear side link arm 122, and the disk holding pins 67c and 68c are separated from the peripheral face of the disc-shaped storage medium 200.

The first rail 104 and second rail 123 are moved to the farthest separated positions.

When the first rail 104 and second rail 1234 are moved to the farthest separated positions, at the same time the slave pin 63d of the first pulley holder 63 is moved from the rear side portion 77a in the cam supporting hole 77 of the first main slider 73 to the front side portion 77c via the intermediate portion 77b, due to the movement toward the rear of the first main slider 73. Accordingly, the first pulley holder 63 and second pulley holder 64 are turned from the holding position of holding the chucking pulley 66 to the direction counter to the biasing force of the coil spring 65 so as to be separated, the holding state of the first pulley holder 63 and second pulley holder 64 as to the chucking pulley 66 is disengaged whereby the chucking pulley 66 can be moved downwards.

Figure 54:
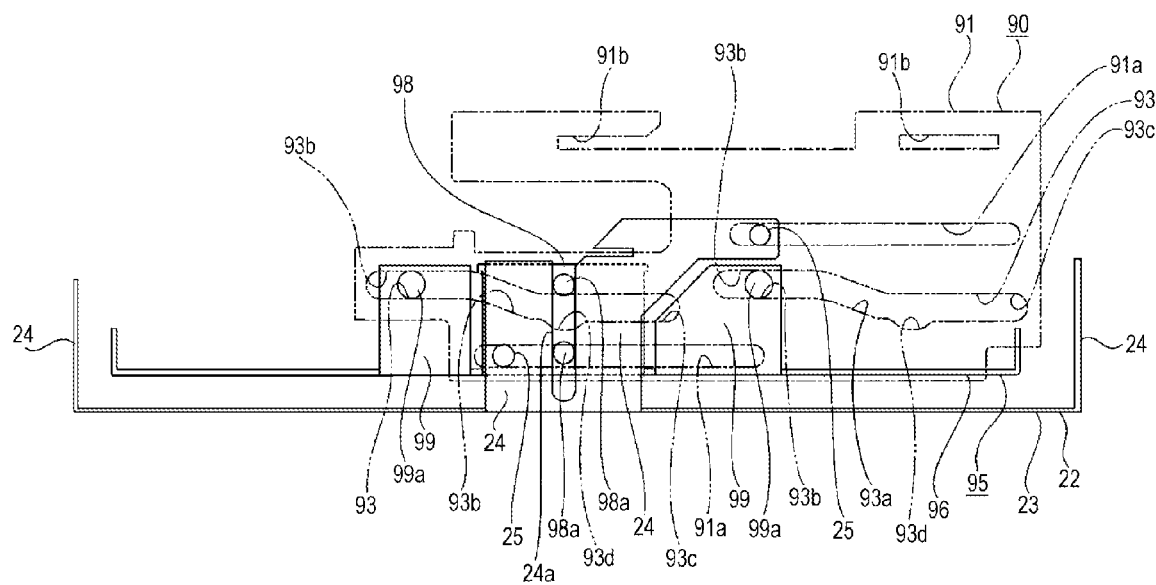
FIG. 54 is schematic side view illustrating a state wherein the unit plate has been moved to the upper moving edge.

Also, at this time, simultaneously, the side sliders 90 are moved toward the rear together with the movement toward the rear of the first main slider 73 and second main slider 85, and the guide receiving pins 99a of the unit plate 95 are each moved from the sloping cam portions 93a of the elevator cam holes 93 to the front side cam portions 93b (see FIG. 54). Accordingly, the unit plate 95 and the base unit disposed on the unit plate 95 are moved to the upper moving edge. In the state that the base unit is moved to the upper moving edge, a portion of the base unit is disposed in the base unit disposing hole 27a formed on the base plate portion 27 of the base plate 26.

Upon the base unit being moved to the upper moving edge, the chucking pulley 66 is attracted and held to the disc table, the disc-shaped recording medium 200 is held between the disc table and chucking pulley 66, and loading of the disc-shaped recording medium 200 is completed.

When the side sliders 90 are moved toward the rear, as described above, the first rail 104 and second rail 123 are moved toward positions that are farthest separated, and the inserting pin 104b of the first rail 104 and the inserting pin 123b of the second rail 123 are each inserted in the cam sliding holes 94 formed in the guide portions 92 of the side sliders 90.

The inserting pins 104b and 123b are inserted into the front side sliding portions 94c via the rear side sliding portions 94a and sloping sliding portions 94b of the cam sliding holes 94. Accordingly, the first rail 104 and second rail 123 are held in positions that are separated the farthest.

The first main slider 73 and sub slider 79 and the second main slider 85 are moved to the rear moving edge and stopped. Upon the first main slider 73 and sub slider 79 and the second main slider 85 having been moved to the rear moving edge, the driving of the driving motor 52 is stopped and rotation of the driving gear 57 is stopped.

Upon the disc-shaped recording medium 200 being chucked by the disc table and chucking pulley 66, the disc table is rotated, driving of an optical pickup is started, and recording or playing of the information signals as to the disc-shaped recording medium 200 is performed.

Upon the recording or playing of the information signals ending, rotation of the disc table is stopped and driving of the optical pickup is ended.

Ejecting Operation

Upon the recording or playing of the information signals as to the disc-shaped recording medium 200 ending, ejecting operations such as described below are performed by the disc conveying device 21 (see FIGS. 55 through 72). An ejecting operation is started by the driving motor 52 being rotated in the opposite direction from the rotation direction of the loading operations.

Figure 55:
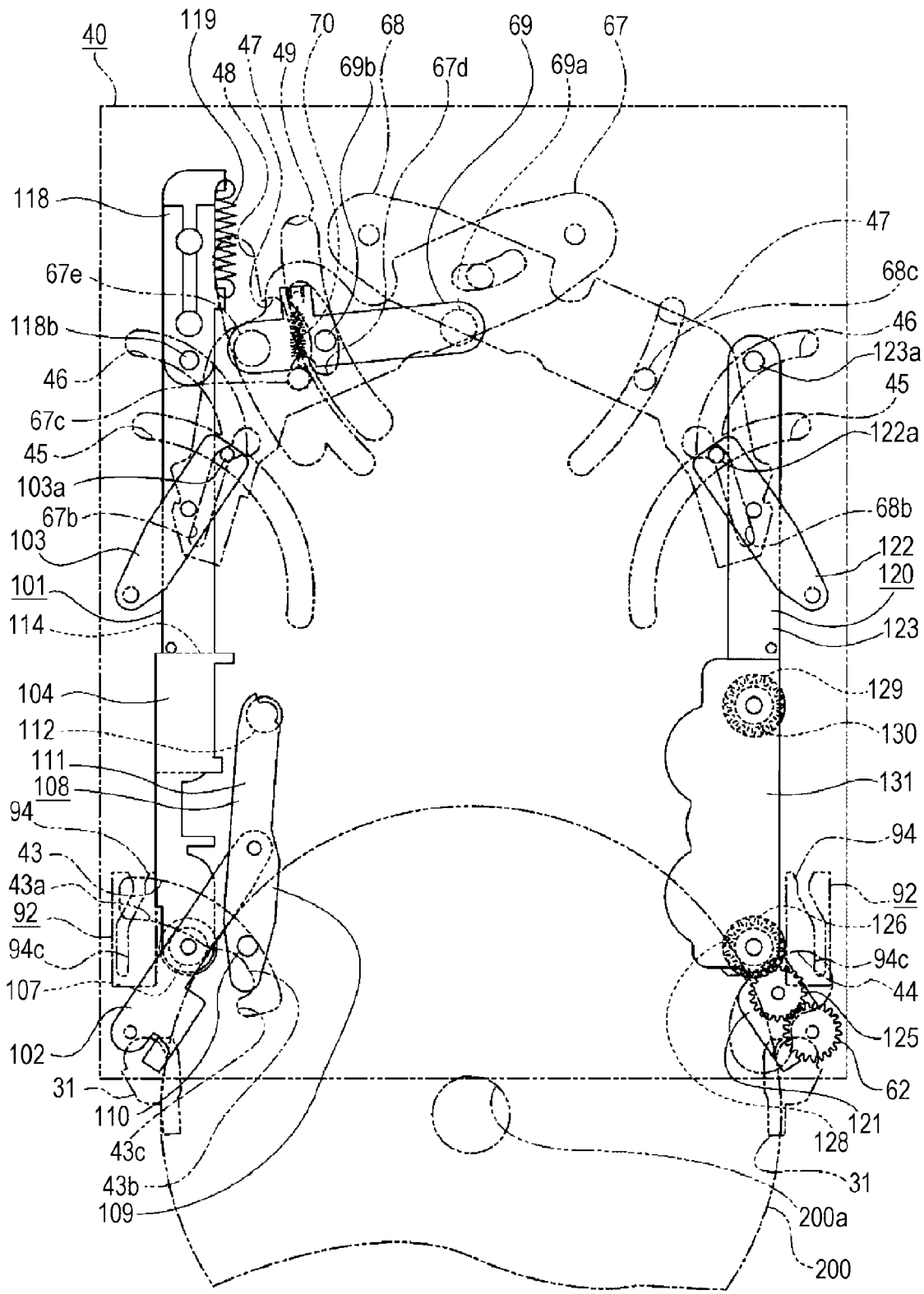
FIG. 55 is a schematic plan view illustrating a state wherein an ejecting operation has started, and the disc-shaped storage medium is conveyed toward the disc cartridge.
Figure 56:
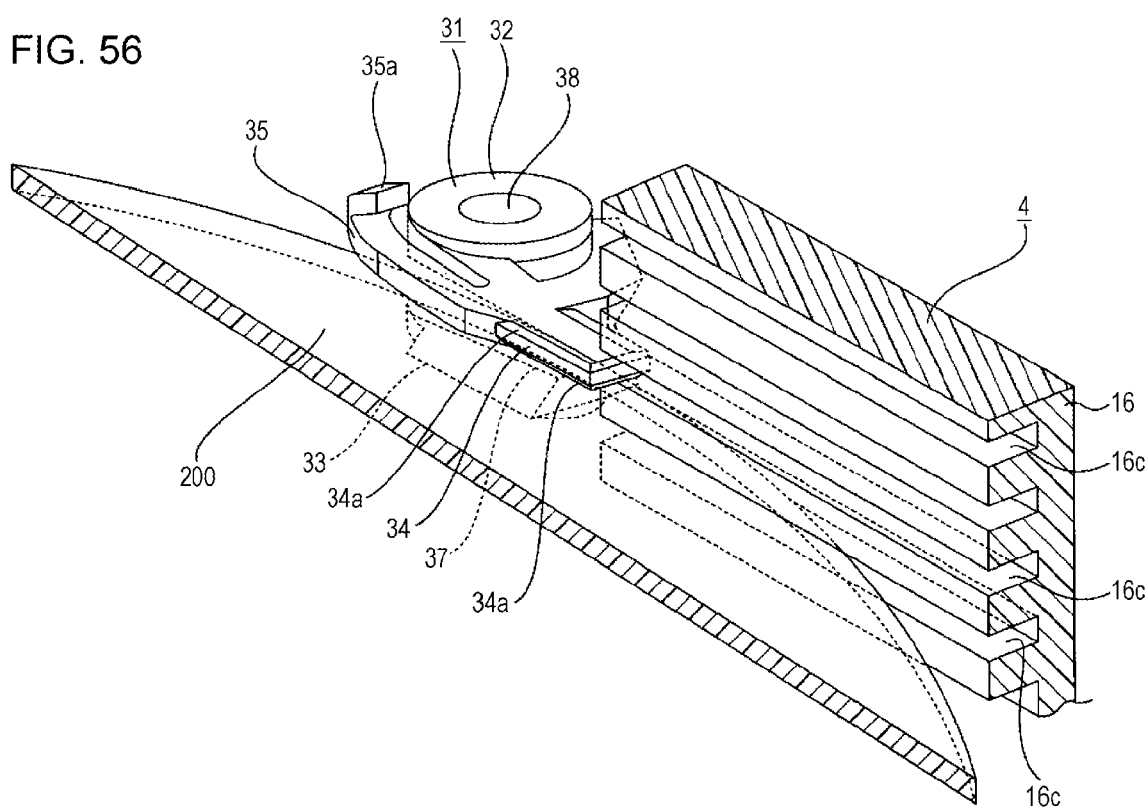
FIG. 56 is an enlarged perspective view illustrating a state wherein the route adjuster is turned, and the positioning protrusion is inserted into a holding groove in the disc cartridge and the position thereof determined.
Figure 57:
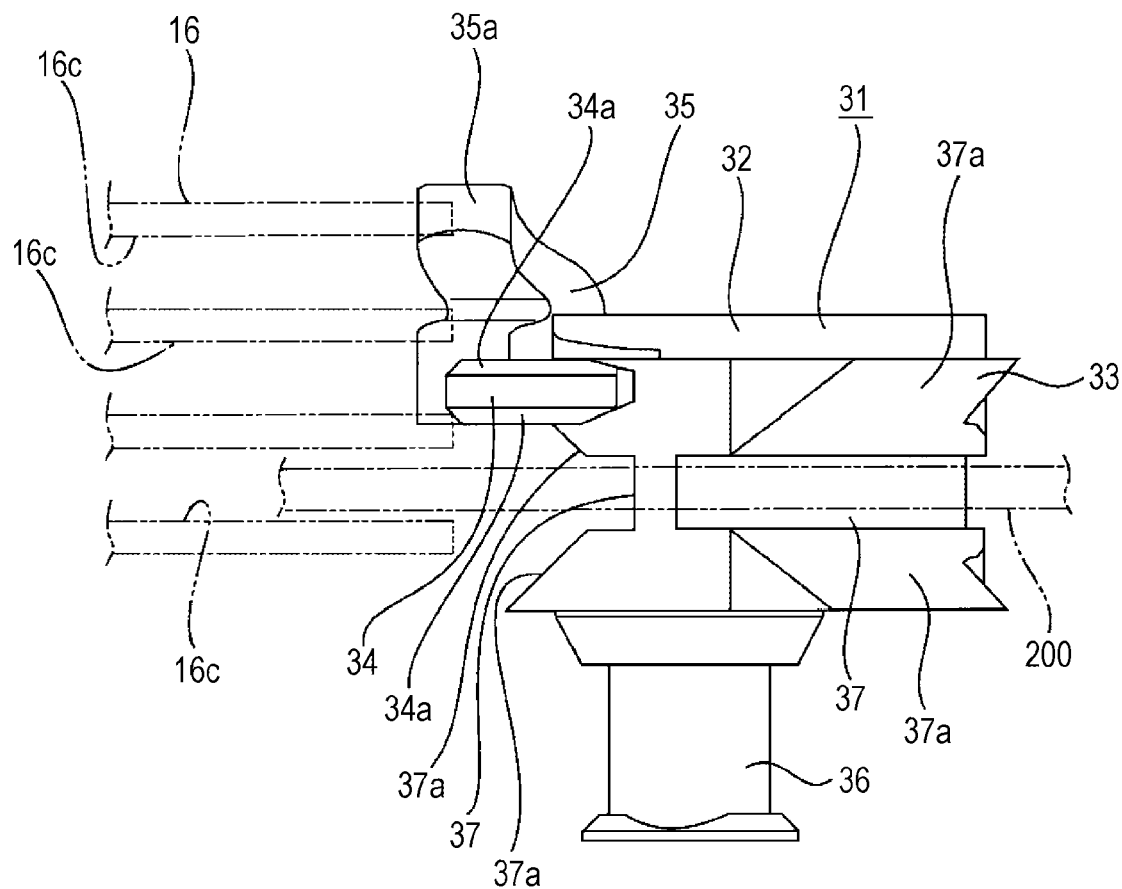
FIG. 57 is an enlarged side view illustrating a state wherein the route adjuster is turned, and the positioning protrusion is inserted into a holding groove in the disc cartridge and the position thereof determined.

Upon the driving motor 52 being rotated, the disc-shaped recording medium 200 is conveyed toward the front (in the ejecting direction) toward the disc cartridge 1 by an operation that is opposite from the various operations in the above-described loading operations, and the disc-shaped recording medium 200 is ejected from the disc conveying device 21 (see FIG. 55). At this time the first main slider 73 and sub slider 79 integrally moves toward the front by the driving force of the driving motor 52.

The first main slider 73 and second main slider 85 are moved toward the front, whereby the slave shaft 118b of the limit lever 118 is moved from the second straight line portion 76d in the cam hole 76 of the first main slider 73 to a position near the left edge of the waiting portion 76a via the sloping portion 76c and the first straight line portion 76b. Also, the slave shaft 123a of the second rail 123 is moved from the second straight line portion 88d in the cam hole 88 of the second main slider 85 to the waiting portion 88a, via the sloping portion 88c and the first straight line portion 88b. At this time the sliding pin 58c of the gear supporting plate 58 is moved from the front side sliding portion 89c of the cam sliding hole 89 of the second main slider 85 to the rear side sliding portion 89a via the sloping sliding portion 89b, and the switching gear 60 and second transmitting gear 61 are meshed again.

Also, slave pin 63d of the first pulley holder 63 is moved from the front side portion 77c in the cam supporting hole 77 of the first main slider 73 to the rear side portion 77a via the intermediate portion 77b, and the chucking pulley 66 is held by the first pulley holder 63 and second pulley holder 64 again. The unit plate 95 and the base unit disposed on the unit plate 96 are lowered by the movement toward the front of the side sliders 90 together with the movement toward the front of the first main slider 73 and second main slider 85, and the guide receiving pins 99a are each held in the holding recesses 93d of the elevator cam holes 93 again.

The disc-shaped recording medium 200 is conveyed to a position of touching the driving roller 128 and fixed roller 107 and wherein roughly half of the disc-shaped recording medium 200 protrudes forward from the disc conveying device 21.

Upon the disc-shaped recording medium 200 being conveyed toward the disc cartridge 1, the route adjusters 31 are pressed forward by the disc-shaped recording medium 200. Positioning grooves 37 are formed on the route adjusters 31, and the peripheral portion of the disc-shaped recording medium 200 is guided by the guiding faces 37a and inserted into the positioning grooves 37.

Accordingly, the peripheral portion of the disc-shaped recording medium 200 is inserted into the positioning grooves 37 by the guiding faces 37a in a sure manner, thereby improving positional accuracy of the disc-shaped recording medium 200 in the vertical direction.

The route adjusters 31 pressed by the disc-shaped recording medium 200 are turned counter to the biasing force of the return springs 39 in a state of having positioned the disc-shaped recording medium 200. At this time the positioning protrusions 34 of the route adjusters 31 are inserted into the holding grooves 16c which are separated and positioned left and right of the disc cartridge 1 (see FIG. 56). The positioning protrusions 34 of the route adjusters 31 are inserted into the holding grooves 16c which are, for example, one level above the holding grooves 16c in which the disc-shaped recording medium 200 is inserted (see FIG. 56 and FIG. 57).

When the positioning protrusion 34 is inserted into the holding groove 16c, the positioning protrusion 34 is positioned in the holding groove 16c, the guided face 34a on the upper side or the guided face 34a on the lower side formed on both upper and lower edges having been slid to the rear side opening edge of the holding groove 16c. In the disc conveying device 21, when the positioning protrusion 34 is inserted into the holding groove 16c, for example the guided face 34a on the lower side is slid to the rear side opening edge and set so as to be positioned in the holding groove 16c.

Accordingly, the positioning protrusions 34 of the route adjusters 31 are positioned in a state of being pressed to the lower face on which the holding grooves 16c, which are one level above the holding grooves 16c in which the disc-shaped recording medium 200 is inserted, are formed.

The first rail 104 and second rail 123 are moved in parallel in the direction of being mutually closer, as the disc-shaped recording medium 200 is ejected from the disc conveying device 21, and the first front side link arm 102, first rear side link arm 103, second front side link arm 121, and second rear side link arm 122 are turned inward. At this time the ejecting lever 108 is also turned inward together with the turning operation of the first front side link arm 102, and the roller supporting face portion 111 and pressing roller 112 are protruded toward the right from the storage 114.

The first main slider 73 and the sub slider 79 are stopped in a non-meshed position which is a position wherein the non-rack portion 74c is positioned facing the driving gear 57 and a non-meshed position which is a position wherein the non-rack portion 79c is positioned facing the driving gear 57, respectively. Also, the first main slider 73 and the second main slider 85 are synchronously moved toward the front with the first main slider 73, at predetermined positions.

Figure 58:
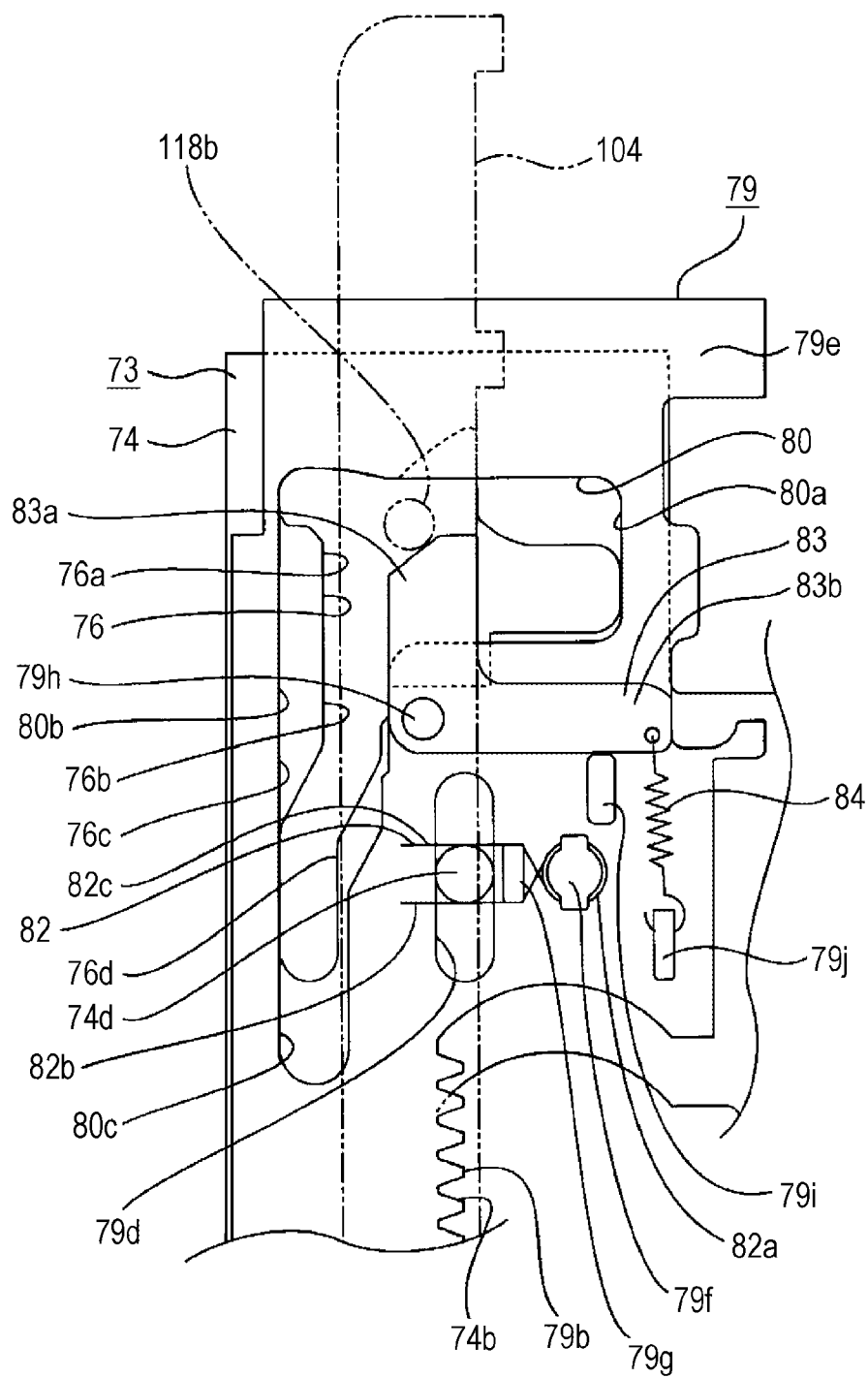
FIG. 58 is a schematic enlarged plan view illustrating a state wherein an operating lever is pressed by the slave shaft of the limit lever, and movement of the sub slider towards the front has begun.

By the conveying toward the front of the disc-shaped recording medium 200, upon the first rail 104 and second rail 123 being moved in parallel in the direction of being mutually closer, the first portion 83a of the operating lever 83 supported by the sub slider 79 is pressed toward the right by the slave shaft 118b of the limit lever 118 (see FIG. 58).

Accordingly, the turn restricting protrusion 79i is pressed toward the front by the operating lever 83, and the sub slider 79 is moved toward the front from the non-meshed position as to the first main slider 73.

Figure 59:
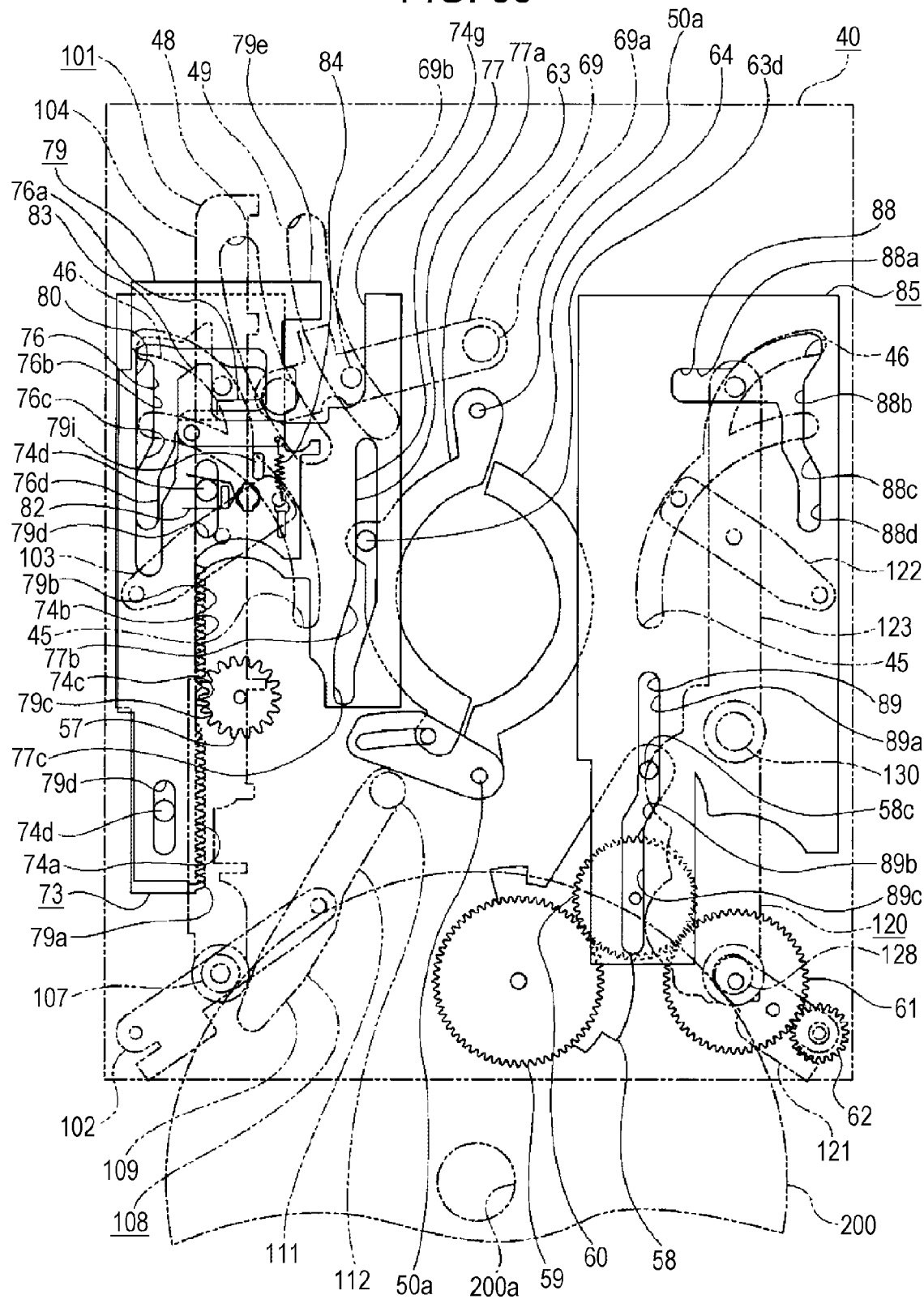
FIG. 59 is a schematic enlarged plan view illustrating a state wherein the slave shaft of the limit layer is moved so as to pass the operating lever.

Upon the first rail 104 and second rail 123 being moved in parallel in the direction of being mutually closer, and the sub slider 79 moved toward the front, the slave shaft 118b of the limit lever 118 is moved towards the right so as to cross over the first portion 83a of the operating lever 83, from the upper side, of the waiting portion 76a of the cam hole 76 (see FIG. 59).

At this time, by the sub slider 79 being moved from the non-meshed position toward the front as to the first main slider 73, the other edge portion 82c of the position control spring 82 is pressed relatively toward the rear by the supporting pin 74d of the first main slider 73, and moving force is applied by the position control spring 82 to the sub slider 79 toward the rear.

Figure 60:
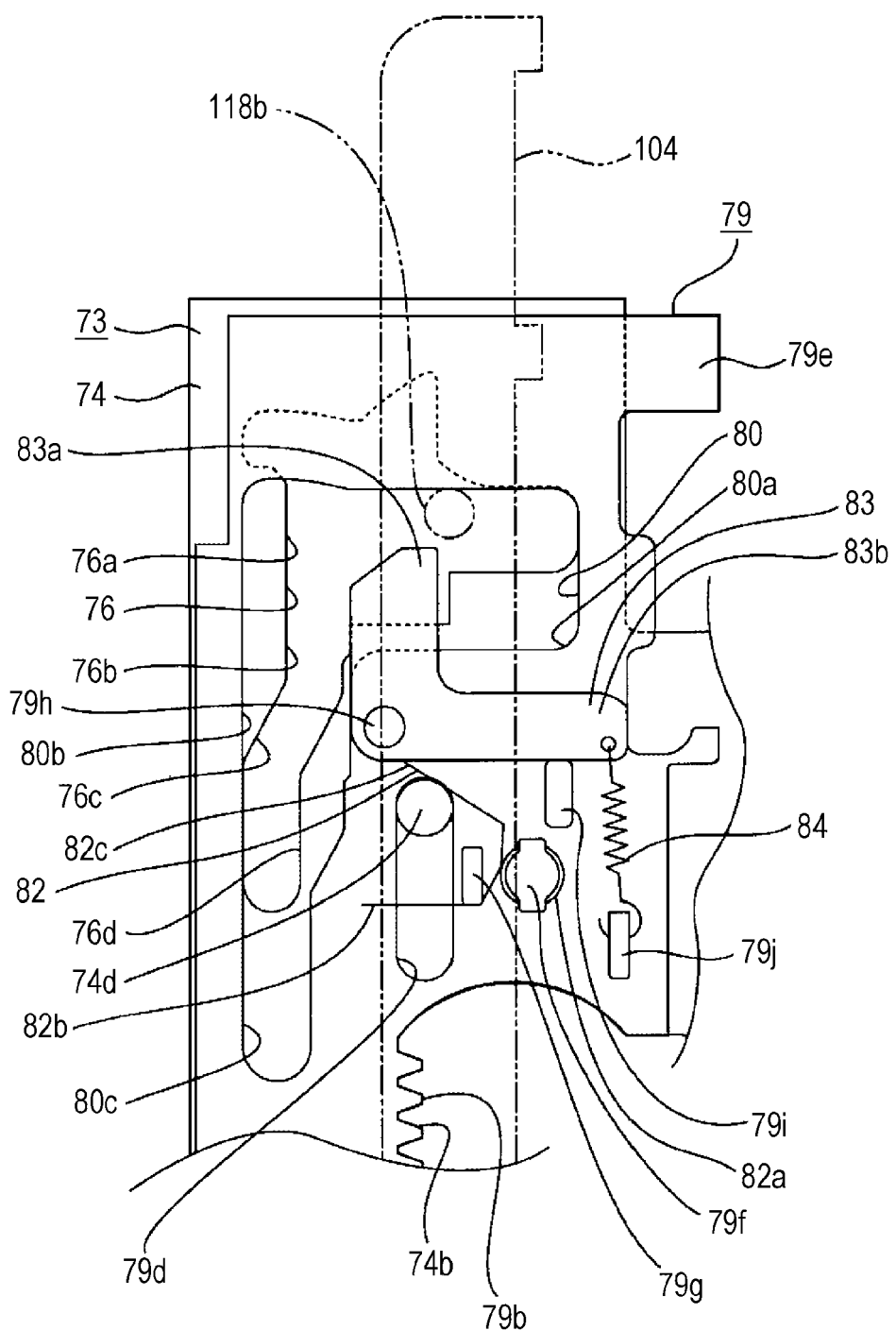
FIG. 60 is a schematic enlarged plan view illustrating a state wherein the slave shaft of the limit lever is pressed by the first main slider and movement of the first rail towards the front has begun.
Figure 61:
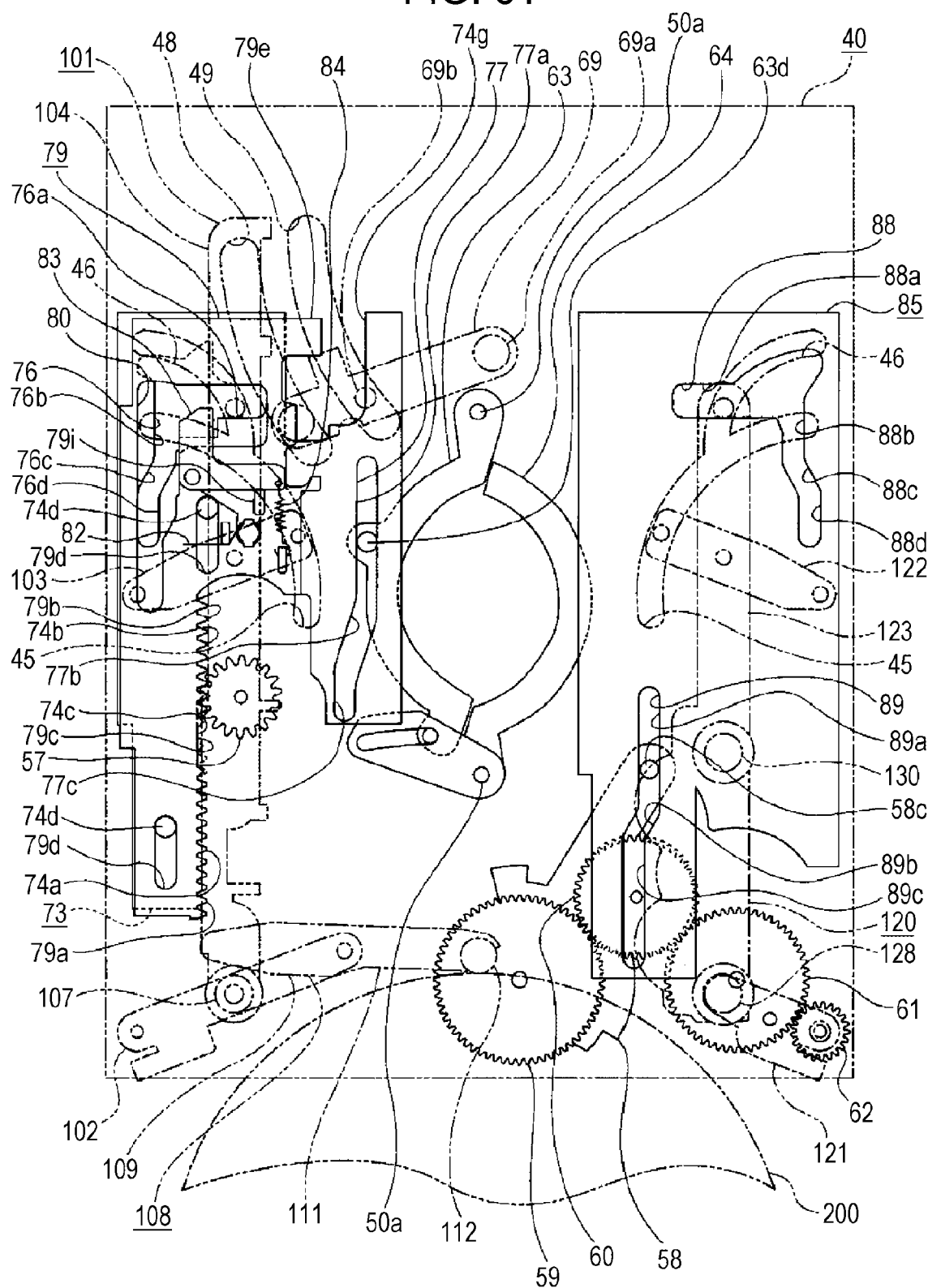
FIG. 61 is a schematic plan view illustrating a state of the first main slider and sub slider are integrated and moved toward the front from a non-meshed position.

Also, since the sub slide 79 moves toward the front, the rear side opening edge of the cam hole 76a of the slave shaft 118b of the limit lever 118 is touched from behind, and the first rail 104 moves forward together with the movement of the sub slider 79 (see FIG. 60). When the first rail 104 is moved toward the front, the second rail 123 is moved toward the front, synchronously with the first rail 104. By the sub slider 79 moving toward the front, the second sub rack portion 79b is meshed with the driving gear 57 (see FIG. 61).

Upon the second sub rack portion 79b being meshed with the driving gear 57, the sub slider 79 is moved toward the front by the driving force of the driving motor 52. Upon the sub slider 79 being moved forward, the rear side opening edges of the support receiving holes 79d each touch the supporting pins 74d of the first main slider 73.

Figure 62:
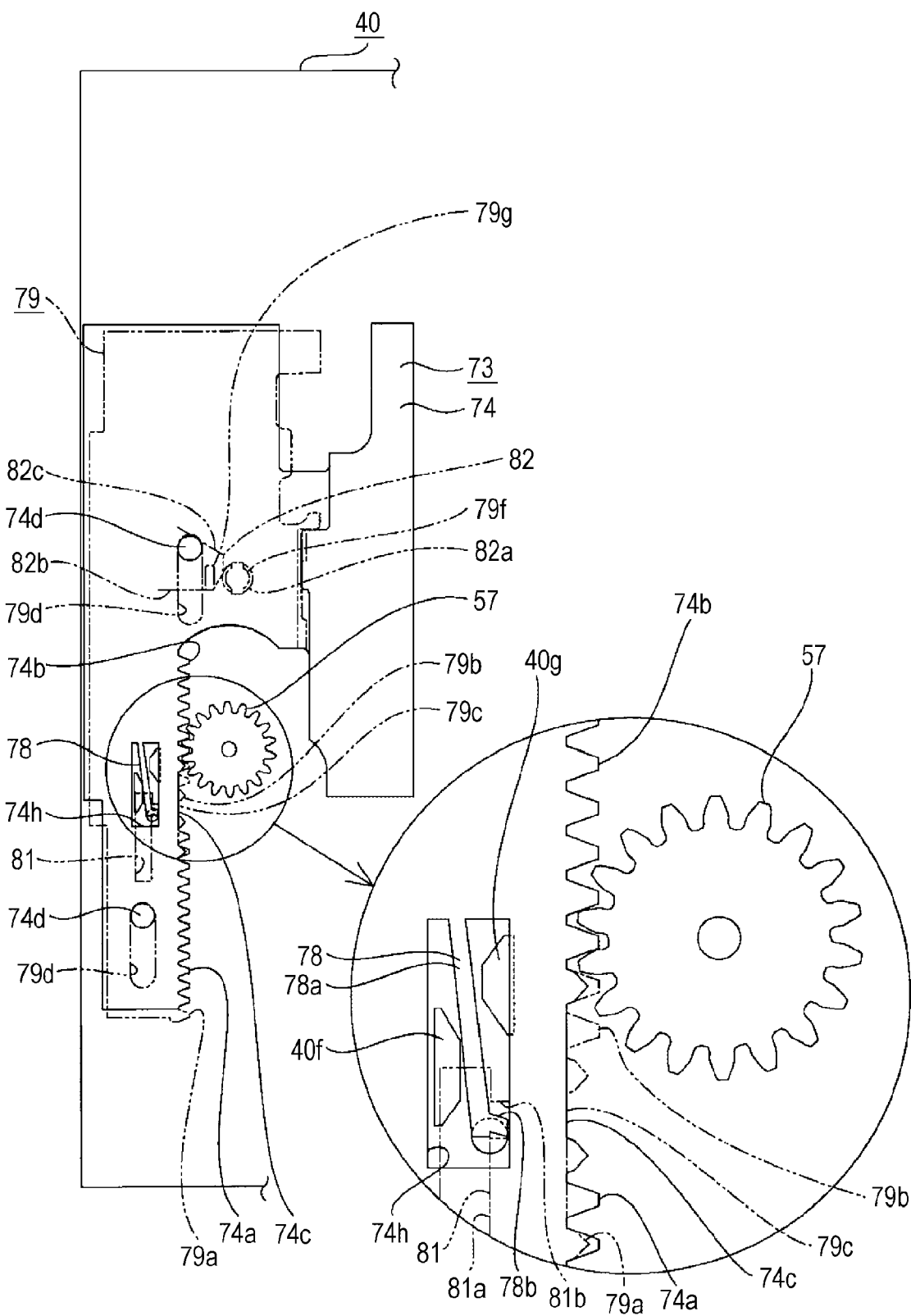
FIG. 62 is a schematic enlarged plan view illustrating a state wherein the first main slider and sub slider are integrated and moved toward the front from a non-meshed position, and the sub slider is locked as to the first main slider by a locking lever.

As the sub slider 79 continues to be moved toward the front in the state wherein the rear side opening edges of the support receiving holes 79d touch the support pins 74d of the first main slider 73, the support pins 74d are each pressed toward the front by the rear side opening edges of the support receiving holes 79d, and the first main slider 73 and sub slider 79 are integrally moved toward the front (see FIG. 62). Accordingly, the second main rack portion 74b of the first main slider 73 is meshed with the driving gear 57, and the second main rack portion 74b and the second sub rack portion 79b of the sub slider 79 are also meshed with the driving gear 57.

The first main slider 73 is integrally moved toward the front with the sub slider 79, whereby the second main slider 85 is also moved toward the front, synchronously with the first main slider 73.

When the first main slider 73 and sub slider 79 are integrally moved toward the front in the state of the second main rack portion 74b and second sub rack portion 79b being meshed with the driving gear 57, the elastic deformation portion 78a of the locking lever 78, which is attached to the first main slider 73 by the locking action protrusion 40f provided to the base chassis 40, is elastically deformed (see FIG. 62). Upon the elastic deformation portion 78a becoming elastically deformed, the locking portion 78b is inserted into the lever engaging portion 81b of the lever inserting hole 81 formed on the sub slider 79, and the sub slider 79 is locked by the locking lever 78 as to the first main slider 73. Accordingly, the first main slider 73 and sub slider 79 are moved toward the front in a locked state.

Figure 63:
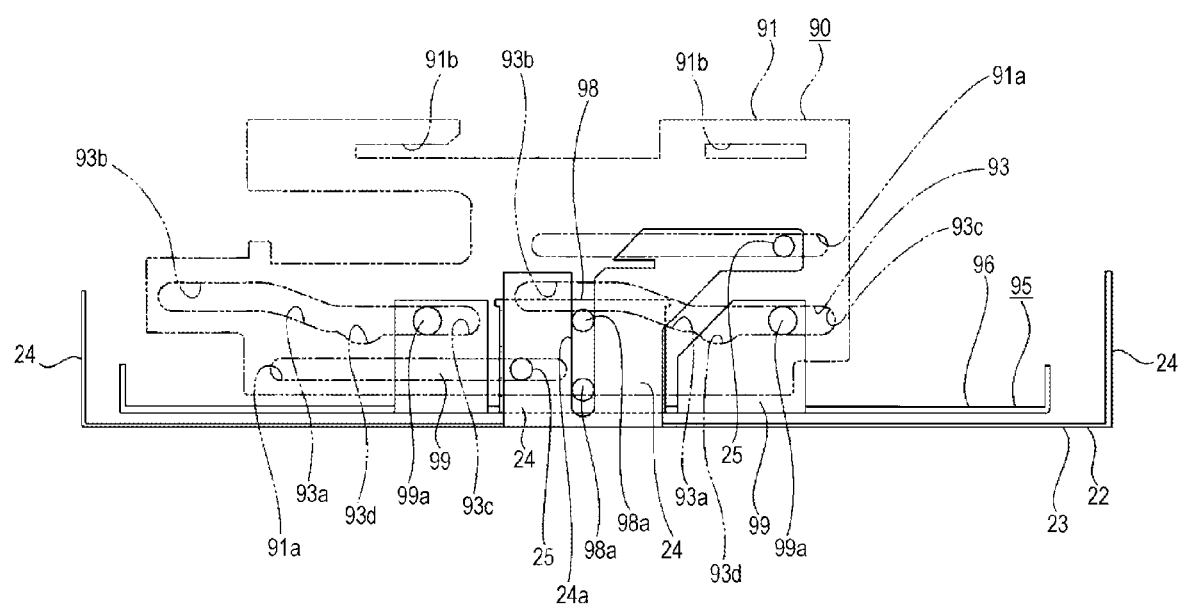
FIG. 63 is a schematic side view illustrating a state of the unit plate when the side slider is moved towards the front.

At this time, on the unit plate 95, the side sliders 90 are moved toward the front together with the movement of the first main slider 73 and second main slider 85 toward the front, whereby the guide receiving pins 99a move the rear side cam portions 93c of the elevator cam holes 93 (see FIG. 63).

The disc-shaped recording medium 200 is conveyed toward the front by the driving roller 128 and fixed roller 107, but when the disc-shaped recording medium 200 is in a protruded state forward a predetermined amount from the disc conveying device 21, conveying the disc-shaped recording medium 200 by the driving roller 128 and fixed roller 107 becomes difficult.

Figure 64:
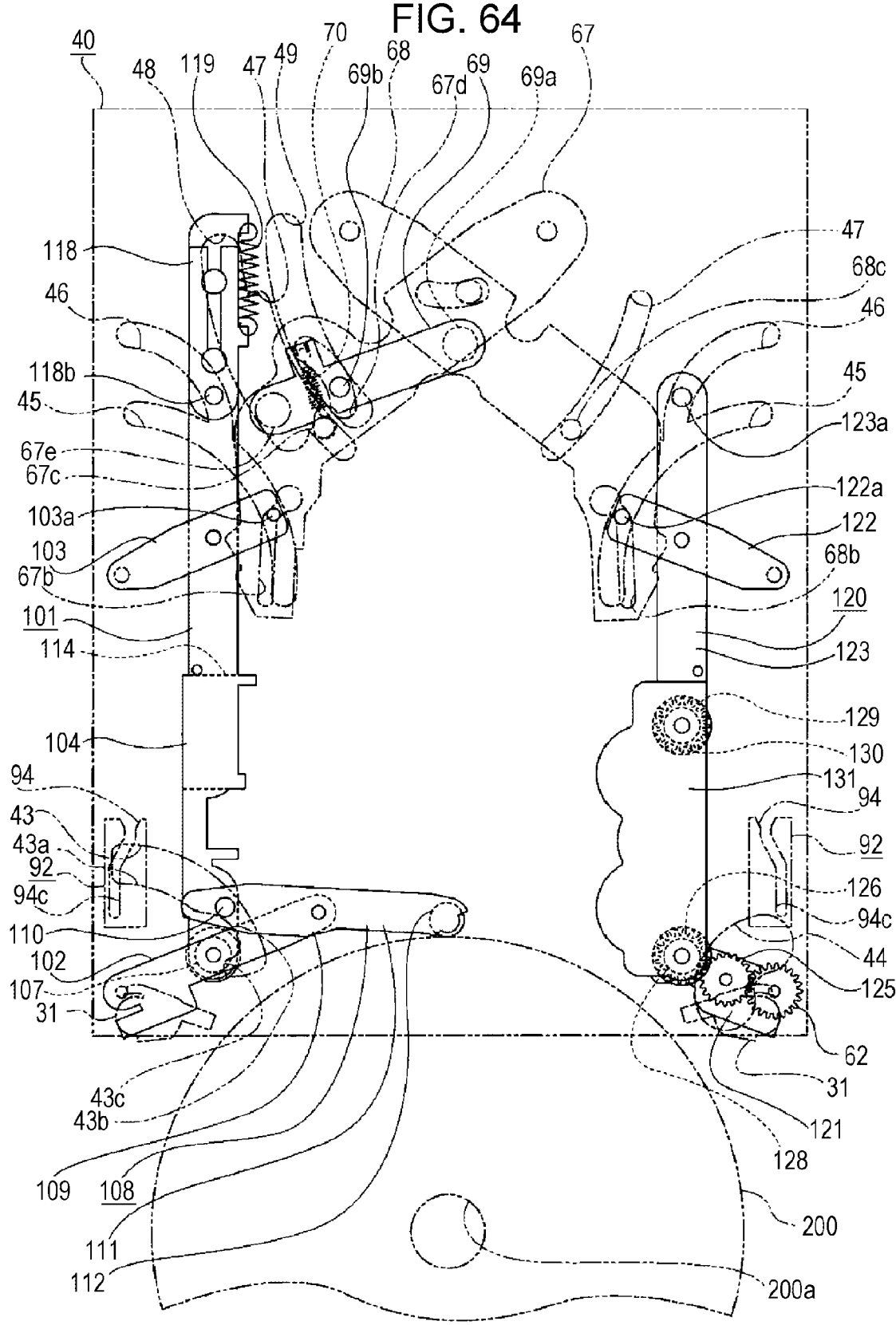
FIG. 64 is a schematic plan view illustrating a state wherein the disc-shaped recording medium has pressed by a pressing roller and is conveyed towards the disc cartridge.
Figure 65:
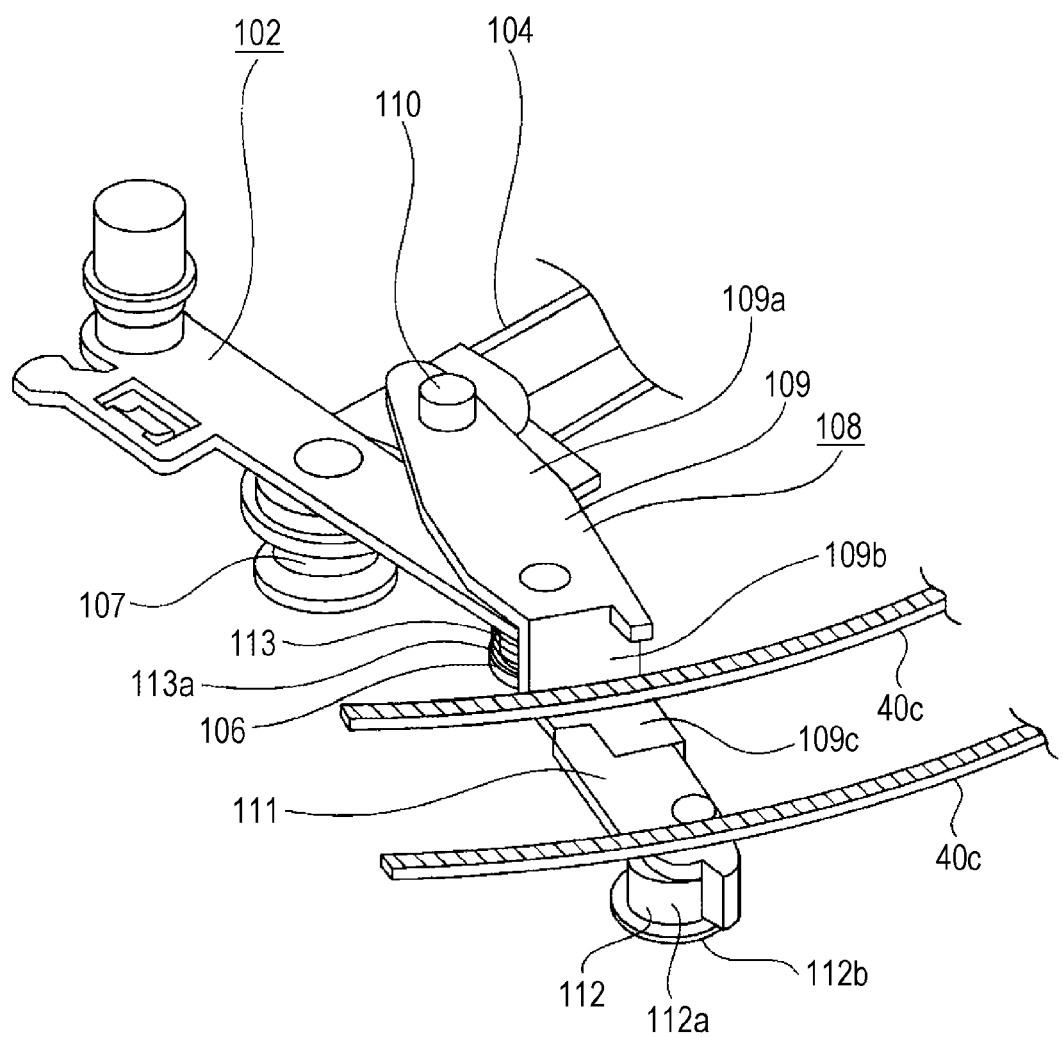
FIG. 65 is a perspective view illustrating a state wherein an ejecting lever is slid by a sliding protrusion and the pressing roller is moved downwards.
Figure 66:
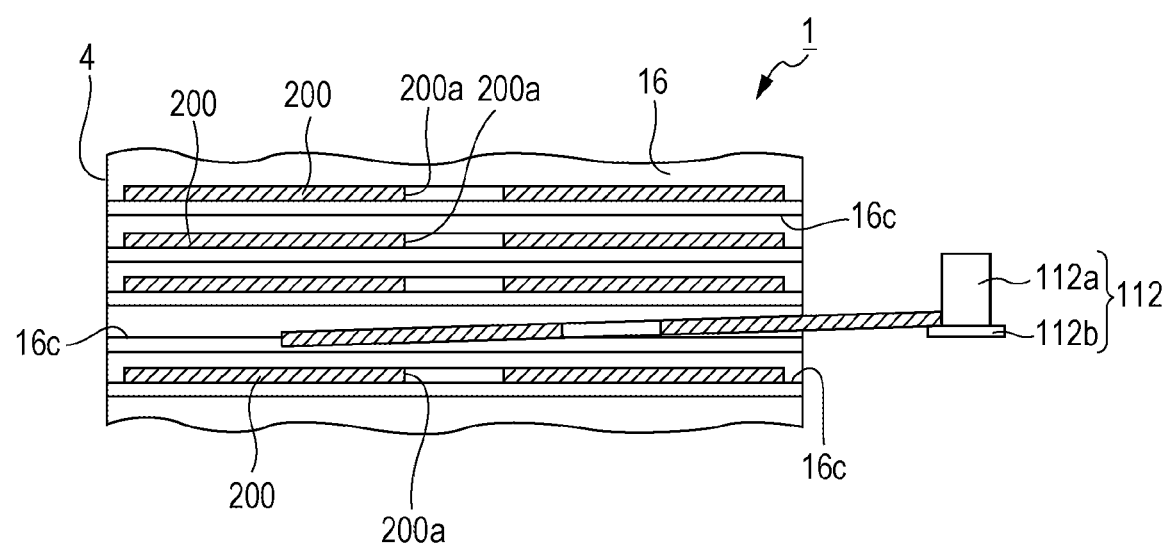
FIG. 66 is a schematic side view illustrating a state wherein the disc-shaped recording medium is pressed by the pressing roller and stored in the disc cartridge.

As the slave shaft 118b of the limit lever 118 is pressed by the sub slider 79 and the first rail 104 is moved toward the front, by the movement of the sub slider 79 toward the front, contact between the route adjusters 31 and the disc-shaped recording medium 200 is disengaged, and the route adjusters 31 are turned to a neutral position by the biasing force of the return springs 39 (see FIG. 64). At this time the ejecting lever 108 is turned widely in the direction of the ejecting lever 108 to move roughly toward the front by the first rail 104 moving toward the front, and the disc-shaped recording medium 200 continues to be conveyed toward the front by the ejecting lever 108, by the conveying by the driving roller 128 and fixed roller 107.

The disc-shaped recording medium 200 is conveyed toward the front by the peripheral face thereof being pressed by the pressing roller 112.

At this time, the roller supporting face 111 of the ejecting lever 108 is slid to the sliding protrusions 40c provided on the lower face of the base chassis 40 (see FIG. 65), and the pressing roller 112 is positioned lower than the state wherein the pressing roller 112 is stored in the storage 114. Upward moving force is applied to the ejecting lever 108 by the biasing spring 113, as described above, whereby the roller supporting face portion 111 is pressed to the sliding protrusions 40c, and the position of the pressing roller 112 is stabilized.

Upon the ejecting lever 108 being further turned together with the movement of the first rail 108 toward the front and the roller supporting face portion 111 being positioned to the front of the sliding protrusions 40c, the pressing roller 112 is moved somewhat upwards by the biasing force of the biasing spring 113, along with the ejecting lever 108. Accordingly, the rear edge portion of the disc-shaped recording medium 200 is held up somewhat upwards by the flange portion 112b of the pressing roller 112, and the disc-shaped recording medium 200 is sloped downwards in front as to the horizontal direction (see FIG. 66). At this time a portion of the disc-shaped recording medium 200 is inserted into the disc cartridge 1, and the disc-shaped recording medium 200 is stored in a state of sloping downwards in front in the holding grooves 16c of the disc cartridge 1.

As described above, when storing in the disc cartridge 1, the disc-shaped recording medium 200 is inserted in a state that guided faces 34a formed on the positioning protrusions 34 of the route adjusters 31 have been guided to the rear-side opening edge of the disc cartridge 1, and the positioning protrusions 34 have been positioned as to the holding groves 16c.

Accordingly, positioning of the route adjusters 31 as to the disc cartridge 1 can be performed in a sure manner, thereby inserting the disc-shaped recording medium 200 to the holding groves 16c of the disc cartridge 1 in a sure manner.

Also, as described above, at the time of the disc-shaped recording medium 200 being stored in the disc cartridge 1, positioning is performed in a state that the positioning protrusions 34 of the route adjusters 31 have been pressed on the bottom which forms the holding grooves 16c one level above the holding grooves 16c in which the disc-shaped recording medium 200 will be inserted.

Accordingly, positional accuracy as to the disc cartridge 1 of the route adjusters 31 is improved, thereby inserting the disc-shaped recording medium 200 into the holding groves 16c of the disc cartridge 1 in a sure and smooth manner.

Further, the route adjusters 31 are pressed and turned by the disc-shaped recording medium 200 and the positioning protrusions 34 are inserted into the holding grooves 16c different from the holding grooves 16c where the disc-shaped recording medium 200 are inserted, and positioning as to the disc cartridge 1 is performed.

Accordingly, smooth storing of the disc-shaped recording medium 200 as to the disc cartridge 1 can be performed, without the route adjusters 31 disturbing the storing of the disc-shaped recording medium 200 as to the disc cartridge 1.

Furthermore, the guided faces 37a are formed at the positioning grooves 37 of the route adjusters 31, and so the disc-shaped recording medium 200 are inserted into the positioning grooves 37 of the route adjusters 31 in a sure manner, thereby improving positional accuracy of the disc-shaped recording medium 200 in a simple and sure manner.

Also, two positioning grooves 37 are formed in the periphery faces of the route adjusters 31, and at the time of conveying the disc-shaped recording medium 200 as to the disc conveying device 21 in the lead-in direction and ejecting direction, positioning is performed by the route adjusters 31 being turned with the neutral position as a reference in each case and the periphery portion of the disc-shaped recording medium 200 is inserted into the positioning grooves 37.

Accordingly, positioning of the disc-shaped recording medium 200 at the time of conveying in the lead-in direction and ejecting direction by the route adjusters 31, can be performed, thereby improving positional accuracy of the disc-shaped recording medium 200 while realizing reducing of the number of parts.

In addition, the route adjusters 31 are turned in the neutral position by the return spring 39 regardless of the turning direction and turned with the neutral position as a reference, thereby improving reliability of the operation of the route adjusters 31.

When the ejecting lever 108 is turned together with the movement of the first rail 104 toward the front, the cam engaging portion 110 is slid against the operating cam portion 43 formed on the base chassis 40. The cam engaging portion 110 of the ejecting lever 108 is engaged with the front edge portion of the second cam portion 43b on the operating cam portion 43 of the base chassis 40.

Figure 67:
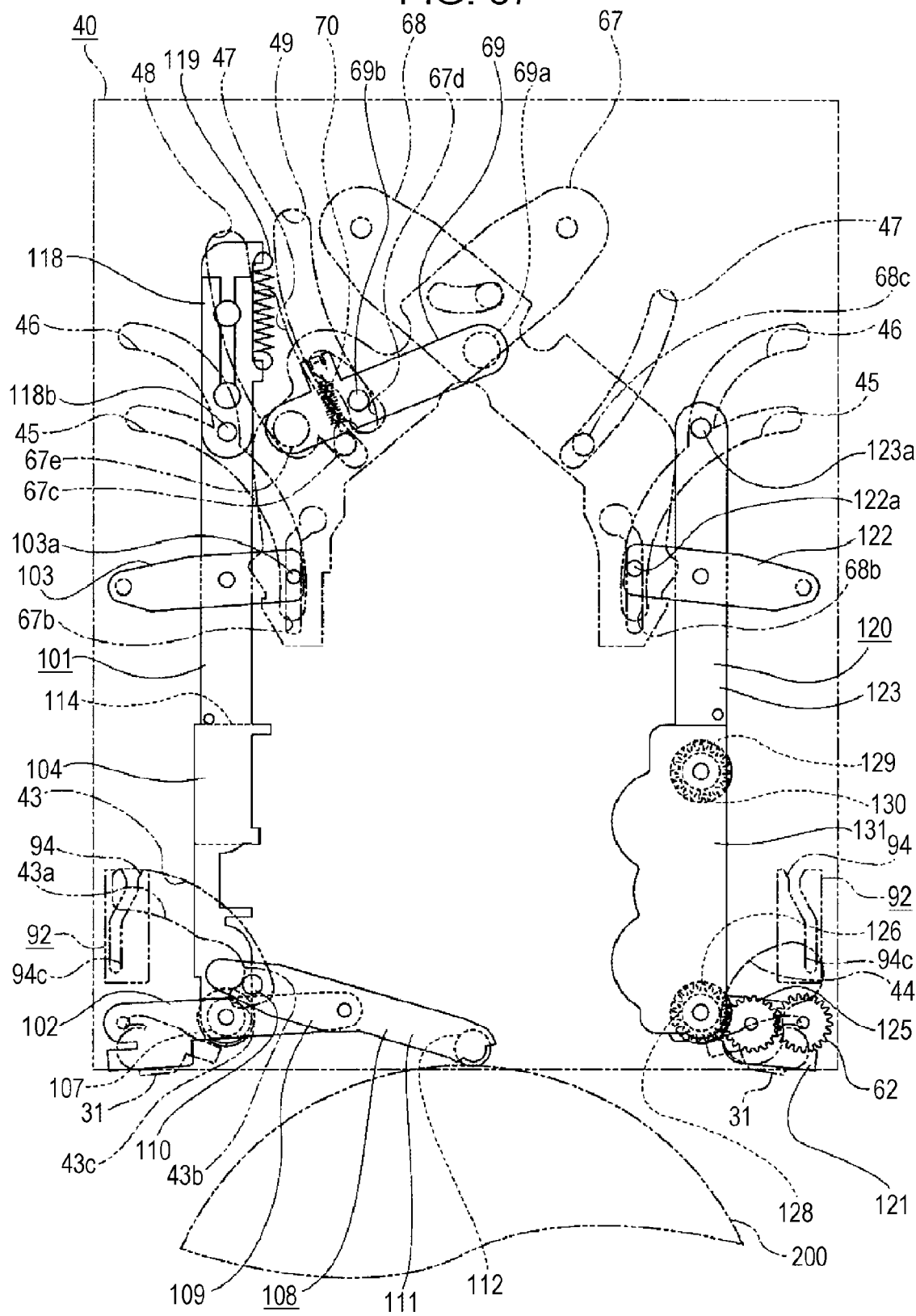
FIG. 67 is a schematic plan view illustrating a state wherein the disc-shaped recording medium continues to be pressed by the pressing roller and is conveyed toward the disc cartridge.

Upon the ejecting lever being further turning together with the movement of the first rail 104 toward the front, the disc-shaped recording medium 200 is further pressed toward the front by the pressing roller 112 and stored in the disc cartridge 1 (see FIG. 67).

Figure 68:
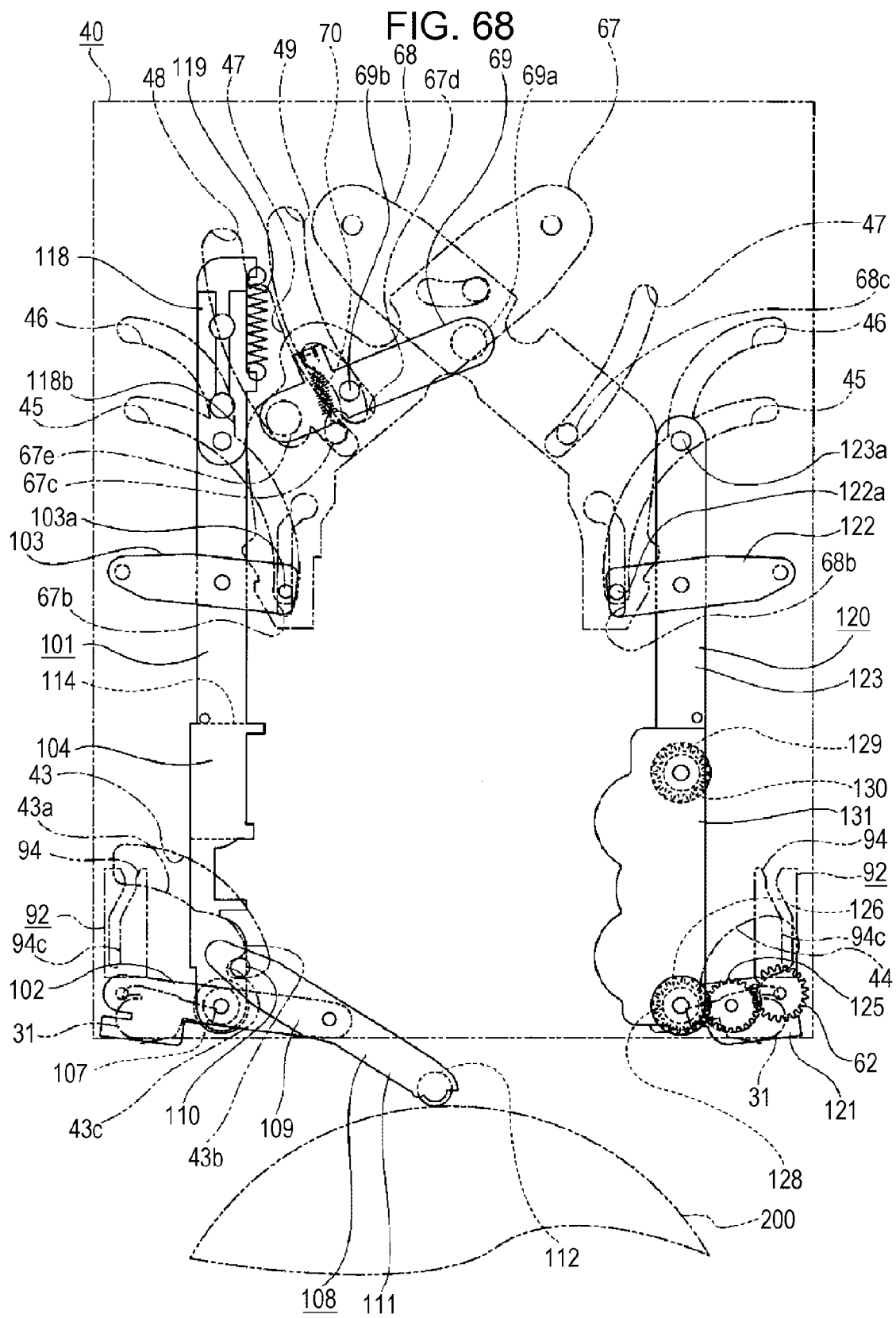
FIG. 68 is a schematic plan view illustrating a state wherein the disc-shaped recording medium continues to be pressed by the pressing roller and is stored in the disc cartridge.
Figure 69:
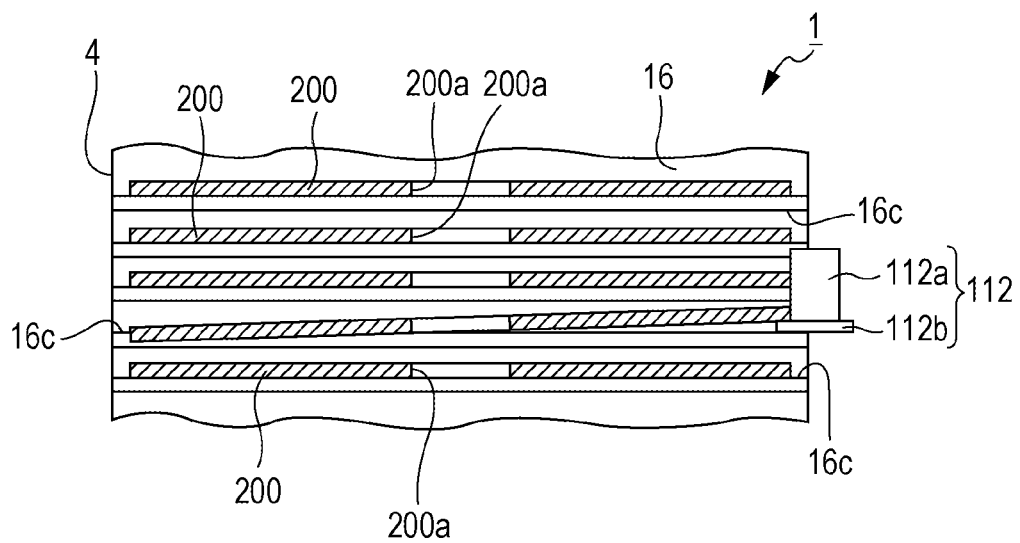
FIG. 69 is a schematic side view illustrating a state wherein the disc-shaped recording medium is pressed by the pressing roller and stored in the disc cartridge.

When the ejecting lever 108 is further turned together with the movement of the first rail 104 toward the front, the cam engaging portion 110 of the ejecting lever 108 is inserted into the third cam portion 43c from the second cam portion 43b on the operating cam portion 43 of the base chassis 40 (see FIG. 68). Upon the cam engaging portion 110 being inserted into the third cam portion 43c, the pressing roller 112 is turned in the direction of moving roughly towards the front as to the first front side link arm 102, having the cam engaging portion 110 as the fulcrum of the ejecting lever 108, and the pressing roller 112 is inserted into the disc cartridge 1 (see FIG. 69).

Upon the pressing roller 112 being inserted into the disc cartridge 1, the entire disc-shaped recording medium 200 is stored in the disc cartridge 1. At this time, the first main slider 73, sub slider 79, and second main slider 85 are moved to the front moving edge and stopped, the driving of the driving motor 52 is stopped, and the rotation of the driving gear 57 is temporarily stopped.

At this time, depending on the stopping position of the first rail 104 where the slave shaft 118b of the limit lever 118 is pressed and moved by the first main slider 72, the disc-shaped recording medium 200 may be excessively pressed toward the front by the pressing roller 112 and the front edge of the disc-shaped recording medium 200 may be pressed against the front face portion of the disc cartridge 1, whereby scratching or damage can occur to the disc-shaped recording medium 200.

Figure 70:
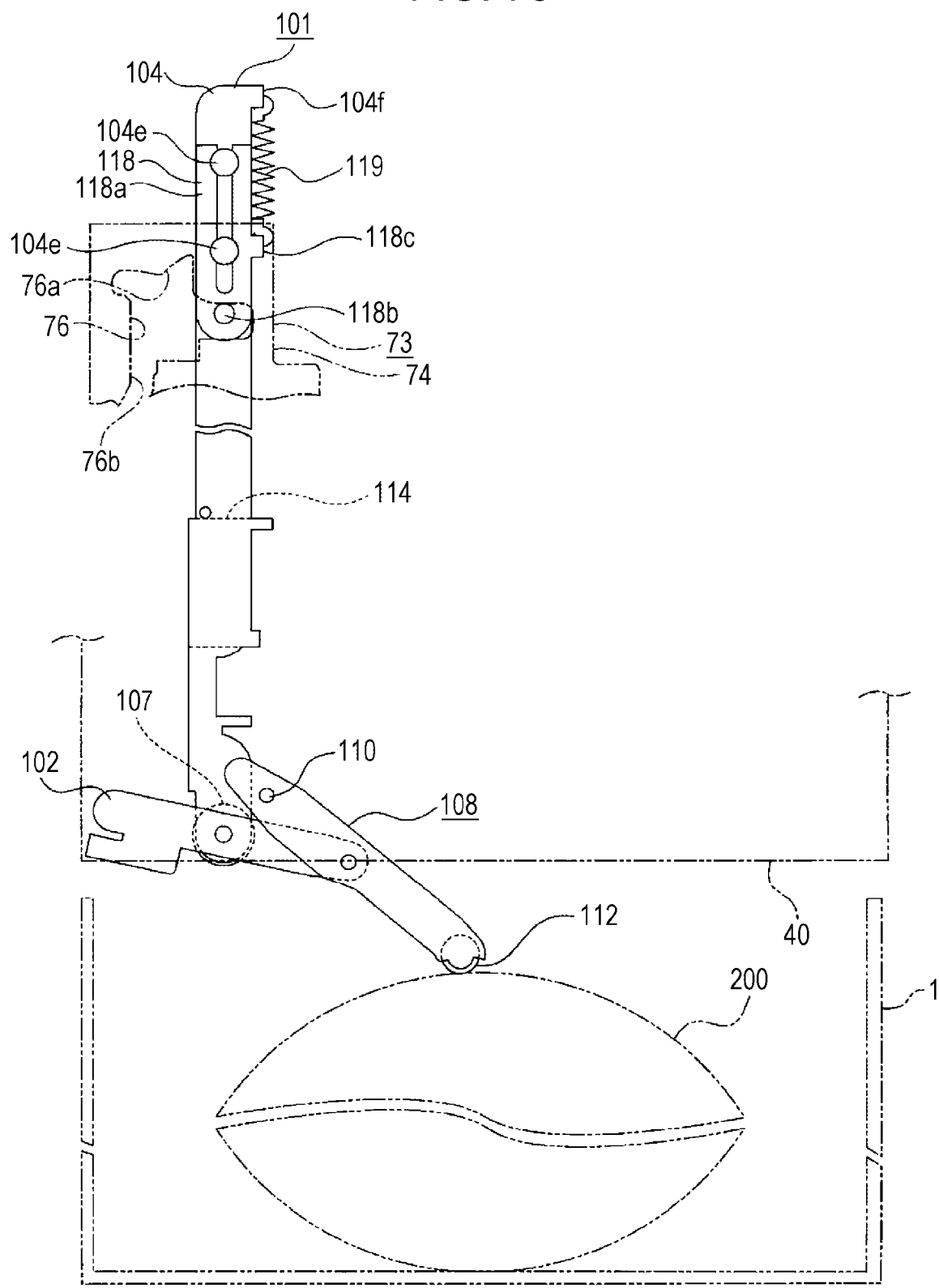
FIG. 70 is a schematic plan view illustrating an expanding spring supported between the limit lever and first rail is extended in the event that the disc-shaped recording medium is pressed forward excessively by the pressing roller.

However, when the disc-shaped recording medium 200 is excessively pressed toward the front by the pressing roller 112 and the front edge of the disc-shaped recording medium 200 touches the front face portion, upon the slave shaft 118b of the limit lever 118 being further pressed to the first main slider 72, the tension spring 119 supported between the limit lever 118 and the first rail 104 is extended (see FIG. 70).

Accordingly, the limit lever 118 is moved toward the front as to the first main slider 72 and the first main slider 72 is not moved, and excessive moving force toward the front is not applied to the disc-shaped recording medium 200, whereby scratching or damage to the disc-shaped recording medium 200 can be suppressed.

Also, the driving motor 52 is rotated in the opposite direction from the rotating direction in the ejecting operation, and operations opposite from the operations to store the disc-shaped recording medium 200 in the disc cartage 1 is performed, whereby the various parts return to the initial state thereof. Upon the various parts returning to the initial state, the rotation of the driving motor 52 is stopped by the detecting operation of the sensor 53a mounted on the sensor board 53.

When the driving motor 52 is rotated in the opposite direction from the rotation direction in the ejecting operation and the various parts return to the initial state, the ejecting lever 108 is turns and the pressing roller 112 is separated from the disc-shaped recording medium 200 toward the rear side. Accordingly, the flange portion 112b of the pressing roller 112 is moved from the lower face side of the disc-shaped recording medium 200 toward the rear, whereby the disc-shaped recording medium 200 that has been sloped as to the horizontal direction is caused to be in a horizontal state, and held at an appropriate position in the holding grooves 16c of the disc cartridge 1.

When the various parts return to the initial state, the first main slider 73, sub slider 79, and second main slider 85 are moved toward the rear, the first rail 104 and second rail 123 are moved toward the rear, the first front side link arm 102, first rear side link arm 103, second front side link arm 121, and second rear side link arm 122 are turned to a direction extending in the front/back direction, and the ejecting lever 108 is turned in the direction for the pressing roller 112 to be stored in the storage 114.

Note that, as described above, positioning of the route adjusters 31 is performed with the positioning protrusions 34 being inserted into the holding grooves 16c of the disc cartridge 1, but there is concern that the route adjusters 31 may not turn toward the neutral position due to the positioning protrusions 34 not being removed from the holding grooves 16c, depending on accuracy of assembly and machining precision of each part.

Figure 71:
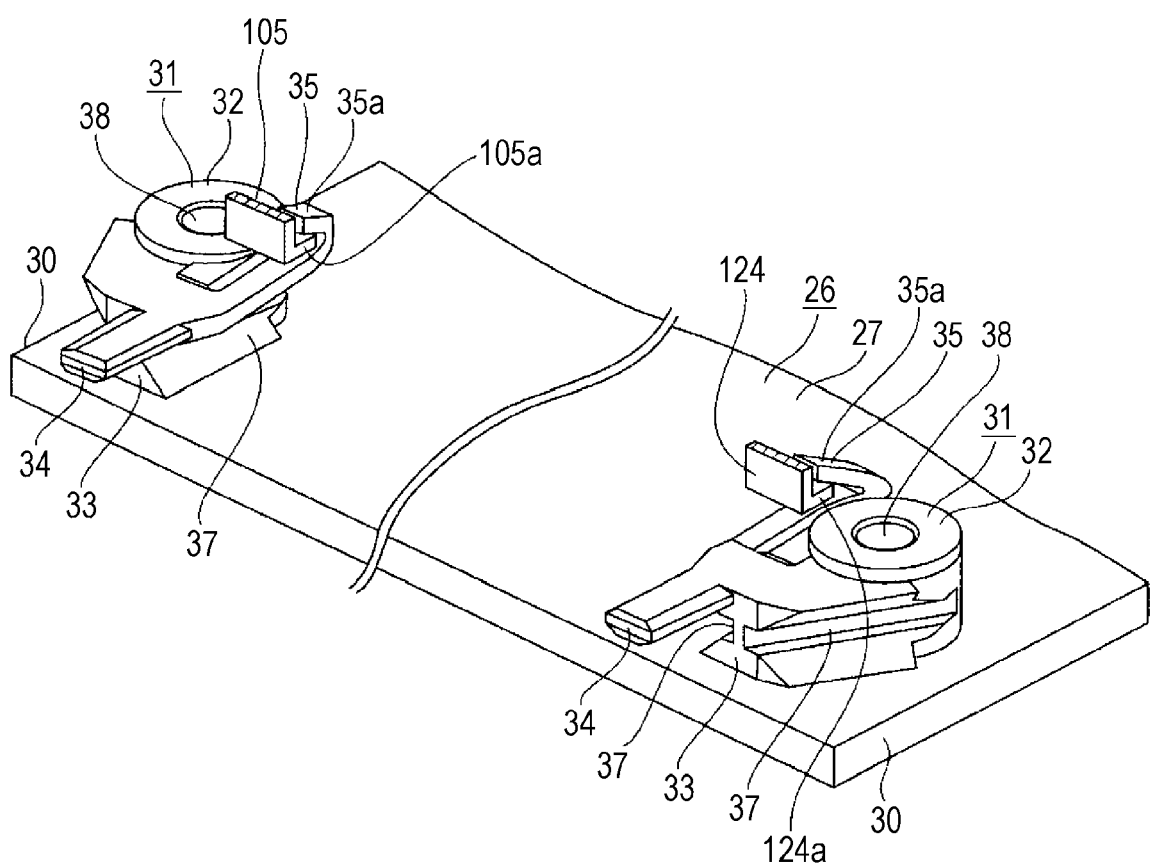
FIG. 71 is a perspective view illustrating a state in which the hook portions of front side link arms are engaged to the engaging portions of route adjusters in the event that the attachment receiving protrusions of the route adjusters have not been taken out from the holding groove of a disc cartridge.

Thus, in the event that the positioning protrusions 34 are not removed from the holding grooves 16c, when each portion returns in the initial state, the disc conveying device 21 turns the route adjusters 31 toward the neutral position in a forced manner, as described below (see FIG. 71 and FIG. 72).

When each portion returns to the initial state, as described above, the first front-side link arm 102 and the second front-side link arm 121 turn in the direction extending in the front/back direction. At this time, in the event that the positioning protrusions 34 are not removed from the holding grooves 16c, the hooking portion 105a provided on the slave piece 105 of the first front-side link arm 102 is engaged with the engaging portion 35a provided on the protrusion 35 of the left-side route adjuster 31, and the hooking portion 124a provided on the slave piece 124 of the second front-side link arm 121 is engaged with the engaging portion 35a provided on the protrusion 35 of the right-side route adjuster 31 (see FIG. 71).

Subsequently, upon the first front-side link arm 102 and the second front-side link arm 121 being turned, the hooking portion 105a of the first front-side link arm 102 is engaged with the engaging portion 35a, and the hooking portion 124a of the second front-side link arm 121 is engaged with the engaging portion 35a, and accordingly the route adjusters 31 are turned toward the neutral position in a forced manner by the first front-side link arm 102 and the second front-side link arm 121. Accordingly, the positioning protrusions 34 are each removed from the holding grooves 16c of the disc cartridge 1.

Figure 72:
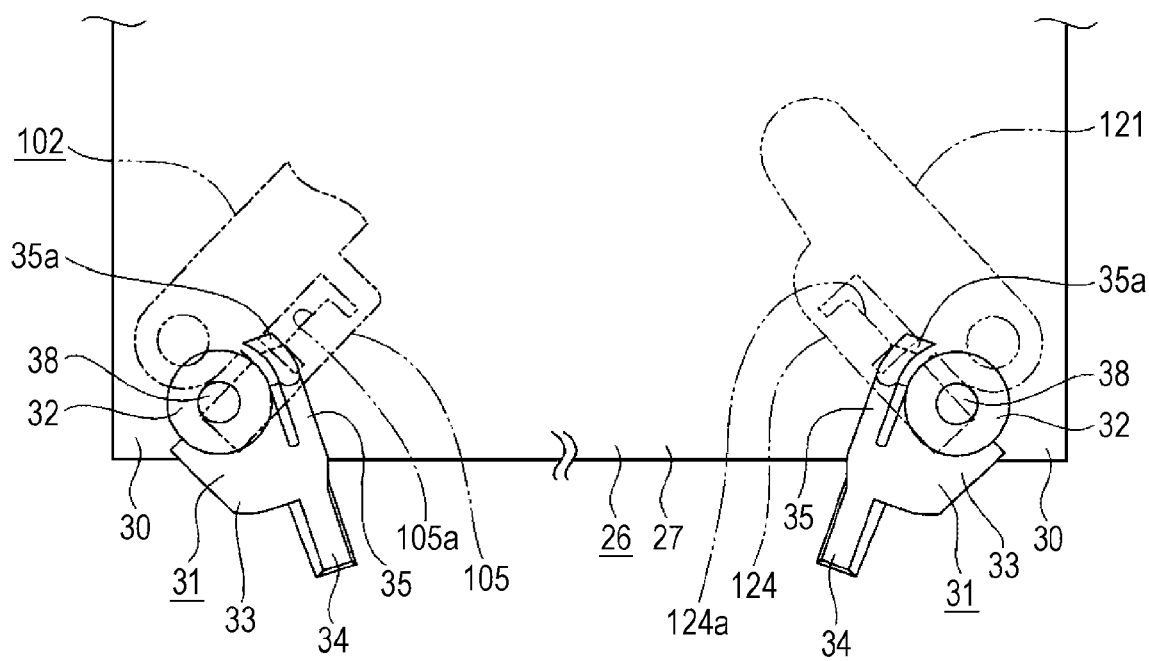
FIG. 72 is a schematic enlarged plan view illustrating a state at time of the hook portions of front side link arms being separated from the engaging portions of route adjusters.

Continuously, upon the first front-side link arm 102 and the second front-side link arm 121 being turned, each turning fulcrum of the first front-side link arm 102 and the second front-side link arm 121 is formed at the position shifted somewhat to the rear side as to the turning fulcrum of the route adjusters 31, and accordingly the positions of the hooking portions 105a and 124a are shifted toward the side as to the engaging portions 35a, respectively (see FIG. 72). Therefore the engaged states between the hooking portions 105a and 124a and the engaging portions 35a are disengaged, respectively, each route adjuster 31 is turned to the neutral position by the bias force of the return springs 39, and each of the first front-side link arm 102 and the second front-side link arm 121 are turned to the initial state.

In this way, with the disc conveying device 21, a mechanism is provided to turn the route adjusters 31 toward the neutral position in a forced manner in the event of the positioning protrusions 34 not being removed from the holding grooves 16c, whereby the route adjusters 31 are turned to the neutral position in a sure manner, thereby ensuring a smooth operation state of the disc conveying device 21.

Also, when the positioning protrusions 34 of the route adjusters 31 have been removed from the holding grooves 16c, the engaging states between the hooking portions 105a and 124a and the engaging portions 35a are disengaged, respectively.

Accordingly, the route adjusters 31 can be turned to the neutral position in a sure manner and also the first front-side link arm 102 and the second front-side link arm 121 can be turned to the initial state in a sure manner, thereby improving reliability of the operation of the disc conveying device 21.

Operations of Locking Lever, Etc

Next, specific operations of the locking lever 78 and so forth, when the storage of the disc-shaped recording medium 200 to the disc cartridge 1 is ended and the first main slider 73 and sub slider 79 are moved from the front moving edge toward the rear to the non-meshed position, will be described (see FIGS. 73 through 76).

Note that the first main slider 73 and has a function to transmit the driving force of the driving motor 52 to predetermined various parts by being moved in the front/back direction by the driving motor 52. The predetermined parts are provided as a driving transmitting unit, and for example various parts of the first link mechanism 101, various parts of the second link mechanism, and various parts that operate synchronously with the first main slider 73 such as the side sliders 90, are included in a driving transmitting unit.

Figure 73:
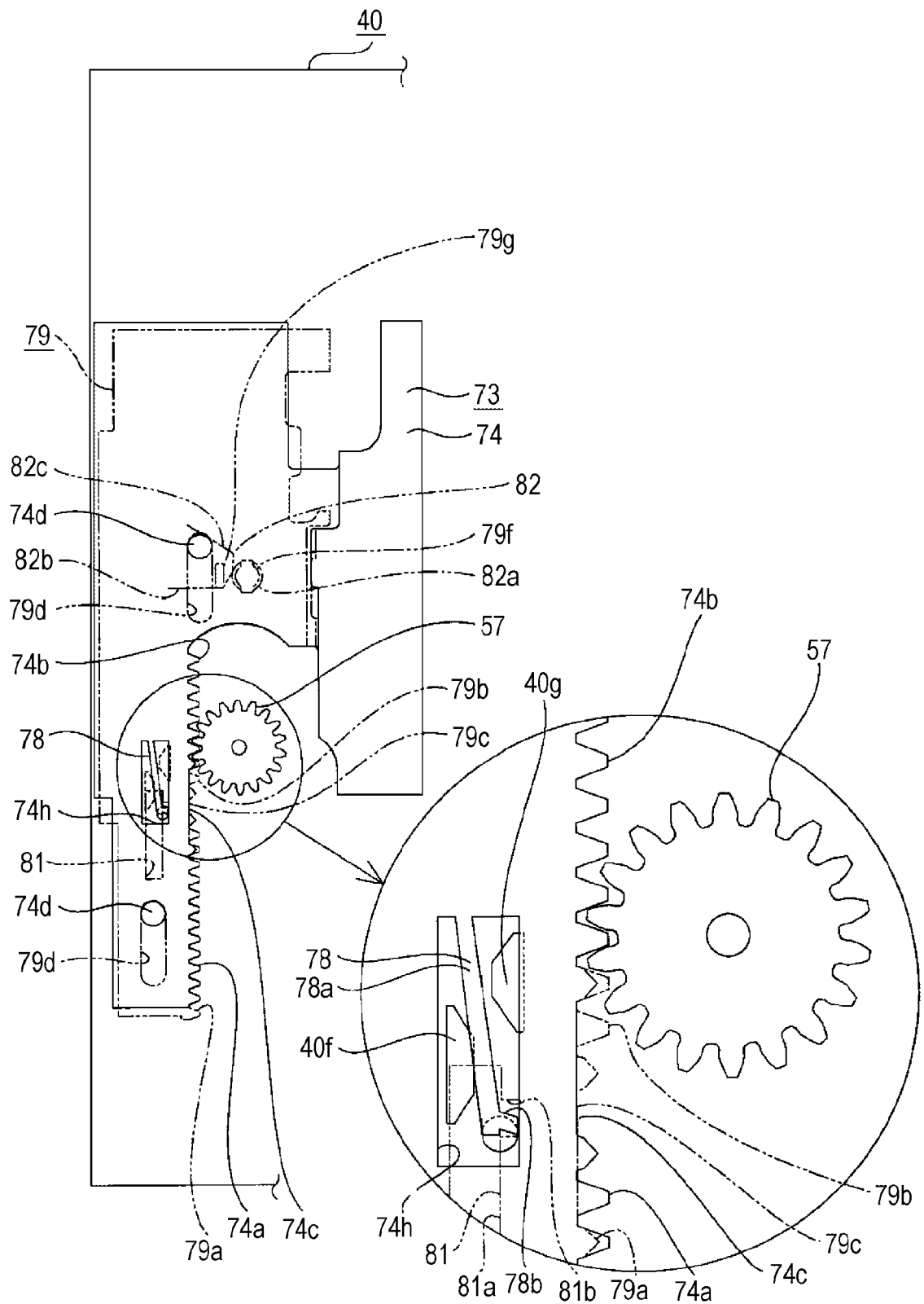
FIG. 73 is a schematic enlarged plan view illustrating a state immediately following the first main slider and sub slider having been moved from the forward moving edge to a non-meshed position, and illustrates the operations of the locking lever and so forth when the first main slider and sub slider are moved from the forward moving edge toward the non-meshed position in the rear, together with FIGS. 74 through 76.

Upon storage of the disc-shaped recording medium 200 in the disc cartridge 1 by the ejecting lever 108 ending, as described above, the driving motor 52 is rotated in the opposite direction as the rotating direction in the ejecting operations, and the first main slider 73 and sub slider 79 are integrally moved toward the rear by the rotation of the driving gear 57 (see FIG. 73).

At this time, as described above, the sub slider 79 is locked as to the first main slider 73 by the locking lever 78, and moving force towards the rear as to the first main slider 73 is applied to the sub slider by the position control spring 82.

Figure 74:
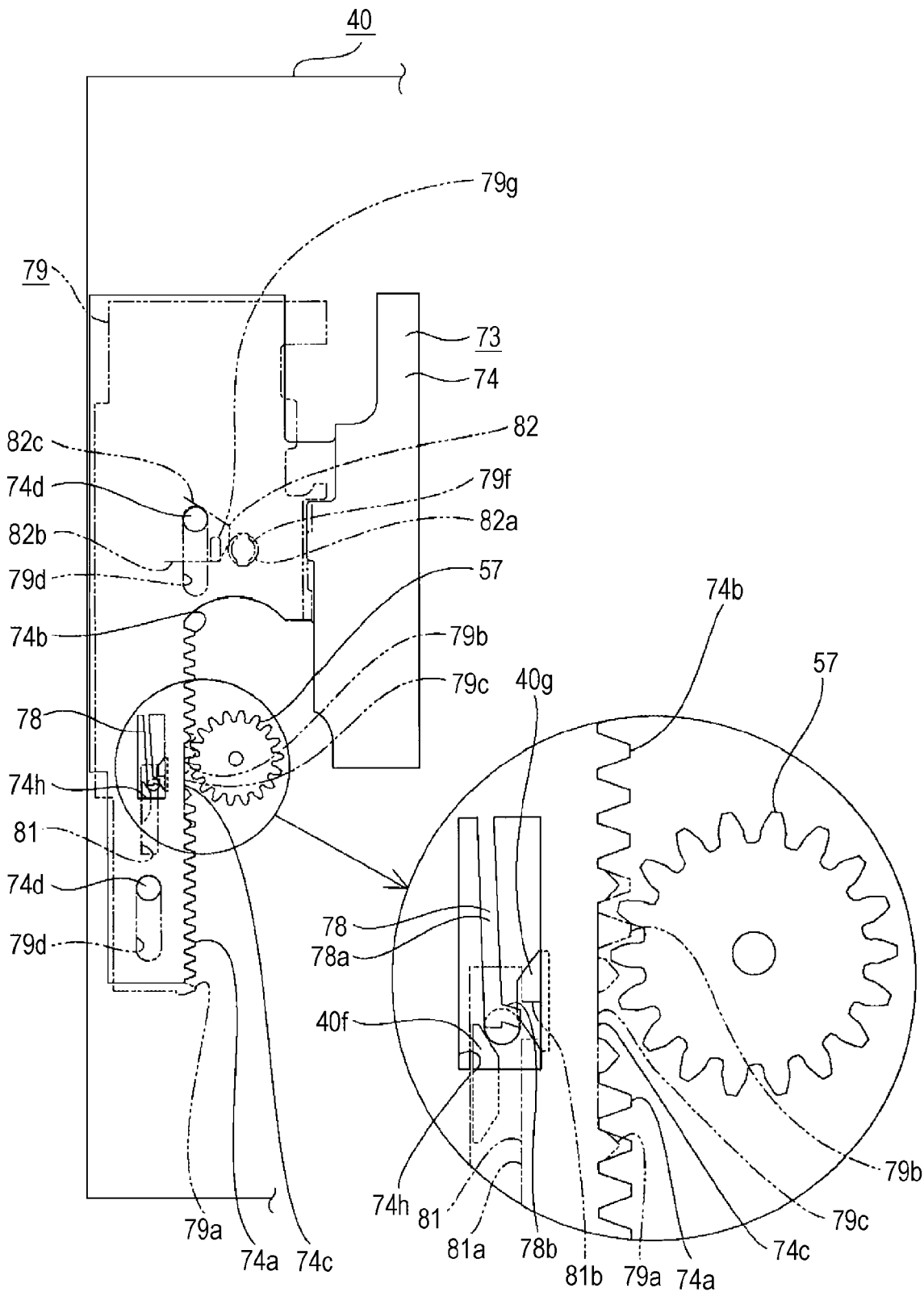
FIG. 74 is a schematic enlarged plan view illustrating a state wherein the first main slider and sub slider continue to be moved toward the rear, and the sub slider lock is disengaged by the locking lever when the meshing of the second main lock portion and driving gear of the first main slider is disengaged.

Further, as the first main slider 73 and sub slider 79 are moved toward the rear by the driving force of the driving motor 52, the meshing of the first main slider 73 and second main rack portion and the driving gear 75 is disengaged (see FIG. 74). At this time, the elastic deformation portion 78a of the locking lever 78 is slid to the lock disengaging action protrusion 40g, the elastic deformation portion 78a is elastically deformed, and the locking portion 78b is extracted from the lever engaging portion 81b of the lever inserting hole 81 formed on the sub slider 79. Accordingly, the lock is disengaged by the locking lever 78 as to the first main slider 73 of the sub slider 79, and the first main slider 73 is stopped at a non-meshed position.

Figure 75:
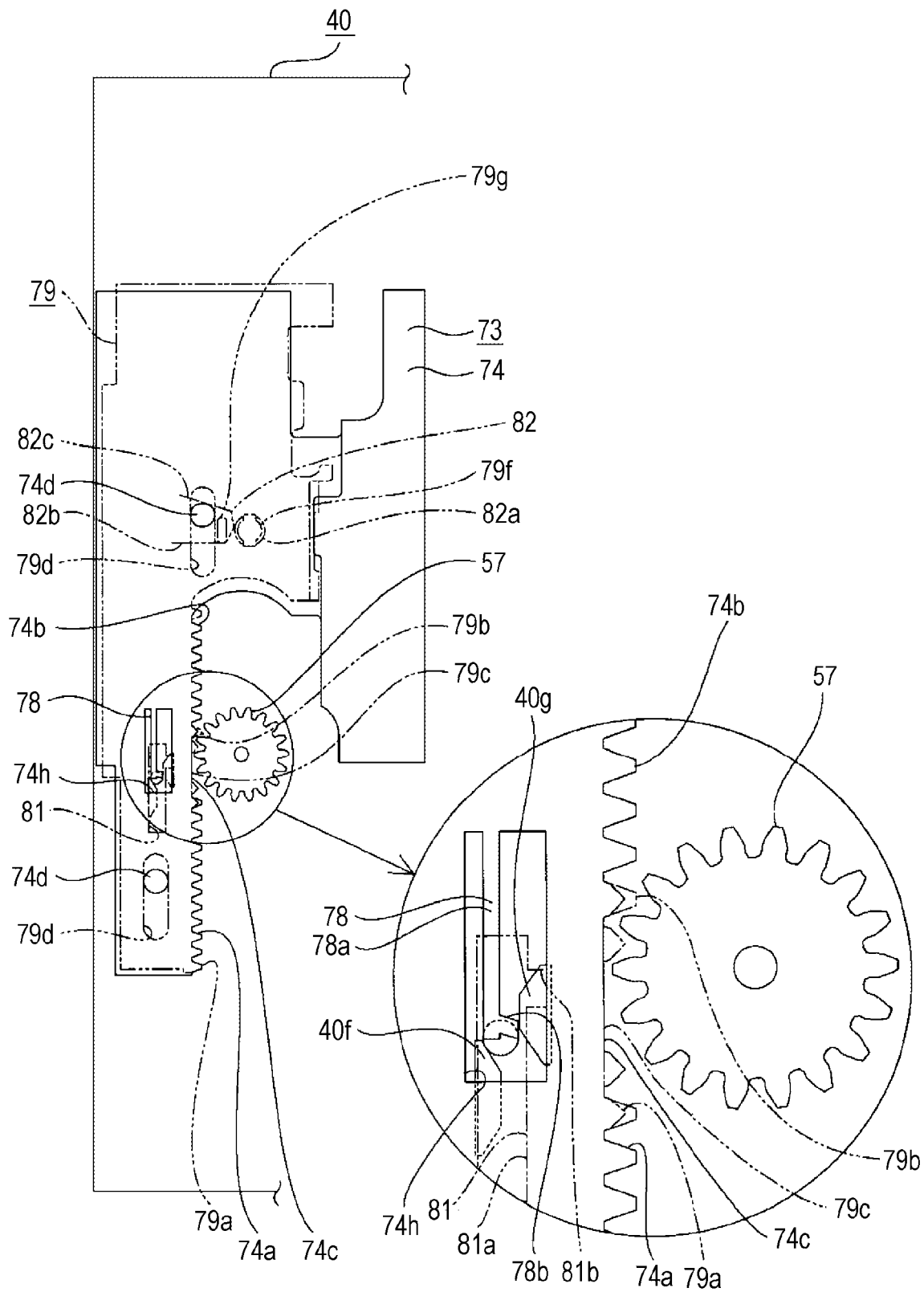
FIG. 75 is a schematic enlarged plan view illustrating a state wherein the first main slider and sub slider continue to be moved toward the rear, and the meshing of the second sub lock portion and driving gear of the sub slider is disengaged.
Figure 76:
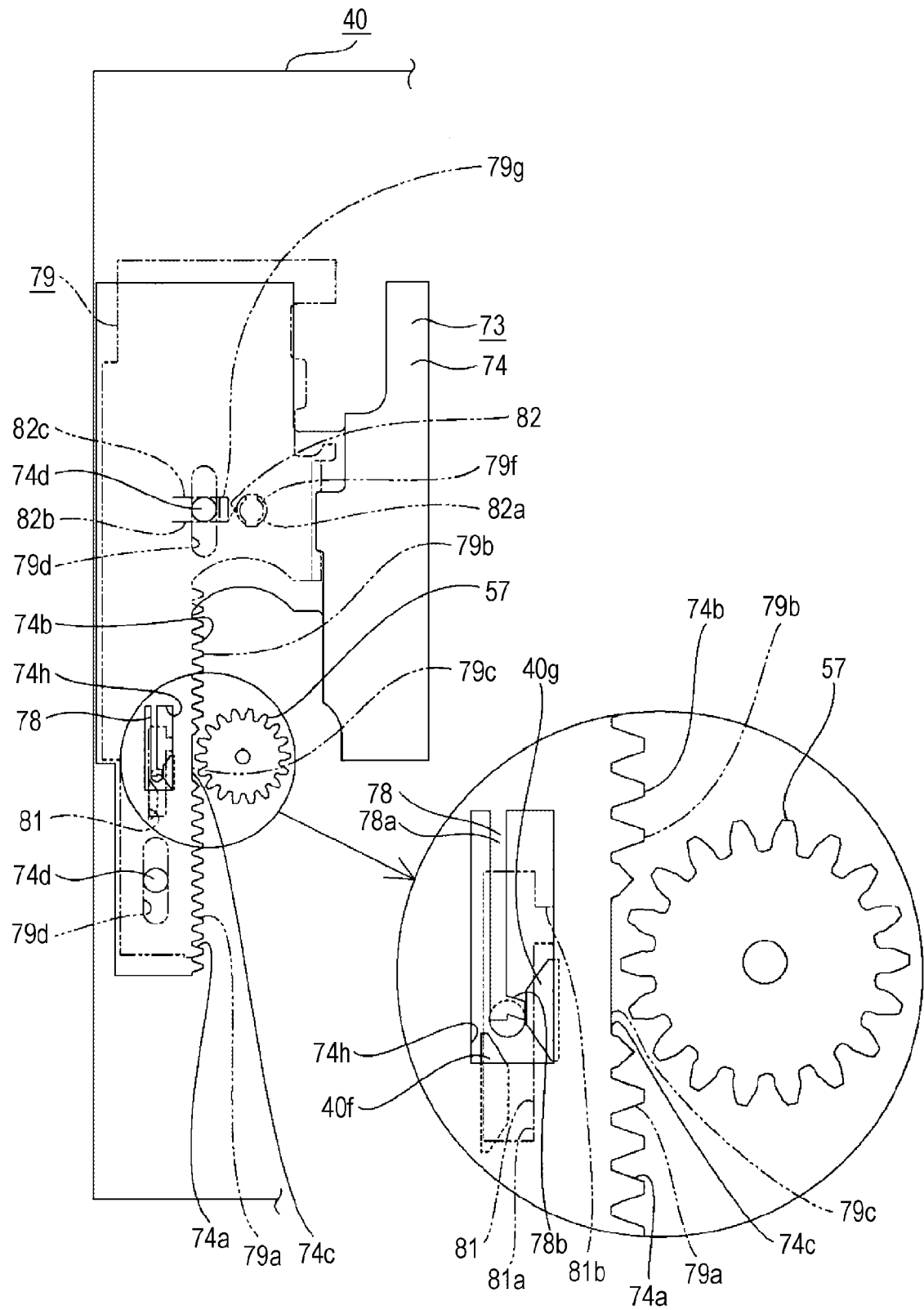
FIG. 76 is a schematic enlarged plan view illustrating a state wherein the sub slider has been moved to a non-meshed position.

The sub slider 79 is continuously moved slightly toward the rear by the driving force of the driving motor 52 (see FIG. 75).

Upon the sub slider 79 being moved slightly toward the rear by the driving force of the driving motor 52, the meshing of the driving gear 57 and the second sub rack portion 79b of the sub slider 79 is disengaged, and the movement of the sub slider 79 by the driving force of the driving motor is stopped. At this time, movement force (biasing force) toward the rear as to the first main slider 73 is applied to the sub slider 79 by the position control spring 82, whereby the sub slider 79 is moved slightly towards the rear as to the first main slider 73 by the biasing force of the position control spring 82 and is stopped in a non-meshed position (see FIG. 76).

CONCLUSION

As described above, the disc conveying device 21 is provided with the route adjusters 31 which are pressed and turned by the disc-shaped recording medium 200 and is formed with positioning grooves 37 where the peripheral portions of the disc-shaped recording medium 200 are inserted into the route adjusters 31.

Accordingly, a configuration to perform positioning of the disc-shaped recording medium 200 is made by simple members such as the route adjusters 31, thereby improving positional accuracy at the time of conveying the disc-shaped recording medium 200 while ensuring simplicity of the mechanism thereof.

Present Technology

The present technology can be configured as described below.

(1) A disc conveying device including: a route adjuster which is pressed and turned by a disc-shaped recording medium being conveyed in a direction orthogonal to a central axis direction in a lead-in direction of being extracted and led in from a disc cartridge and an ejecting direction of being stored in the disc cartridge after being ejected; wherein a positioning groove is formed to the route adjuster, in which a peripheral portion of the disc-shaped recording medium is inserted at the time of the disc-shaped recording medium being conveyed, so as to position the disc-shaped recording medium.

(2) The disc conveying device according to (1), wherein a plurality of holding grooves which can respectively store a plurality of the disc-shaped recording mediums is arrayed and formed in the central axis direction of the disc-shaped recording mediums in the disc cartridge; and wherein the route adjuster is provided with a positioning protrusion which, when the disc-shaped recording medium is conveyed in the ejecting direction and the route adjuster is turned, is inserted in a holding groove different from the holding groove where the disc-shaped recording medium is inserted and performs positioning as to the disc cartridge of the route adjuster.

(3) The disc conveying device according to (2), wherein the positioning protrusion of the route adjuster is made to be pressed on a face which forms the holding groove.

(4) The disc conveying device according to (3), wherein the positioning protrusion has formed thereon a guided face which is slid against a face which forms the holding groove at the time of turning of the route adjuster, and is inclined as to the slid face.

(5) The disc conveying device according to any one of (1) through (4), wherein the route adjuster is made to be turnable in an opposite direction with a neutral position as a reference; wherein two of the positioning grove are formed at the peripheral face of the route adjuster; and wherein, at the time of conveying the disc-shaped recording medium in the lead-in direction, the route adjuster is turned to one direction with the neutral position as a reference and the peripheral portion of the disc-shaped recording medium is inserted into one of the positioning grooves; and wherein, at the time of conveying the disc-shaped recording medium in the ejecting direction, the route adjuster is turned to another direction with the neutral position as a reference and the peripheral portion of the disc-shaped recording medium is inserted into the other of the positioning grooves.

(6) The disc conveying device according to (5), further including a return spring that turns the route adjuster to the neutral position, when the route adjuster is turned to either the one or the other direction with the neutral position as a reference.

(7) The disc conveying device according to any one of (1) through (6), wherein a guiding face that guides the disc-shaped recording medium is formed to the positioning grooves.

(8) The disc conveying device according to any one of (1) through (7), further including: a pair of rails, positioned on opposite sides of the disc-shaped recording medium which is conveyed, the rails extending in the conveying direction of the disc-shaped recording medium; a plurality of link arms which are turnably connected to the pair of rails and perform parallel shifting of the pair of rails in directions toward and away from the peripheral face of the disc-shaped recording medium; an ejecting lever turnably supported by at least one of the rails, which presses the peripheral face of the disc-shaped recording medium that has been positioned by the route adjuster, by being turned, so as to store the disc-shaped recording medium in the disc cartridge; a hooking portion provided to at least one of the plurality of link arms; and an engaging portion capable of engaging the hooking portion to the route adjuster; wherein the link arm is turned in the same direction as with the ejecting lever, when the disc-shaped recording medium is stored in the disc cartridge and the ejecting lever is turned in the opposite direction as with the direction of pressing the disc-shaped recording medium; wherein the hooking portion is enabled to engage with the engaging portion, when the ejecting lever is turned in the opposite direction and the link arm is turned in the same direction as with the ejecting lever in a state in which the positioning protrusion has been inserted into the holding groove; and wherein the route adjuster is made to be turned toward the neutral position along with the turning operation of the link arm, when the hooking portion has engaged with the engaging portion.

(9) The disc conveying device according to (8), wherein the ejecting lever is made to be turnable to the same direction as with the route adjuster; and wherein the turning center of the route adjuster and the turning center of the ejecting lever exist in different positions in a direction orthogonal to the turning centers; and wherein, when the hooking portion and the engaging portion which have been engaged are slid, and the ejecting lever and the route adjuster are turned to a predetermined position at the time of the ejecting lever turning to the opposite direction, engaging between the hooking portion and the engaging portion is disengaged.

The specific forms and configurations of the various parts described according to the embodiments described above are have only been illustrated exemplarily regarding carrying out the present technology, and should not be interpreted restrictively as to the technical scope of the present technology.

The present disclosure contains subject matter related to that disclosed in Japanese Priority Patent Application JP 2011-195512 filed in the Japan Patent Office on Sep. 7, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc conveying device comprising:
a route adjuster which is pressed and turned by a disc-shaped recording medium being conveyed in a direction orthogonal to a central axis direction in a lead-in direction of being extracted and led in from a disc cartridge and an ejecting direction of being stored in the disc cartridge after being ejected,
wherein a positioning groove is formed to said route adjuster, in which a peripheral portion of said disc-shaped recording medium is inserted at the time of said disc-shaped recording medium being conveyed, so as to position said disc-shaped recording medium,
wherein a plurality of holding grooves which respectively stores a plurality of disc-shaped recording media is arrayed and formed in the central axis direction of said disc-shaped recording mediums in said disc cartridge, and
wherein said route adjuster is provided with a positioning protrusion which, when said disc-shaped recording medium is conveyed in said ejecting direction and said route adjuster is turned, is inserted in a holding groove different from the holding groove where said disc-shaped recording medium is inserted and performs positioning as to said disc cartridge of said route adjuster.

2. The disc conveying device according to claim 1, wherein said positioning protrusion of said route adjuster is made to be pressed on a face which forms said holding groove.

3. The disc conveying device according to claim 1, wherein said positioning protrusion has formed thereon a guided face which is slid against a face which forms said holding groove at the time of turning of said route adjuster, and is inclined as to said slid face.

4. The disc conveying device according to claim 1, wherein a guiding face that guides said disc-shaped recording medium is formed to said positioning grooves.

5. A disc conveying device comprising:
a route adjuster which is pressed and turned by a disc-shaped recording medium being conveyed in a direction orthogonal to a central axis direction in a lead-in direction of being extracted and led in from a disc cartridge and an ejecting direction of being stored in the disc cartridge after being ejected,
wherein a positioning groove is formed to said route adjuster, in which a peripheral portion of said disc-shaped recording medium is inserted at the time of said disc-shaped recording medium being conveyed, so as to position said disc-shaped recording medium,
wherein said route adjuster is made to be turnable in an opposite direction with a neutral position as a reference,
wherein two of said positioning groves are formed at the peripheral face of said route adjuster, and
wherein, at the time of conveying said disc-shaped recording medium in said lead-in direction, said route adjuster is turned to one direction with the neutral position as a reference and the peripheral portion of said disc-shaped recording medium is inserted into one of said positioning grooves, and wherein, at the time of conveying said disc-shaped recording medium in said ejecting direction, said route adjuster is turned to another direction with the neutral position as a reference and the peripheral portion of said disc-shaped recording medium is inserted into the other of said positioning grooves.

6. The disc conveying device according to claim 5, further comprising:
a return spring that turns said route adjuster to said neutral position, when said route adjuster is turned to either the one or the other direction with the neutral position as a reference.

7. A disc conveying device comprising:
a route adjuster which is pressed and turned by a disc-shaped recording medium being conveyed in a direction orthogonal to a central axis direction in a lead-in direction of being extracted and led in from a disc cartridge and an ejecting direction of being stored in the disc cartridge after being elected,
wherein a positioning groove is formed to said route adjuster, in which a peripheral portion of said disc-shaped recording medium is inserted at the time of said disc-shaped recording medium being conveyed, so as to position said disc-shaped recording medium;
a pair of rails, positioned on opposite sides of said disc-shaped recording medium which is conveyed, said rails extending in the conveying direction of the disc-shaped recording medium;
a plurality of link arms which are turnably connected to said pair of rails and perform parallel shifting of said pair of rails in directions toward and away from the peripheral face of said disc-shaped recording medium;
an ejecting lever turnably supported by at least one of said rails, which presses the peripheral face of said disc-shaped recording medium that has been positioned by said route adjuster, by being turned, so as to store said disc-shaped recording medium in said disc cartridge;
a hooking portion provided to at least one of said plurality of link arms; and
an engaging portion capable of engaging said hooking portion to said route adjuster,
wherein said link arm is turned in the same direction as with said ejecting lever, when said disc-shaped recording medium is stored in said disc cartridge and said ejecting lever is turned in the opposite direction as with the direction of pressing said disc-shaped recording medium, and
wherein said hooking portion is enabled to engage with said engaging portion, when said ejecting lever is turned in said opposite direction and said link arm is turned in the same direction as with said ejecting lever in a state in which said positioning protrusion has been inserted into said holding groove,
and wherein said route adjuster is made to be turned toward said neutral position along with the turning operation of said link arm, when said hooking portion has engaged with said engaging portion.

8. The disc conveying device according to claim 7, wherein said ejecting lever is made to be turnable to the same direction as with said route adjuster,
and wherein the turning center of said route adjuster and the turning center of said ejecting lever exist in different positions in a direction orthogonal to said turning centers,
and wherein, when said hooking portion and said engaging portion which have been engaged are slid, and said ejecting lever and said route adjuster are turned to a predetermined position at the time of said ejecting lever turning to said opposite direction, engaging between said hooking portion and said engaging portion is disengaged.

* * * * *